United States Patent [19]

Nakane et al.

[11] Patent Number: 5,351,107
[45] Date of Patent: Sep. 27, 1994

[54] IMAGE FORMING APPARATUS AND METHOD HAVING IMAGE DENSITY CORRECTING FUNCTION

[75] Inventors: Rintaro Nakane, Yokohama; Jiro Egawa, Yokosuka, both of Japan

[73] Assignee: Kabushiki Kaisha Toshiba, Kawasaki, Japan

[21] Appl. No.: 35,952

[22] Filed: Mar. 23, 1993

[30] Foreign Application Priority Data

Sep. 24, 1992 [JP] Japan ................................. 4-255009
Sep. 24, 1992 [JP] Japan ................................. 4-280688
Sep. 25, 1992 [JP] Japan ................................. 4-280440

[51] Int. Cl.$^5$ ................................................ G03G 21/00
[52] U.S. Cl. ................................ 355/208; 355/246; 346/160
[58] Field of Search ............... 355/246, 245, 208, 210, 355/203, 204, 77; 346/160, 153.1; 358/443, 448, 458, 461, 300; 430/31; 118/653

[56] References Cited

U.S. PATENT DOCUMENTS

| | | | |
|---|---|---|---|
| 4,277,162 | 7/1981 | Kasahara et al. | 355/208 |
| 4,318,610 | 3/1982 | Grace | 355/246 |
| 4,779,106 | 10/1988 | Mills | 358/300 X |
| 4,870,460 | 9/1989 | Harada et al. | 355/246 |
| 4,894,685 | 1/1990 | Shoji | 355/246 |
| 4,975,747 | 12/1990 | Higuchi | 355/246 |
| 5,045,883 | 9/1991 | Ishigaki et al. | 355/246 X |
| 5,083,160 | 1/1992 | Suzuki et al. | 355/208 |
| 5,099,279 | 3/1992 | Shimizu | 355/208 |
| 5,103,260 | 4/1992 | Tompkins et al. | 355/208 |
| 5,107,302 | 4/1992 | Bisaiji | 355/246 |
| 5,148,289 | 9/1992 | Nishiyama et al. | 358/300 |
| 5,196,886 | 3/1993 | Nakane et al. | 355/246 |
| 5,198,861 | 3/1993 | Hasegawa et al. | 355/246 |

Primary Examiner—A. T. Grimley
Assistant Examiner—Sandra L. Brasé
Attorney, Agent, or Firm—Foley & Lardner

[57] ABSTRACT

High and low density test patterns are formed from pattern generating unit as toner patterns on a photosensitive drum, and attached toner amounts corresponding to the test patterns are detected by toner density detecting unit under the control of a control circuit which calculates the differences between the attached toner amounts of the high and low density portions and respective target values, wherein, when the calculated differences do not fall within respective predetermined ranges, the exposure conditions of an optical system and the bias voltage of a developing unit, or the exposure amount of the optical system and the bias voltages of a charger and the developing unit, or the bias voltages of the charger and the developing unit and the light-emission period of the optical system are renewed.

11 Claims, 31 Drawing Sheets

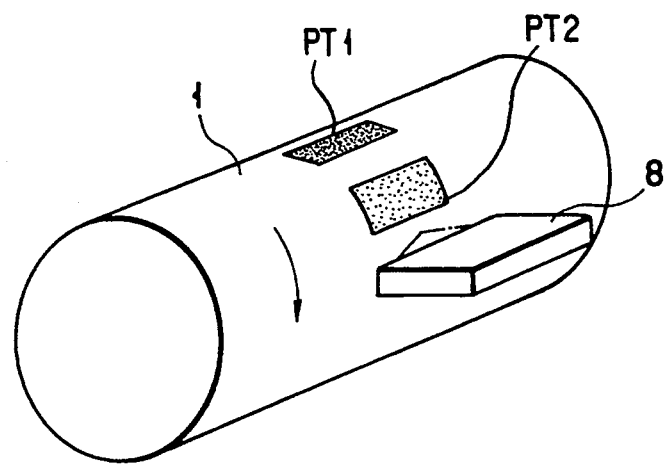
F I G. 3
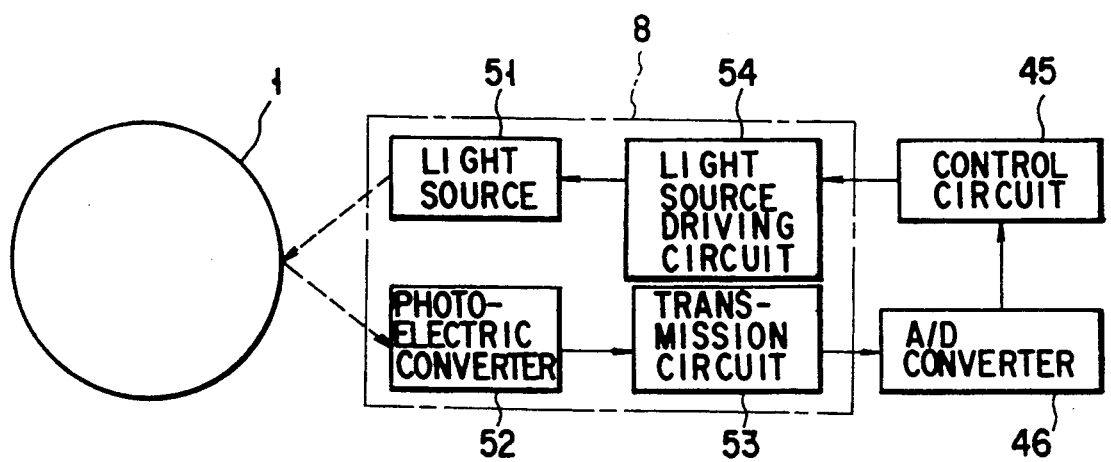
F I G. 4

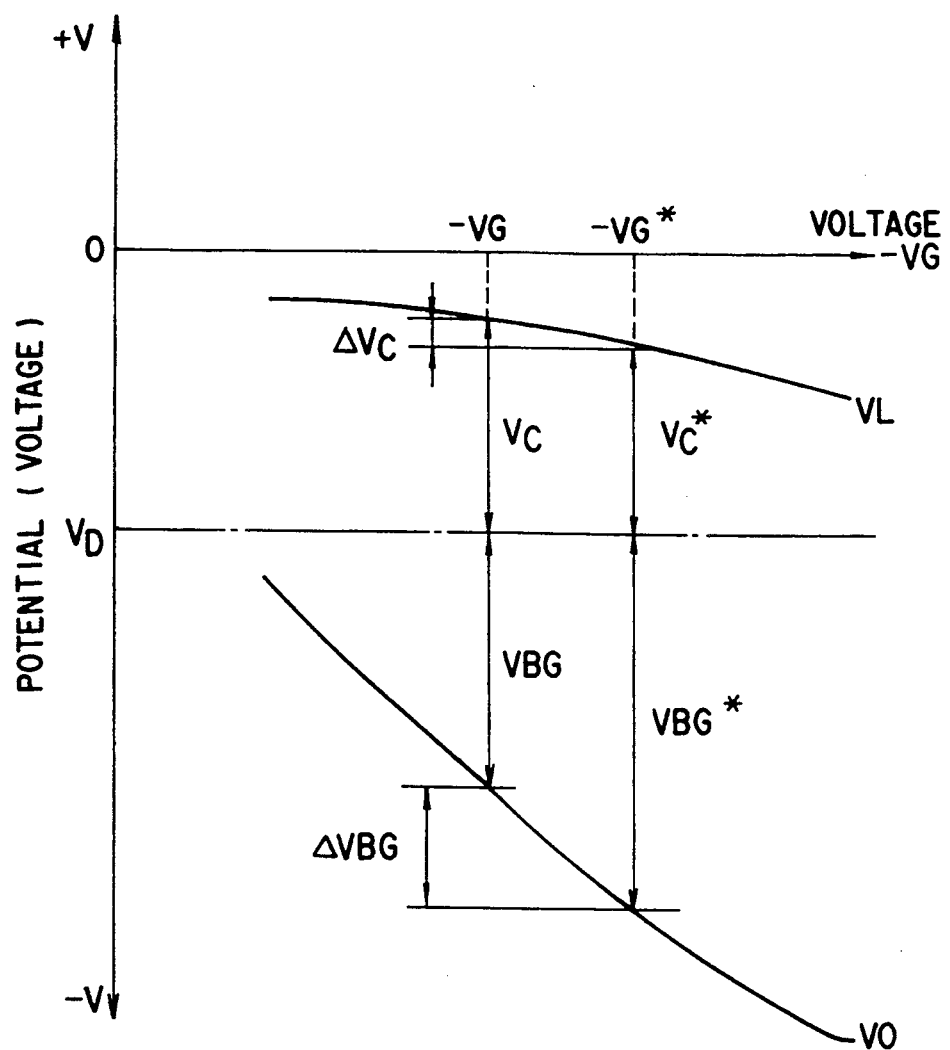
F I G. 6

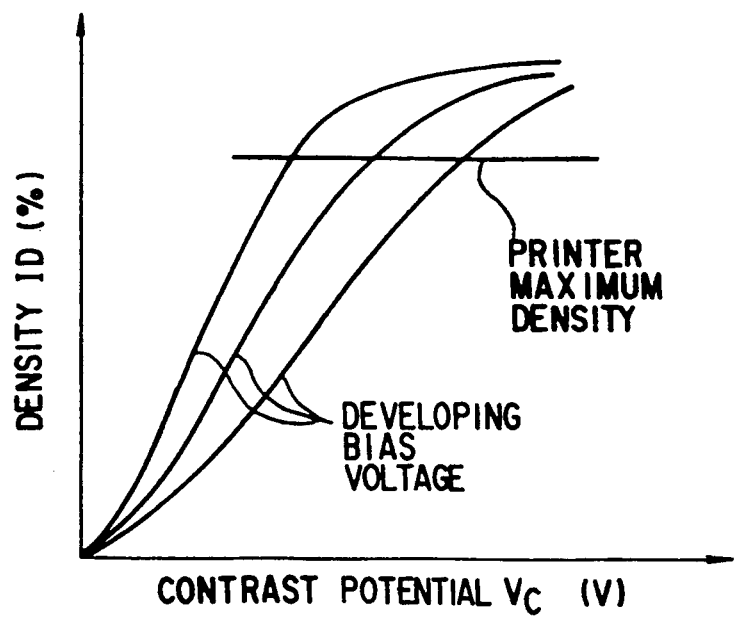
F I G. 7
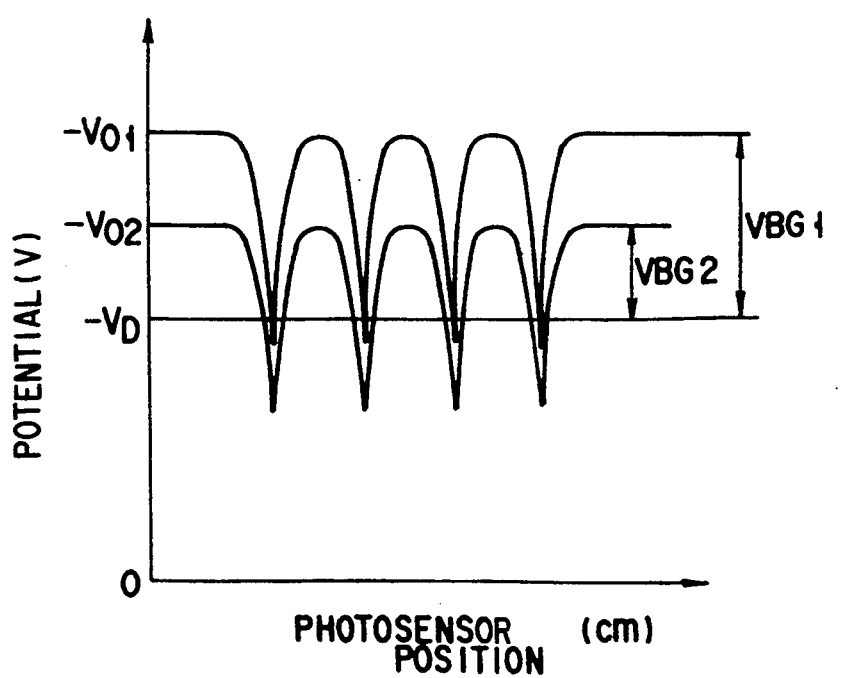
F I G. 8

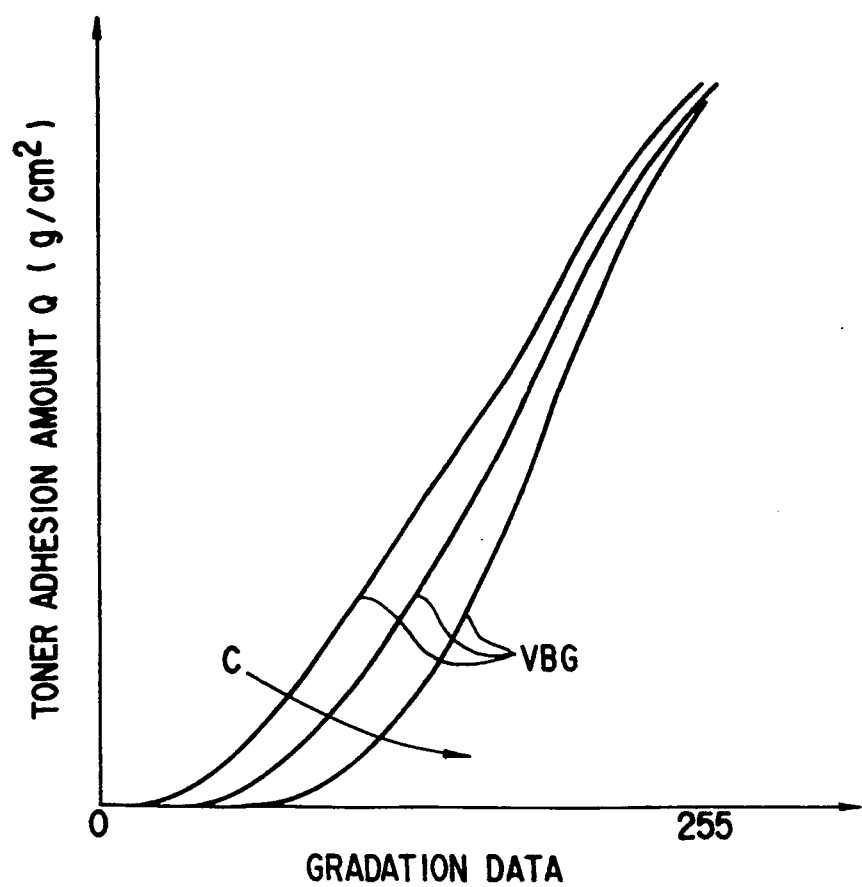
F I G. 9

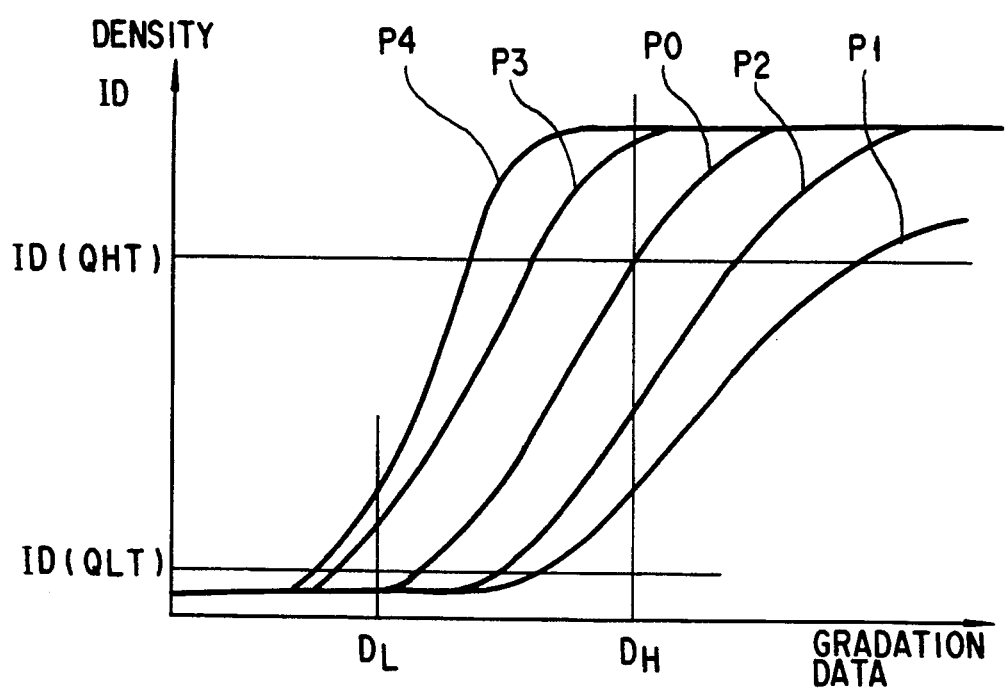
LIGHT AMOUNT : P1 < P2 < P0 < P3 < P4
F I G. 12

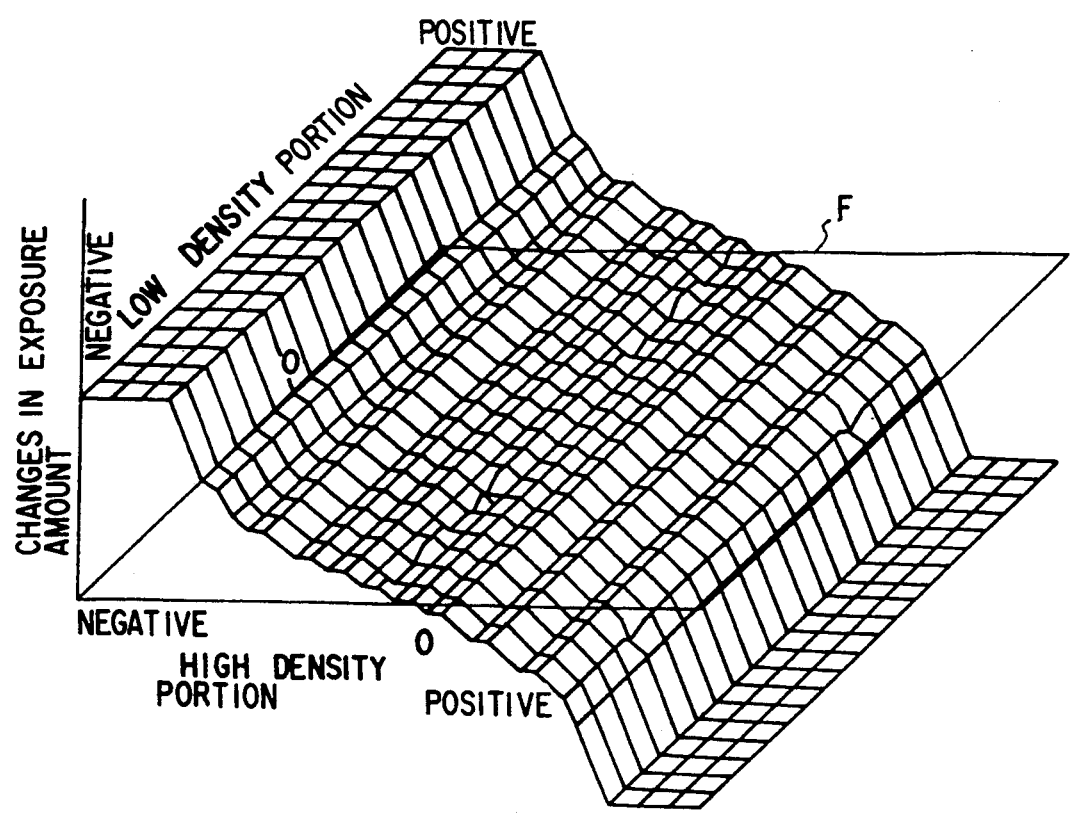
F I G. 15
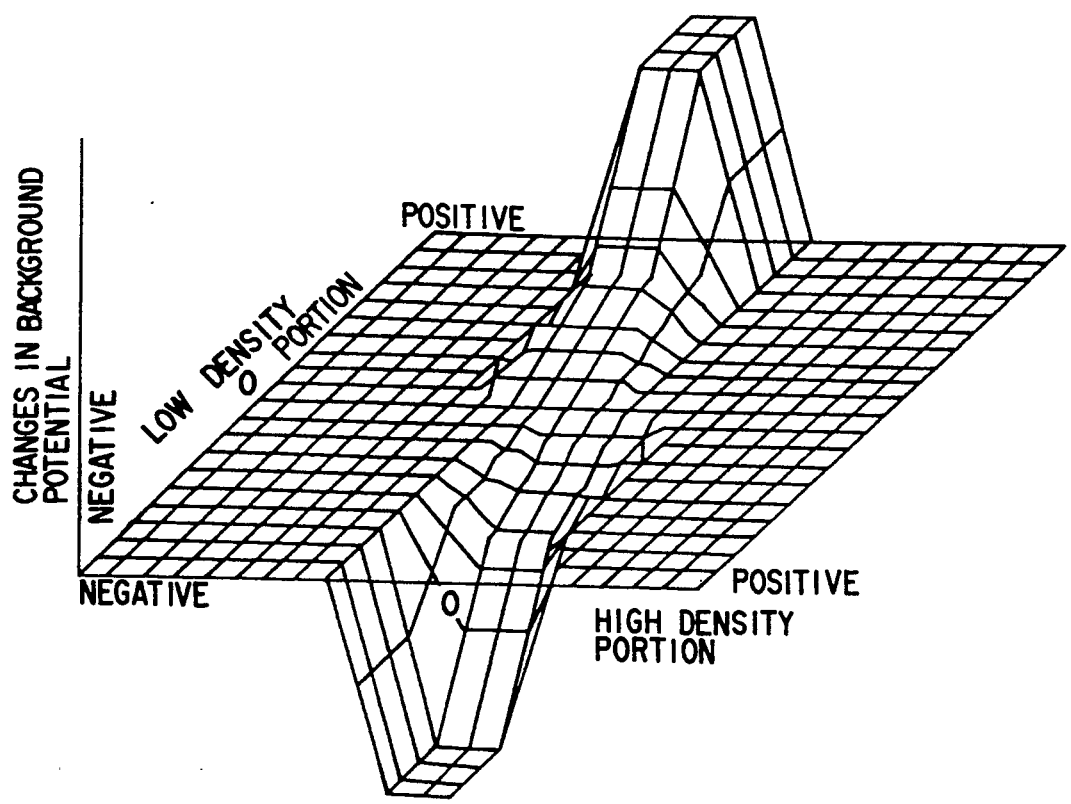
F I G. 16

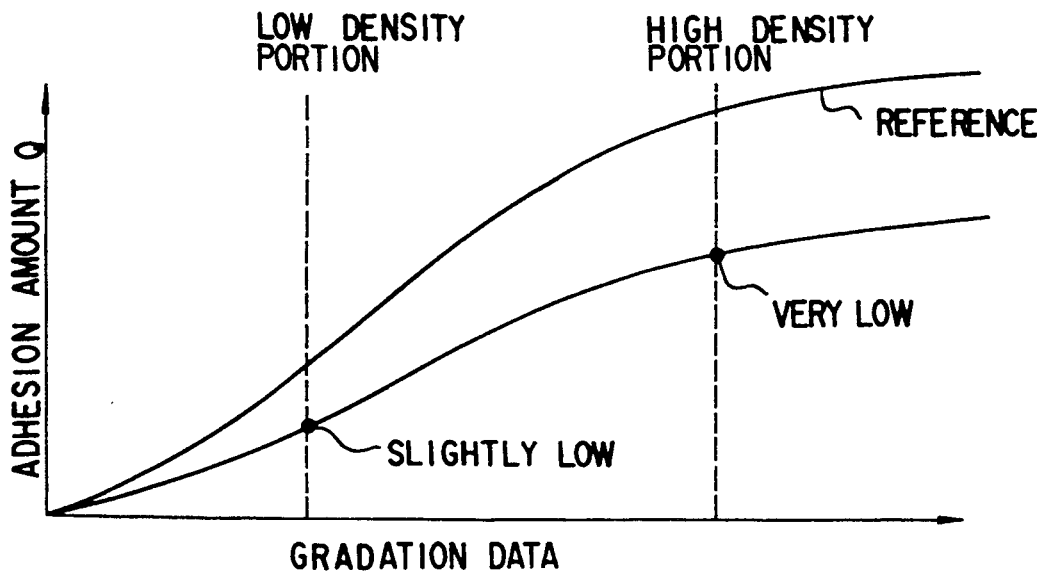
F I G. 17
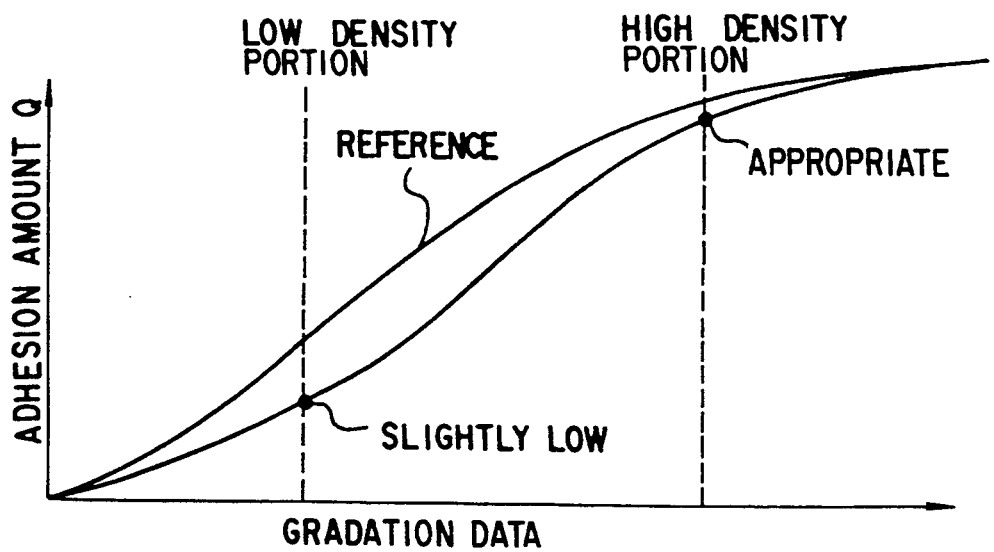
F I G. 18

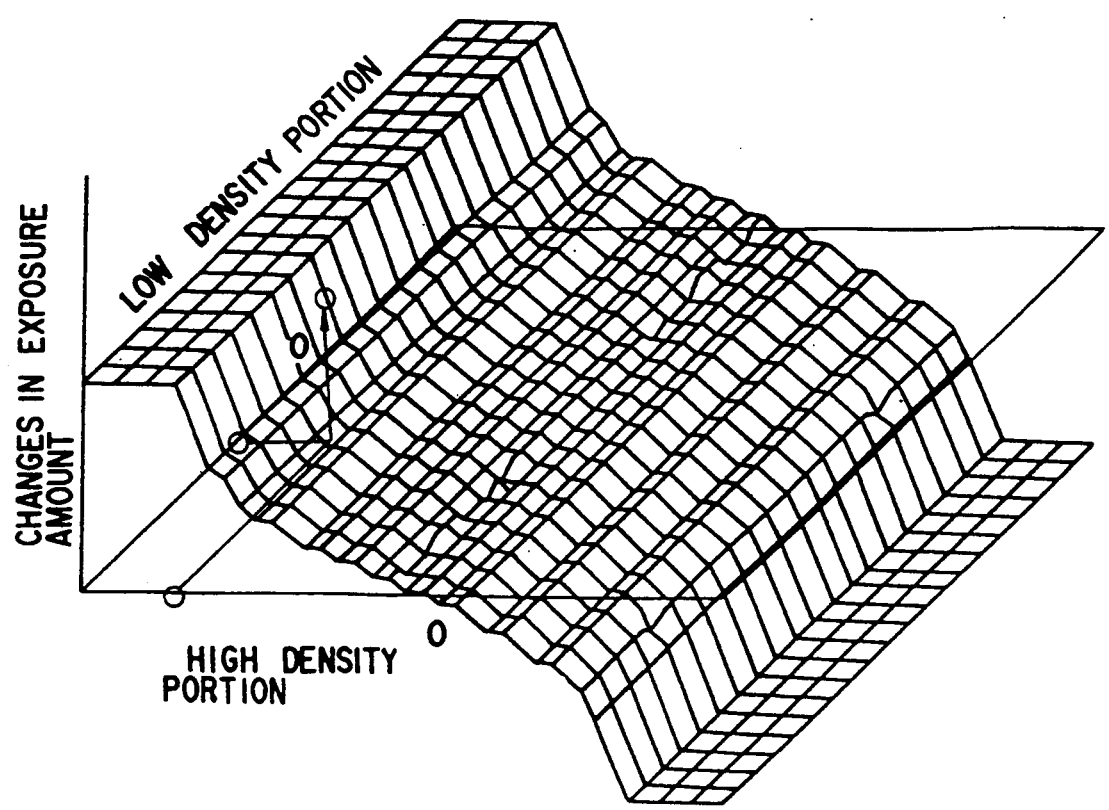
F I G. 19
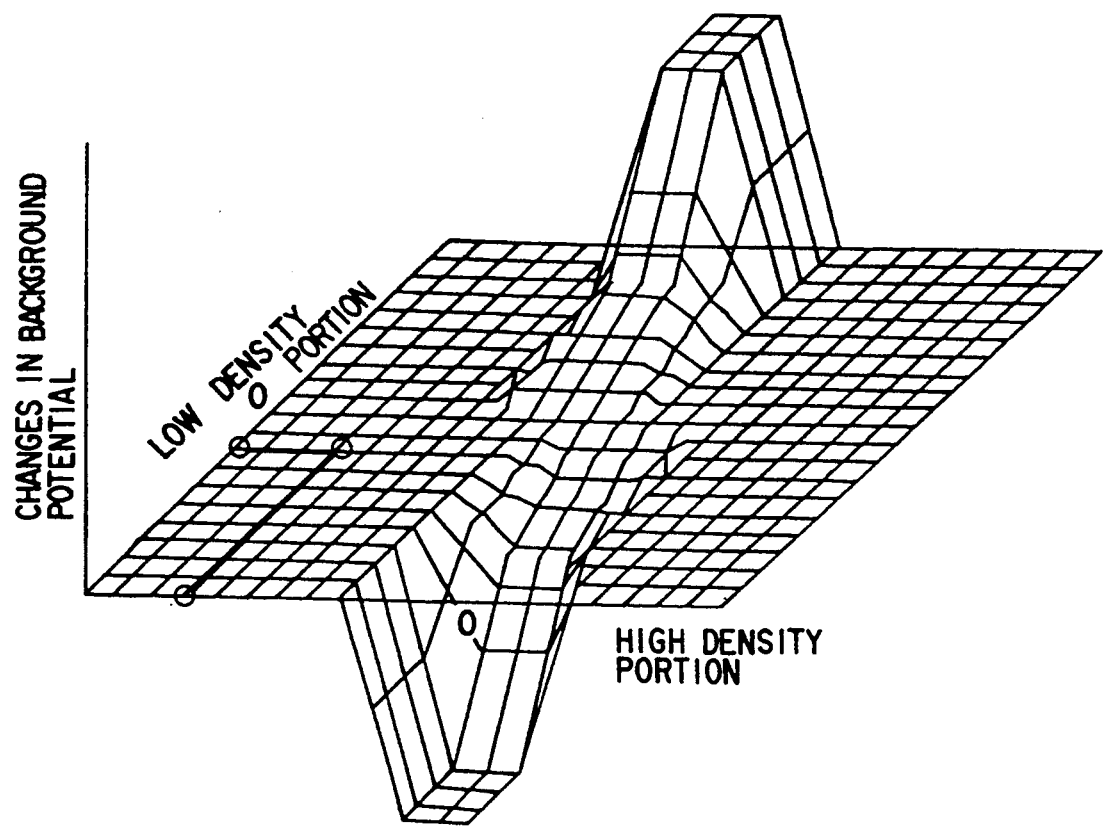
F I G. 20

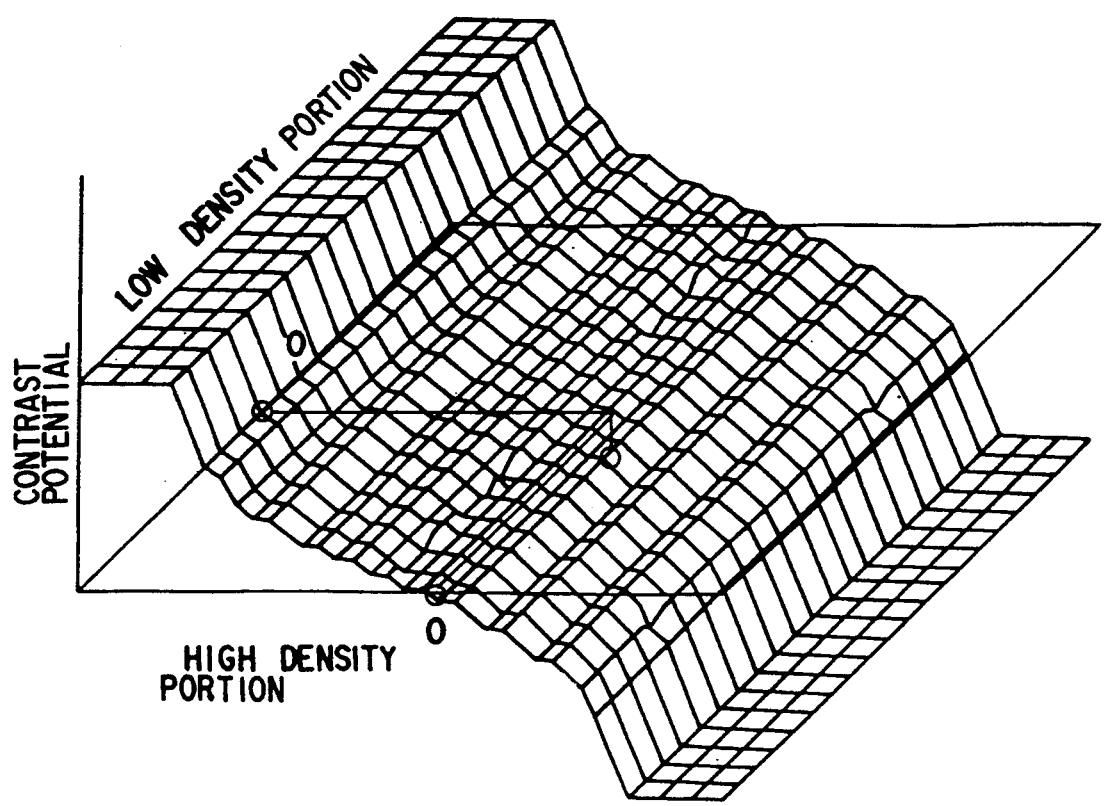
F I G. 21
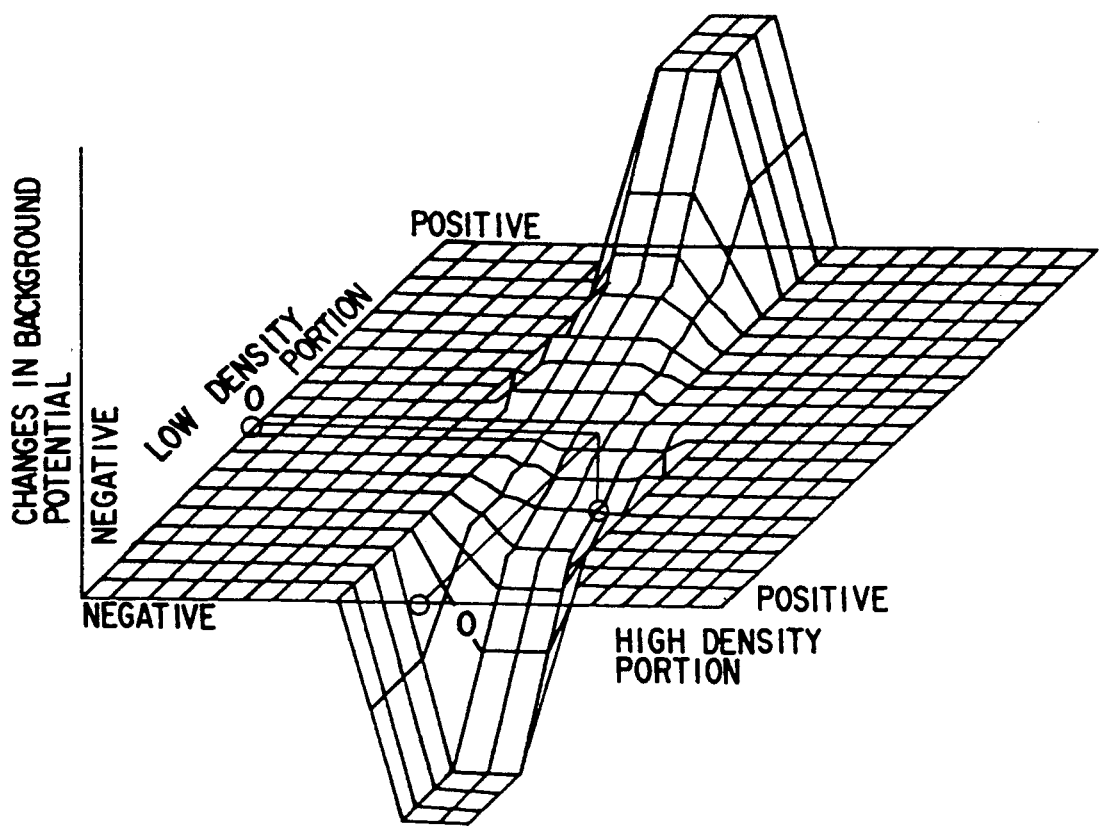
F I G. 22

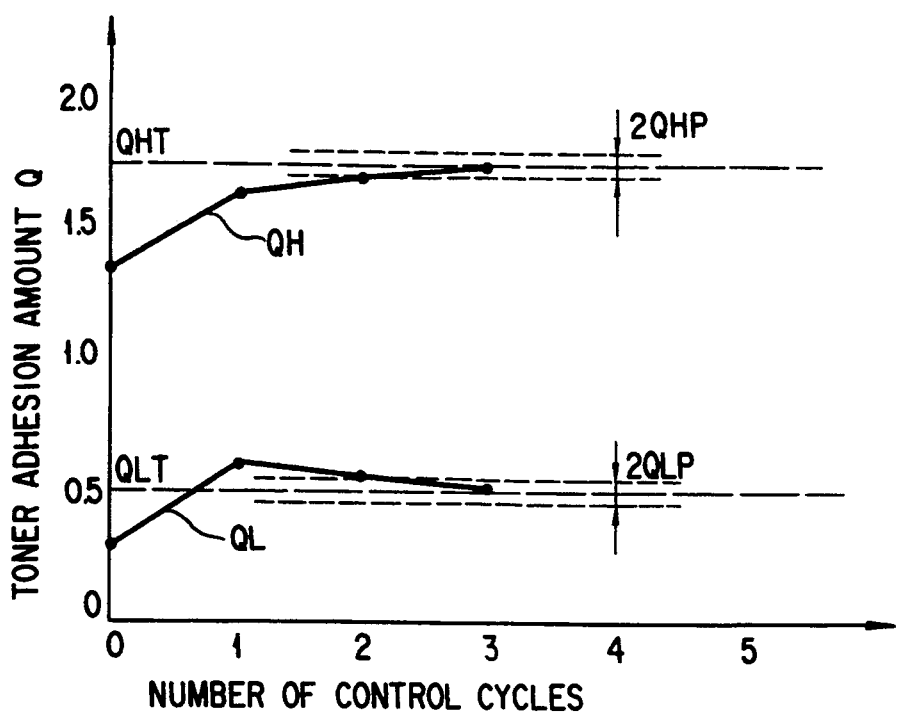
F I G. 23
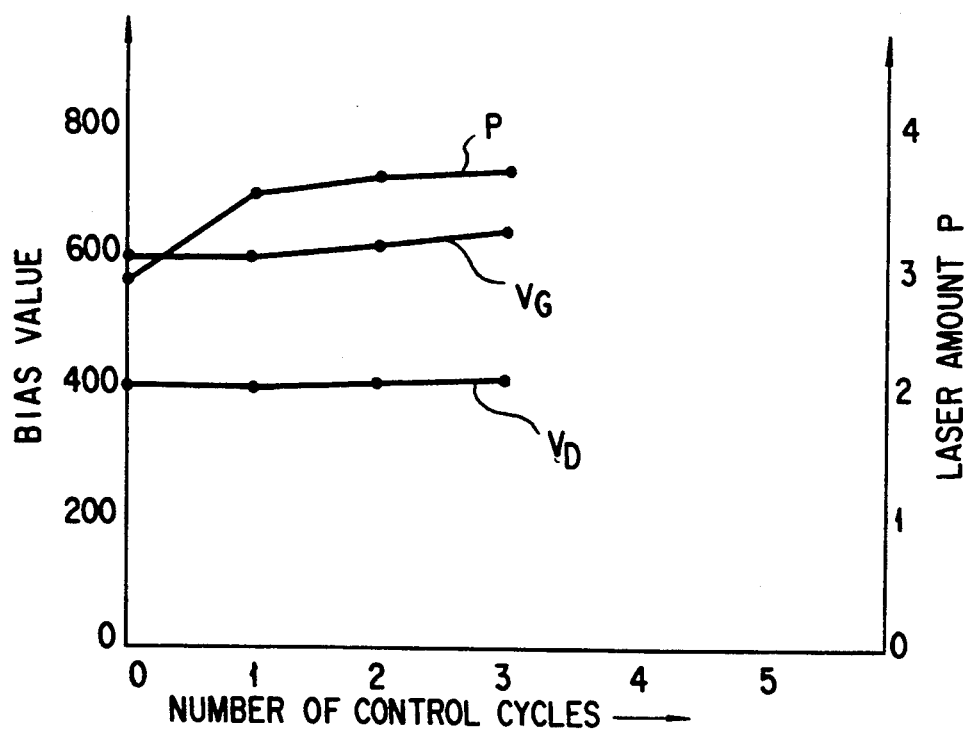
F I G. 24

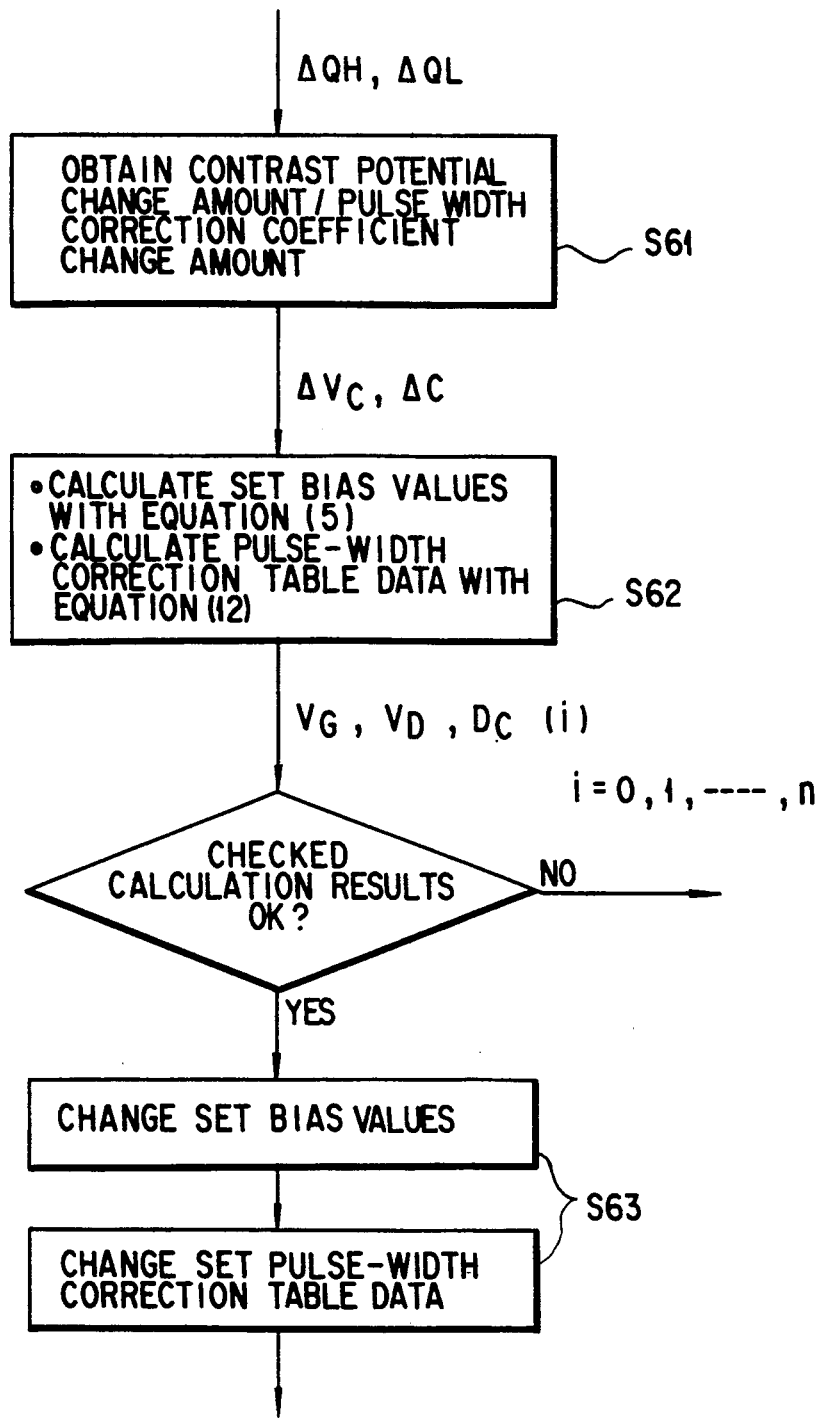
F I G. 25

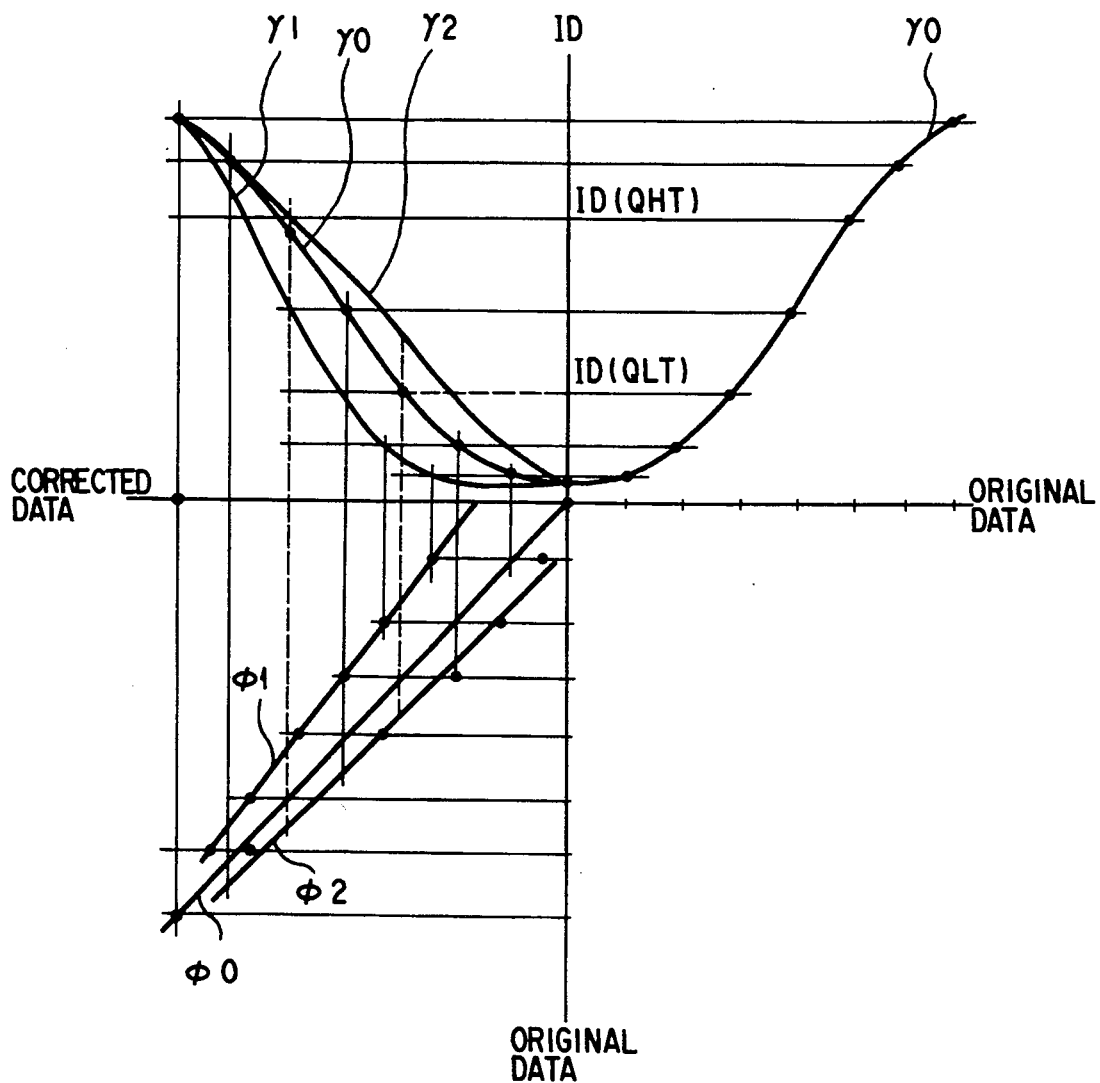
F I G. 27

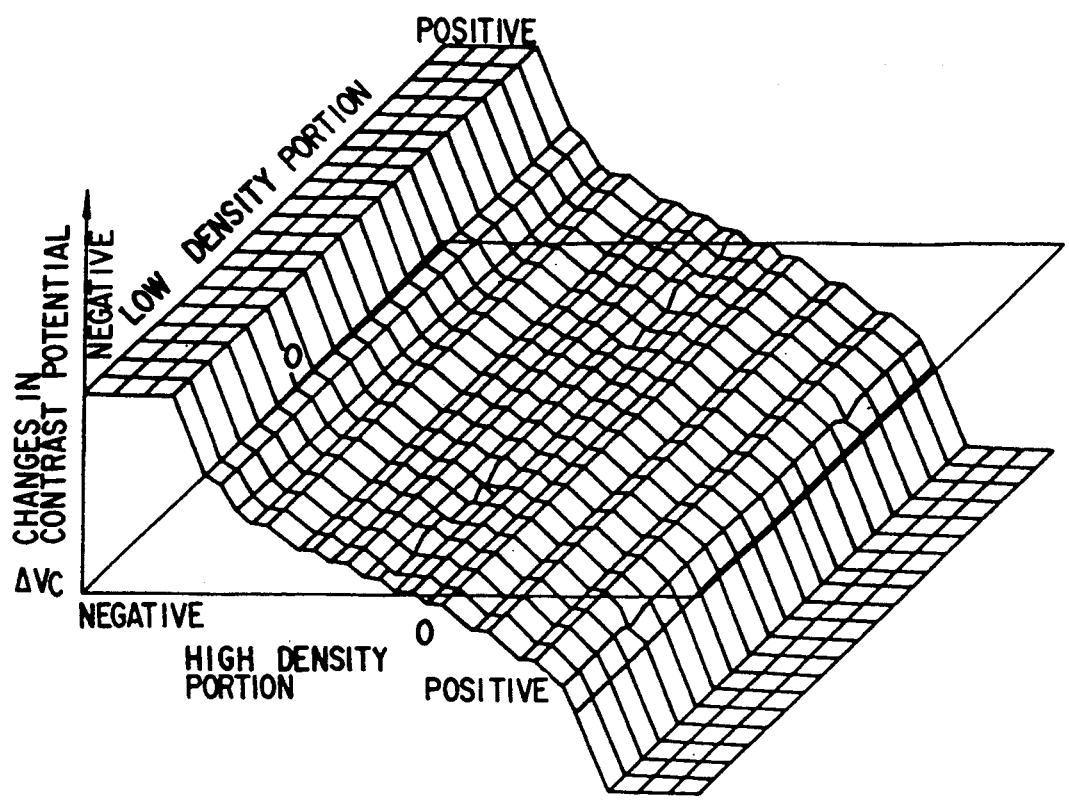
F I G. 29
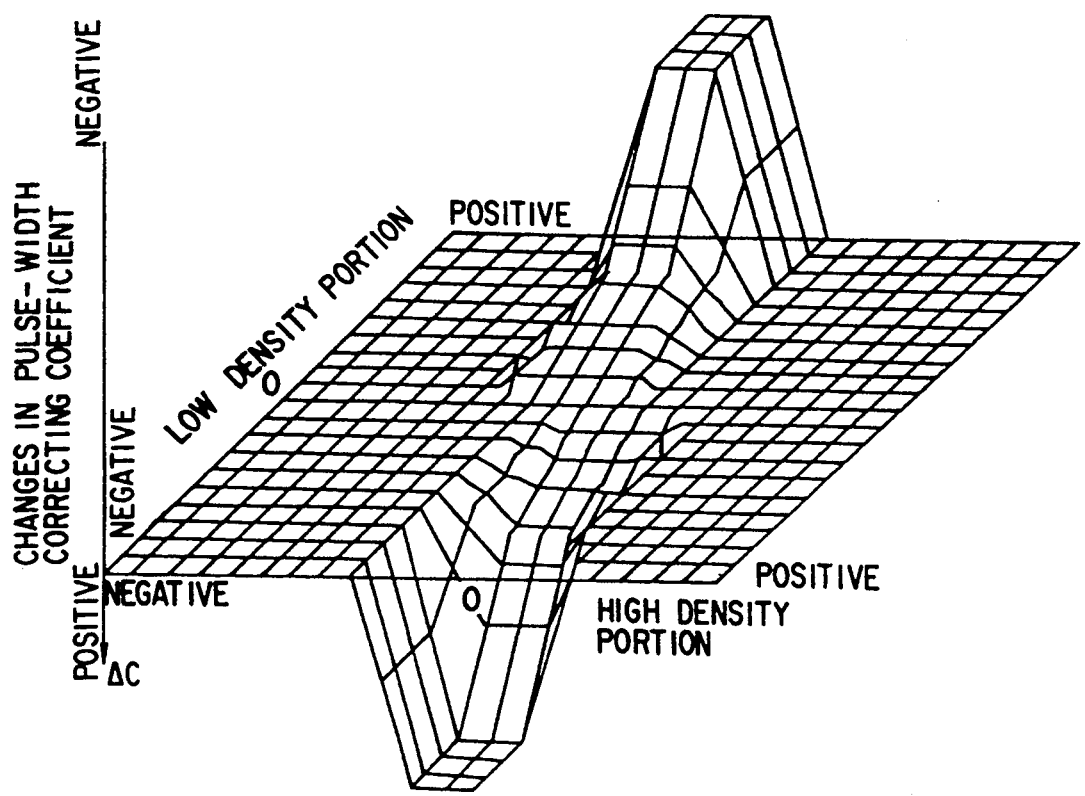
F I G. 30

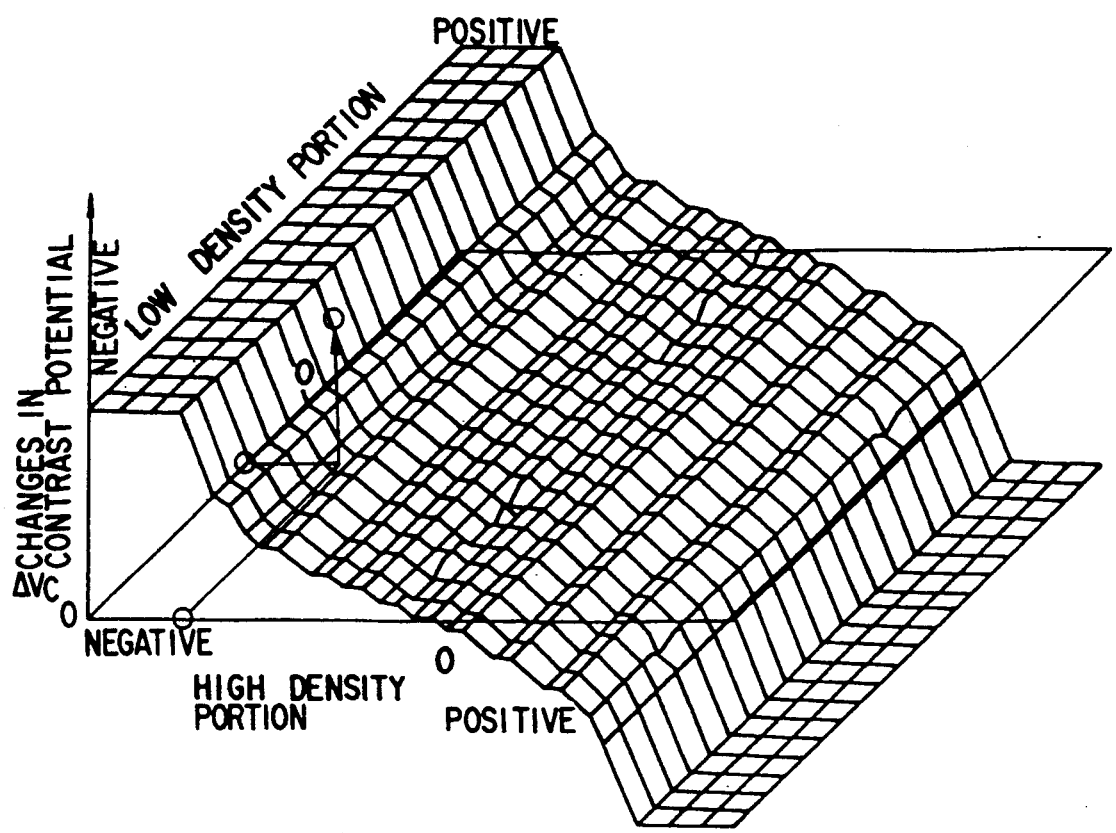
F I G. 31
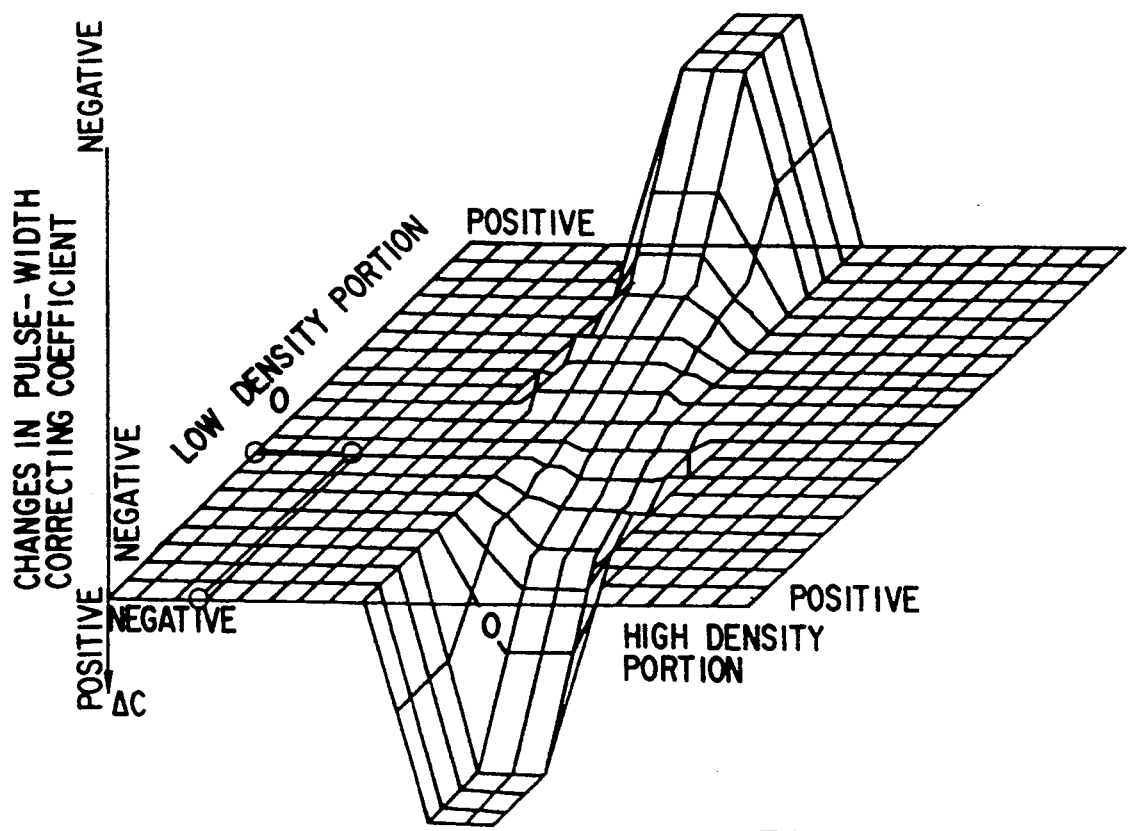
F I G. 32

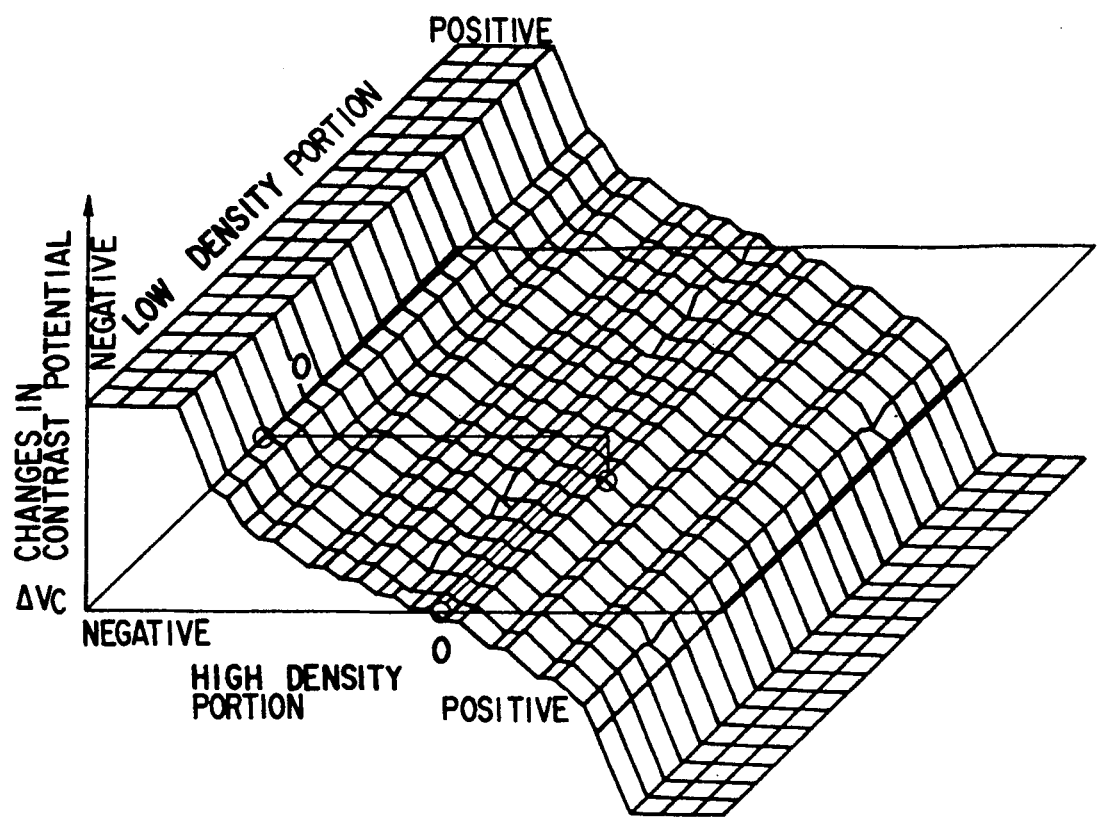
F I G. 33
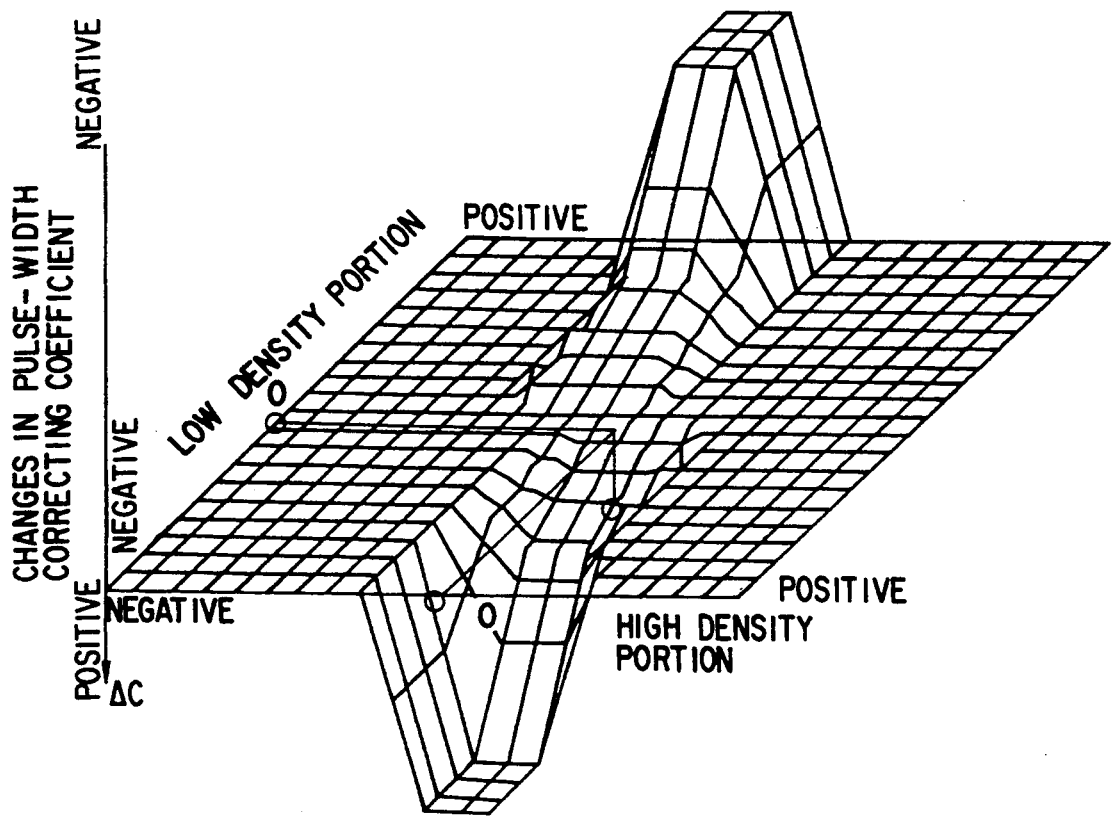
F I G. 34

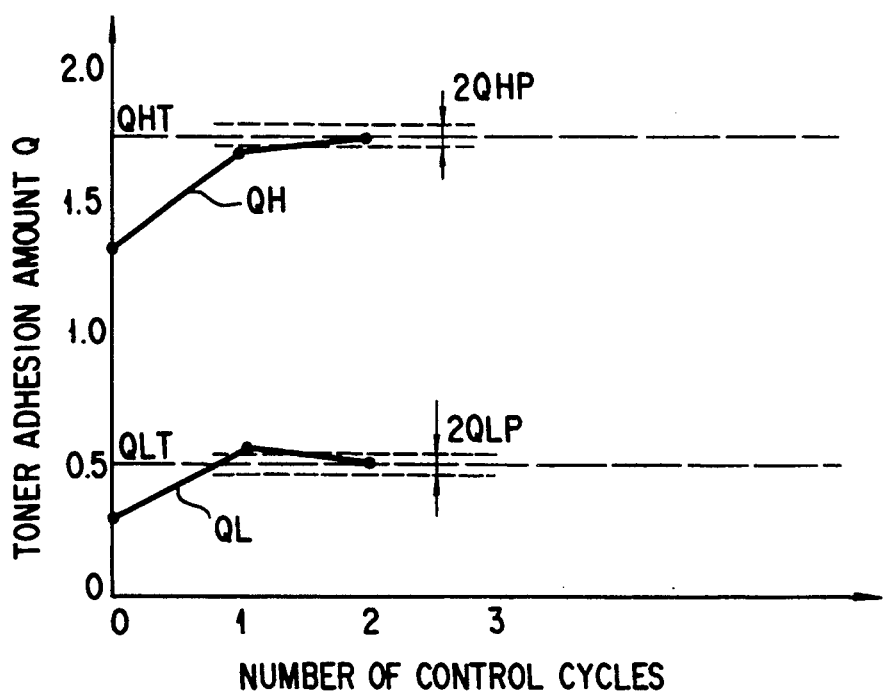
F I G. 35
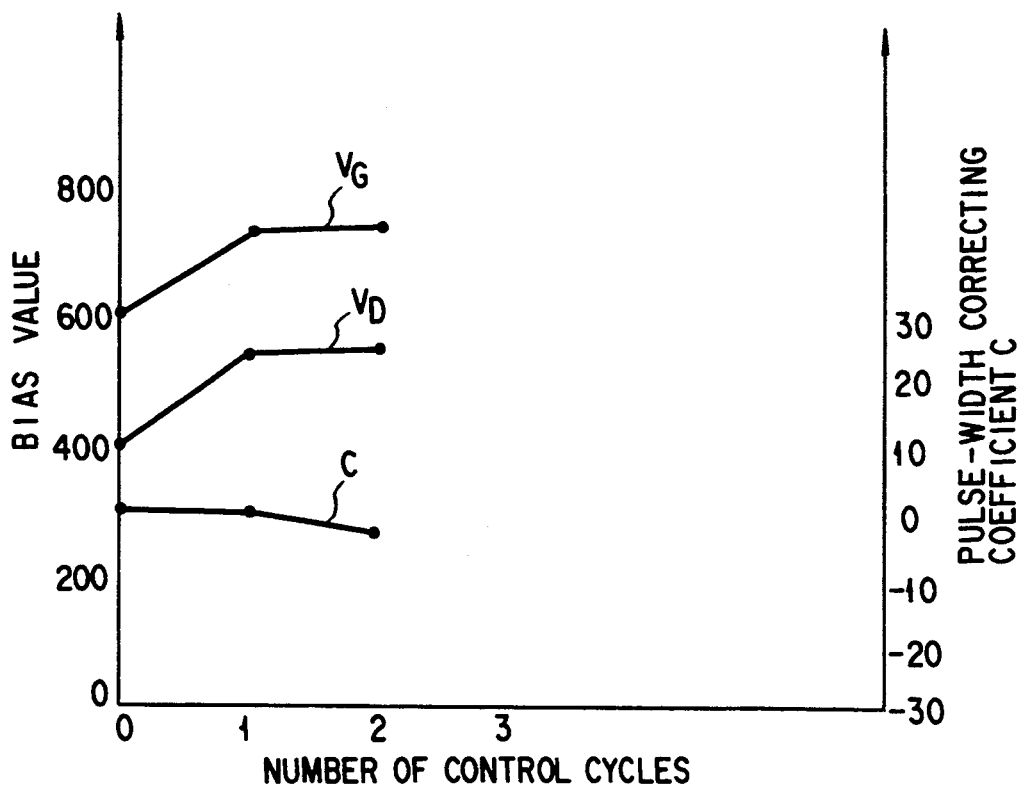
F I G. 36

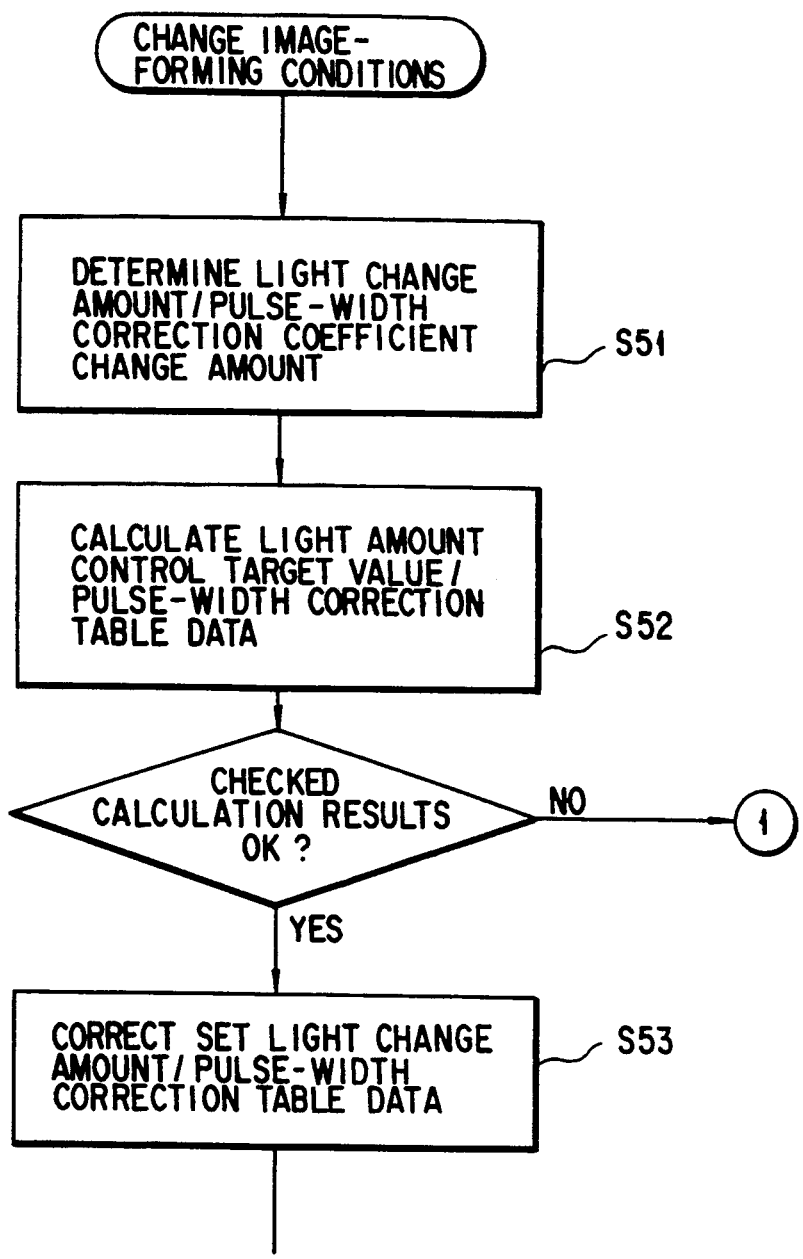
F I G. 37

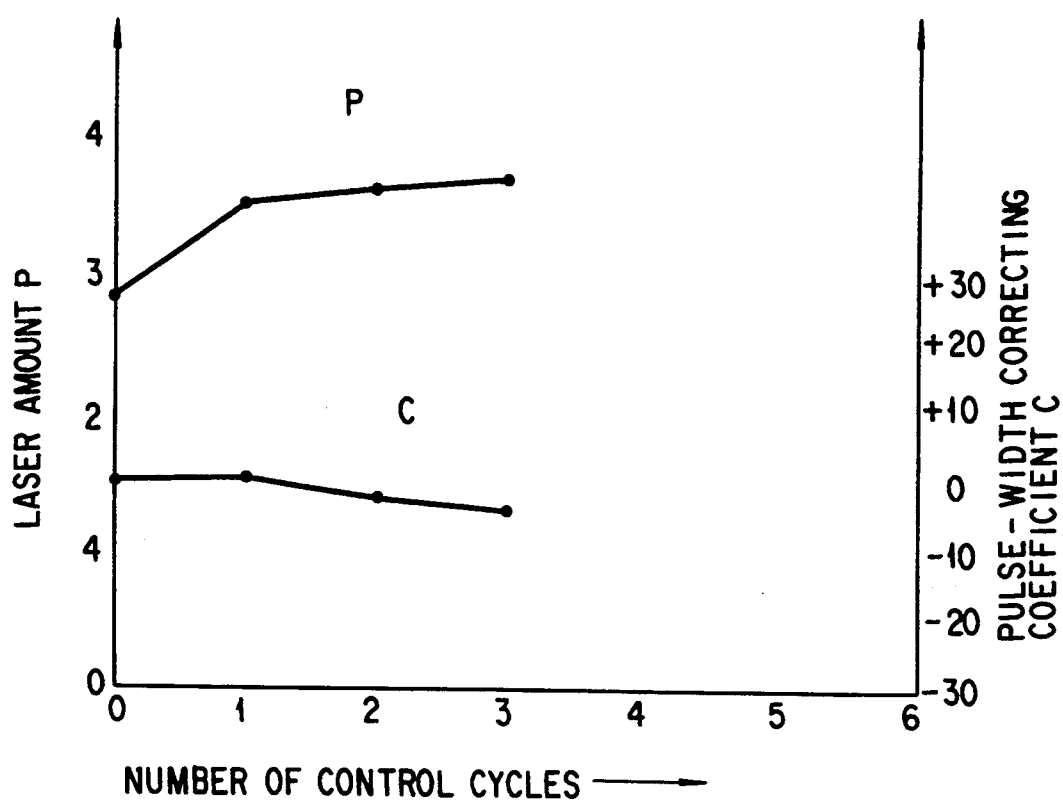
F I G. 38

IMAGE FORMING APPARATUS AND METHOD HAVING IMAGE DENSITY CORRECTING FUNCTION

BACKGROUND OF THE INVENTION

1. Field of the Invention

This invention relates to an electrophotographic image forming apparatus, such as a laser printer, an analog copy machine, or a digital copy machine, for forming a monochrome image or a color image having various densities.

2. Description of the Related Art

Conventional image-copying machines have a drawback in which they sometimes produce copies from a single original having different densities. Such variations in image density results from changes or deterioration of the characteristics of image-forming materials and components, which occur as a result of the influence of ambient conditions over time. In the case of a multigradation printer or digital copy machine, as well as an analog copy machine, it is desirable that variations in image density be kept to a minimum. In particular, stable image density is an indispensable factor in obtaining good color images, since this influences not only density reproductivity but also color reproductivity. Accordingly, stabilization of image density has been achieved by manually performing a maintenance operation by an operator within an allowance imparted to the characteristics of image-forming materials and components, and also to the image-forming process.

However, imparting an allowance to image-forming materials, components, or the process increases the cost of the apparatus, and the manual maintenance causes the increase of the cost and labor. Further, since the image density varies in the course of a cycle which is shorter than the usual maintenance cycle, a stable image density cannot be maintained over a long time period merely by maintenance work.

SUMMARY OF THE INVENTION

It is an object of the invention to provide an image-forming apparatus and method for automatically limiting variation in image density due to various factors and adjusting the image density to an appropriate value during a cycle shorter than a maintenance cycle, wherein the apparatus can be manufactured, operated, and maintained at a lower cost than for conventional image-forming apparatuses.

According to a first aspect of the invention, there is provided an image forming apparatus comprising: means for forming an image on an image carrier, said image corresponding to a high density image and a low density image to be formed with a developing agent including toner under a predetermined image forming condition; means for detecting the amounts of toner attached to the image on the image carrier corresponding to the high density image and the low density image, respectively; means for calculating a first difference value between the amount of toner corresponding to the high density image detected by said detecting means and a first predetermined reference value, and a second difference value between the amount of toner corresponding to the low density image detected by said detecting means and a second predetermined reference value; and means for setting said image forming condition in accordance with said first and second difference values calculated by said calculating means so as to stabilize image density changes of the image formed on said image carrier.

According to a second aspect of the invention, there is provided an image forming apparatus comprising: means for forming a latent image on an image carrier under predetermined exposure conditions, light emission intensity and light emission time width being changed, said latent image corresponding to high and low density image data to be formed; means for developing the latent image formed by said exposure means with a developing agent including toner under predetermined image forming conditions; means for applying a developing bias voltage to said developing means; means for detecting the amounts of toner attached to the image carrier and corresponding to the high and low density images; first calculation means for calculating difference values between those amounts of the toner corresponding to the high and low density images detected by said detecting means and preset target values, respectively; second calculation means for calculating first renewal amount data relating to a renewal amount of a contrast potential corresponding to a difference between the developing bias voltage applied by said applying means and a potential of an exposed portion of the image carrier and second renewal amount data relating to a renewal amount of a background potential which is a difference between the developing bias voltage applied by said applying means and an unexposed-portion potential of the image carrier in accordance with the first and second difference values calculated by said calculating means, when the first and second difference values fall outside of the predetermined ranges; and control means for setting exposure conditions of said forming means in accordance with the first renewal amount data calculated by said second calculating means, the developing bias voltage applied by said applying means being applied in accordance with the second renewal amount data calculated by said second calculating means.

According to a third aspect of the invention, there is provided an image forming apparatus comprising: means for charging an image carrier; first applying means for applying a charging bias voltage to said charging means; exposure means for forming a latent image corresponding to a high density image and a low density image on the basis of image data on the image carrier charged by said charging means, said exposure means being able to change an exposure amount in accordance with target exposure amount data; means for developing the latent image formed by said exposure means with a developing agent including toner under a predetermined image forming condition; means for applying a developing bias voltage to said developing means; means for detecting the amounts of toner attached to the image carrier and corresponding to the high density image and the low density image, respectively; first calculation means for calculating difference values between those amounts of the toner corresponding to the high and low density images detected by said detecting means and preset target values, respectively; second calculation means for calculating first renewal amount data relating to a renewal amount of the exposure amount of the exposure means, and second renewal amount data relating to a renewal amount of a background potential which is a difference between the developing bias voltage applied by said applying means and an unexposed-portion potential of the image carrier in accordance with the first and second difference values calculated by said first calculating means when the difference values fall outside the predetermined ranges; first control means for setting a target exposure amount data in accordance with the first renewal amount data calculated by said second calculating means; and second control means for setting the charging bias voltage applied by said first applying means and the developing bias voltage applied by said second applying means on the basis of the second renewal amount data and a surface-potential characteristics of the image carrier.

According to a fourth aspect of the invention, there is provided an image forming apparatus comprising: charging means for charging an image carrier; exposure means for forming a latent image corresponding to a high density image and a low density image on the basis of image data on the image carrier charged by said charging means; means for developing the latent image formed by said exposure means with a developing agent including toner under a predetermined image forming condition; means for applying a developing bias voltage to said developing means; means for detecting the amounts of toner attached to the image carrier and corresponding to the high density image and the low density image, respectively; means for setting light-emission width data in accordance with a time period for which light is radiated corresponding to gradation data per unit pixel of said image data to be formed; means for performing modulation control of the unit-pixel pulse width of light emitted from said exposure means in accordance with the light-emission period data set by said setting means; first calculation means for calculating difference values between those amounts of the toner attached to the high and low density images detected by said detecting means and preset target values, respectively; second calculation means for calculating first renewal amount data relating to renewal of a contrast potential corresponding to a difference between the developing bias voltage applied by said applying means and potential of an exposed portion of the image carrier and second renewal amount data relating to light-emission time width renewal in accordance with the first and second difference values calculated by said first calculating means, when the first and second difference values fall outside the predetermined ranges; and first control means for setting a charging bias voltage applied to the charging means and a developing bias voltage applied to the developing means in accordance with the first renewal amount data obtained by said second calculating means and surface potential characteristics of the image carrier; and second control means for setting and a light emission period correction data according to the second renewal amount data.

According to a fifth aspect of the invention, there is provided an image forming apparatus comprising: exposure means for forming a latent image corresponding to a high density image and a low density image on the basis of image data to be formed on an image carrier, said exposure means being capable of changing an exposure amount on the basis of target light amount data; means for developing the latent image formed by said exposure means with a developing agent including toner under a predetermined image forming condition; means for applying a developing bias voltage to said developing means; means for detecting amounts of toner attached to the image carrier corresponding to the high density image and the low density image, respectively; means for setting light-emission width data in accordance with a time period for which light is radiated corresponding to gradation data per unit pixel of said image data to be formed; means for performing modulation control of the unit-pixel pulse width of light emitted from said exposure means on the basis of the light-emission period data set by said setting means; first calculation means for calculating difference values between those amounts of the toner corresponding to the high and low density images detected by said detecting means and preset target values, respectively; second calculation means for calculating first renewal amount data relating to light renewal amount and second renewal amount data relating to light-emission period correction renewal; first control means for setting target light amount data on the basis of the first renewal amount data calculated by said second calculating means; and second control means for setting light-emission period correction data based on the second renewal amount data.

According to a sixth aspect of the invention, there is provided an image forming apparatus comprising: means for generating high and low density test pattern data; means for forming a latent image on an image carrier corresponding to the high and low density test pattern data, said forming means being capable of changing an exposure amount on the basis of target exposure amount data; means for developing the latent image corresponding to the high and low density test pattern data formed by said forming means with a developing agent including toner under a predetermined image forming condition; means for detecting amounts of the toner attached to the image carrier corresponding to the latent image of the high and low density test pattern data developed by the developing means on the image carrier, respectively; means for setting a light-emission width data in accordance with a time period for which light is radiated in accordance with gradation data per unit pixel of said image data to be formed; means for performing modulation control of the unit-pixel pulse width of light emitted from said forming means on the basis of the light-emission period data set by said setting means; first calculation means for calculating difference values between those amounts of the toner corresponding to the high and low density images detected by said detecting means and preset target values, respectively; second calculation means for calculating first renewal amount data relating to light renewal amount, and second renewal amount data relating to light-emission period correction renewal in accordance with the first and second difference values calculated by said first calculating means when the first and second difference values fall outside the predetermined ranges; first control means for setting target light amount data on the basis of the first renewal amount data calculated by said second calculation means; and second control means for setting the light-emission period correction data based on the second renewal amount data.

According to a seventh aspect of the invention, there is provided an image forming apparatus comprising: means for forming an image on an image carrier, said forming means including charging means for charging said image carrier, first applying means for applying a charging bias voltage to said first applying means, generation means for generating high density test pattern data and a low density test pattern data and means for exposing a light on said charged image carrier to form the latent image on the basis of the high and low density test patterns data on said image carrier; means for developing the latent image formed by said forming means with a developing agent including toner under a predetermined image forming condition; second applying means for applying a developing bias voltage to said developing means; means for holding a determined contrast voltage, based on an exposed-portion potential and the developing bias voltage and a determined background voltage based on an unexposed-portion potential and the developing bias voltage, the contrast voltage and background voltage being determined at the time of forming, on the image carrier, the electrostatic latent images corresponding to the test pattern data; means for detecting amounts of the toner attached to the image carrier corresponding to a high density test pattern and a low density test pattern developed by the developing means on the image carrier, respectively; setting means for setting first and second toner amount target values corresponding to the high and low density test patterns; first calculation means for calculating a first difference value between the amount of the toner corresponding to the high density test pattern detected by said detecting means and the corresponding first target value set by the setting means, and a second difference value between the amount of the toner corresponding to the low density test pattern detected by said detecting means and the second target value set by said setting means; means for determining whether or not the differences fall within predetermined ranges, respectively; means for storing those renewal amounts of the contrast voltage and the background voltage, which correspond to the differences, respectively; means for extracting those renewal amounts of the contrast voltage and the background voltage, which correspond to the differences, when the determination means determines that the differences fall outside the predetermined ranges; second calculation means for calculating a charging bias voltage and a developing bias voltage corresponding to the renewal amounts of the contrast voltage and the background voltage; and renewal means for renewing the charging bias voltage and developing bias voltage applied by the first and second applying means, by use of the charging bias voltage and the developing bias voltage calculated by said second calculation means, the contrast voltage and background voltage stored in the holding means at the time of forming the test patterns, and prestored surface potential characteristics.

According to the image forming method of the invention, the process comprises the steps of: charging an image carrier by a charging electrode; generating high and low density test pattern data; forming latent images on the charged image carrier on the basis of the high and low test pattern data; developing the latent images on the image carrier; detecting attached amounts of a toner corresponding to the developed high and low test patterns; calculating high and low density image difference values between the amounts of toner corresponding to the high and low density images and target values, respectively; determining whether or not the high and low density portion difference fall within predetermined ranges, respectively; setting those renewal amounts of a contrast voltage and a background voltage which correspond to the high and low density image difference values, respectively, when at least one of the high and low density image difference values falls outside its predetermined range; calculating a charging bias voltage and a developing bias voltage corresponding to the set renewal amounts of the contrast voltage and the background voltage; and renewing the charging bias voltage and the developing bias voltage in accordance with the calculated charging bias voltage and developing bias voltage.

Thus, changing the potential relationship to maintain the gradation characteristics during development can provide the effect of maintaining the gradation characteristics substantially at initial values irrespective of variation of developing characteristics due to a change of ambient conditions with time.

Further, combination of changing the potential relationship by bias value renewal and changing the exposure amount and the pulse-width correction characteristics can minimize bias renewal amounts, prevent an image defect of fog from occurring as a result of changing the image forming conditions, and maintain the gradation characteristics at appropriate values from the high density area to the low density area. Moreover, since renewal amounts are calculated on the basis of set values detected at the time of measurement, the steady-state deviation can be minimized by repeating the control.

Accordingly, image quality can be maintained free from an image defect and identical to the initial quality, and variation in image density due to changes in ambient conditions with the lapse of time can be minimized without maintenance work in a cycle shorter than a maintenance cycle, thereby highly stabilizing the image density. In addition, the apparatus can be manufactured at low cost, and be maintained at low labor cost.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 3 is a perspective view, useful in explaining the relation between a high-density image developed on a photosensitive drum and corresponding to high-density gradation data, a low-density image developed on the same and corresponding to low-density gradation data, and a toner-amount measuring section;

FIG. 4 is a block diagram, showing the structure of the toner-amount measuring section;

FIG. 6 is a graph, showing the relation between the grid bias voltage of a charger, and the unexposed-portion potential, exposed-portion potential, and developing bias voltage of a photosensitive drum;

FIG. 7 shows the relation between the contrast potential and the image density of a solid black portion;

FIG. 8 shows the relation between the unexposed-portion potential, low density portion potential, and developing bias voltage of the photosensitive drum;

FIG. 9 shows a toner adhesion amount in relation to the gradation data, obtained when a background potential is increased;

FIG. 12 shows the relation between the gradation data and the output image density, for explaining the effects of light amount renewal;

FIG. 15 shows the contents of a table as regards exposure renewal amounts;

FIG. 16 shows the contents of a table as regards renewal amounts of the background potential;

FIG. 17 shows variation in the toner adhesion amounts of high and low density images and the gradation characteristics;

FIG. 18 shows variation in the gradation characteristics, similar to FIG. 17;

FIG. 19 shows the contents of a table as regards the exposure renewal amount;

FIG. 20 shows the contents of a table as regards renewal amounts of the background potential;

FIG. 21 shows the contents of a table as regards renewal amounts of a contrast potential;

FIG. 22 shows the contents of a table as regards renewal amounts of the background potential;

FIG. 23 is a graph, useful in explaining changes in toner adhesion amount, which are input to a measuring system during control cycles;

FIG. 24 is a graph, useful in explaining changes in bias values, which are input to a measuring system during control cycles;

FIG. 25 is a flowchart, useful in chiefly explaining image-forming condition-changing processing according to a second embodiment of the invention;

FIG. 27 shows the relation between pulse-width correction characteristics and gradation characteristics;

FIG. 29 shows the contents of a table as regards renewal amounts of the contrast potential;

FIG. 30 shows the contents of a table as regards renewal amounts of a pulse width correction coefficient;

FIG. 31 shows the contents of a table as regards renewal amounts of the contrast potential;

FIG. 32 shows the contents of a table as regards renewal amounts of the pulse width correction coefficient;

FIG. 33 shows the contents of a table as regards renewal amounts of the contrast potential;

FIG. 34 shows the contents of a table as regards renewal amounts of the pulse width correction coefficients;

FIG. 35 is a graph, useful in explaining changes in toner adhesion amount, which are input to a measuring system during control cycles;

FIG. 36 is a graph, useful in explaining changes in bias value, which are input to a measuring system during control cycles;

FIG. 37 is a flowchart, chiefly useful in explaining image-forming condition-changing processing according to a third embodiment of the invention;

FIG. 38 is a view, useful in explaining variation in laser light amount and the pulse width correction coefficient as image forming conditions during control cycles;

DETAILED DESCRIPTION OF THE PREFERRED EMBODIMENTS

The embodiments of the invention will be explained in detail with reference to the accompanying drawings.

Figure 1:
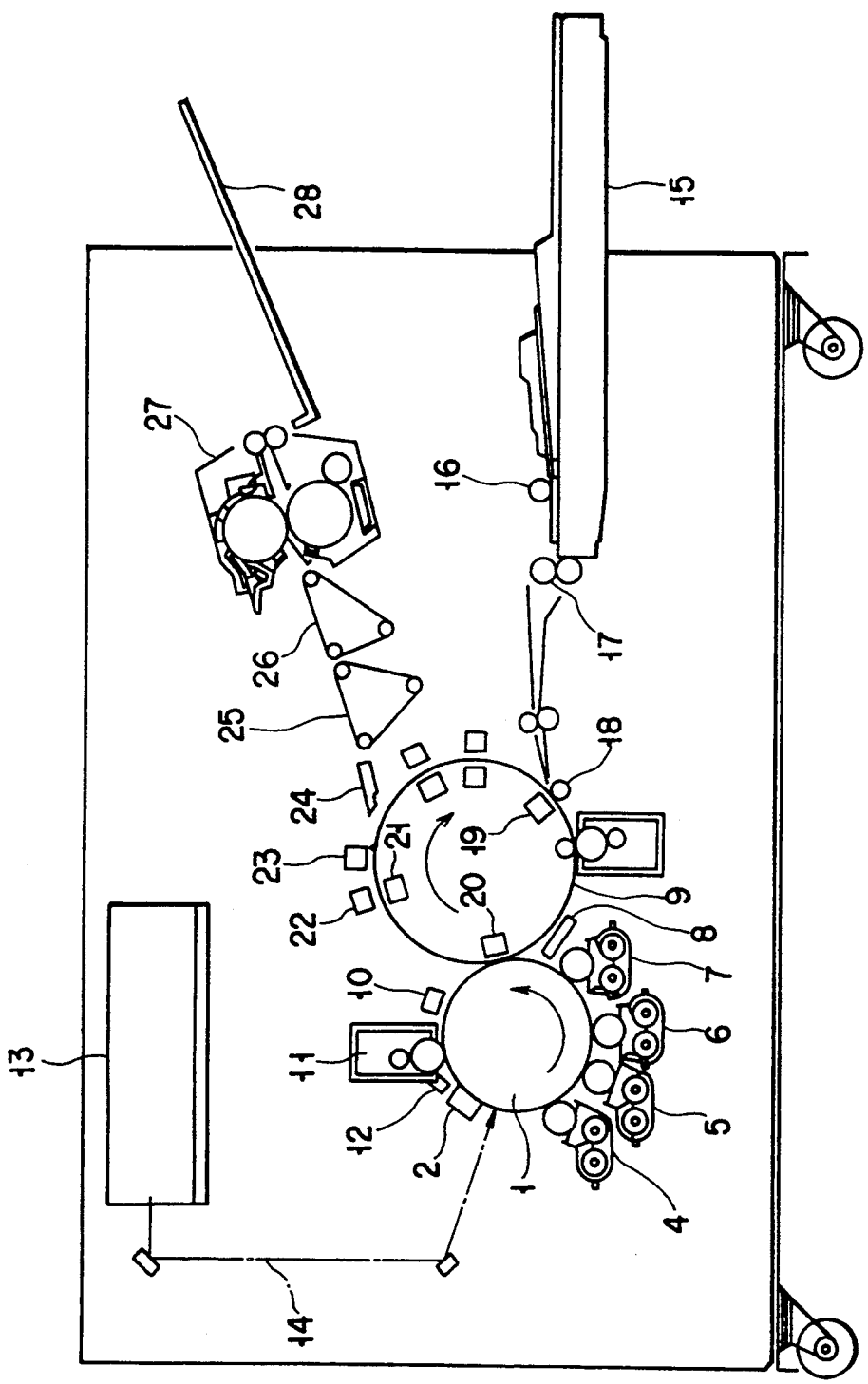
FIG. 1 is a schematic sectional view, showing a color laser printer according to a first embodiment of the invention.

FIG. 1 is a schematic front view, showing a color laser printer as an image-forming apparatus according to the first embodiment of the invention. As is shown in FIG. 1, a photosensitive drum 2 functioning as an image carrier and rotatable in a counterclockwise direction (as indicated by arrow A) is provided in the substantially central portion of a casing 1. Around the drum 2 in its rotational direction, are a charger 3, as a charging means, first through fourth developer units 4, 5, 6 and 7, as color developing means, a toner adhesion amount measuring unit 8, a transfer drum 9, as a transfer-medium supporting member rotatable in a direction indicated by arrow B, a discharger 10, a cleaner 11 and a discharging lamp 12, all in the order mentioned.

While the photosensitive drum 2 is rotated in the direction indicated by arrow A, it is uniformly charged by the charger 3. A laser beam 14, modulated by image data and output from an optical system 13 functioning as an exposure means, is radiated to the surface of the drum 2 through the charger 3 and first developer unit 4, thereby exposing the surface of the drum 2 to form an electrostatic latent image thereon.

The first through fourth developer units 4 to 7 are provided to visualize the electrostatic latent image on the drum 2 as a color toner image. These developer units develop, for example, Magenta, cyanogen, yellow, and black color toners, respectively.

A transfer paper sheet to be used as transfer medium is fed from a sheet supply cassette 15 by means of a sheet supply roller 16, then regulated and guided by a register roller 17 to the transfer drum 9 such that the sheet is adhered to a predetermined portion of the drum 9, and then electrostatically held on the drum 9 between an attraction roller 18 and an attraction charger 19. The transfer paper sheet is guided in accordance with clockwise (indicated by arrow B) rotation of the drum 9 while it is electrostatically held thereon.

The toner image developed on the photosensitive drum 2 is transferred onto the transfer paper sheet by means of a transfer charger 20 in a position wherein the photosensitive drum 2 contacts the transfer drum 9. In the case of forming a multi-colored image, toner images of different colors are transferred onto a single paper sheet by sequentially developing each color toner thereon in a cycle corresponding to one rotation of the transfer drum 9.

The toner image-transferred sheet is further moved in accordance with rotation of the transfer drum 9, and then discharged by a pre-separation inner discharger 21, a pre-separation outer discharger 22, and a separating discharger 23. Subsequently, the sheet is removed from the drum 9 by a removing claw 24, and guided to a fixing unit 27 by conveyer belts 25 and 26. The sheet is heated by the fixing unit 27, thereby melting the toners on the sheet. The melted toners are fixed on the sheet when the sheet is discharged from the fixing unit 27. The toner-fixed sheet is discharged into a discharged-sheet tray 28.

Figure 2:
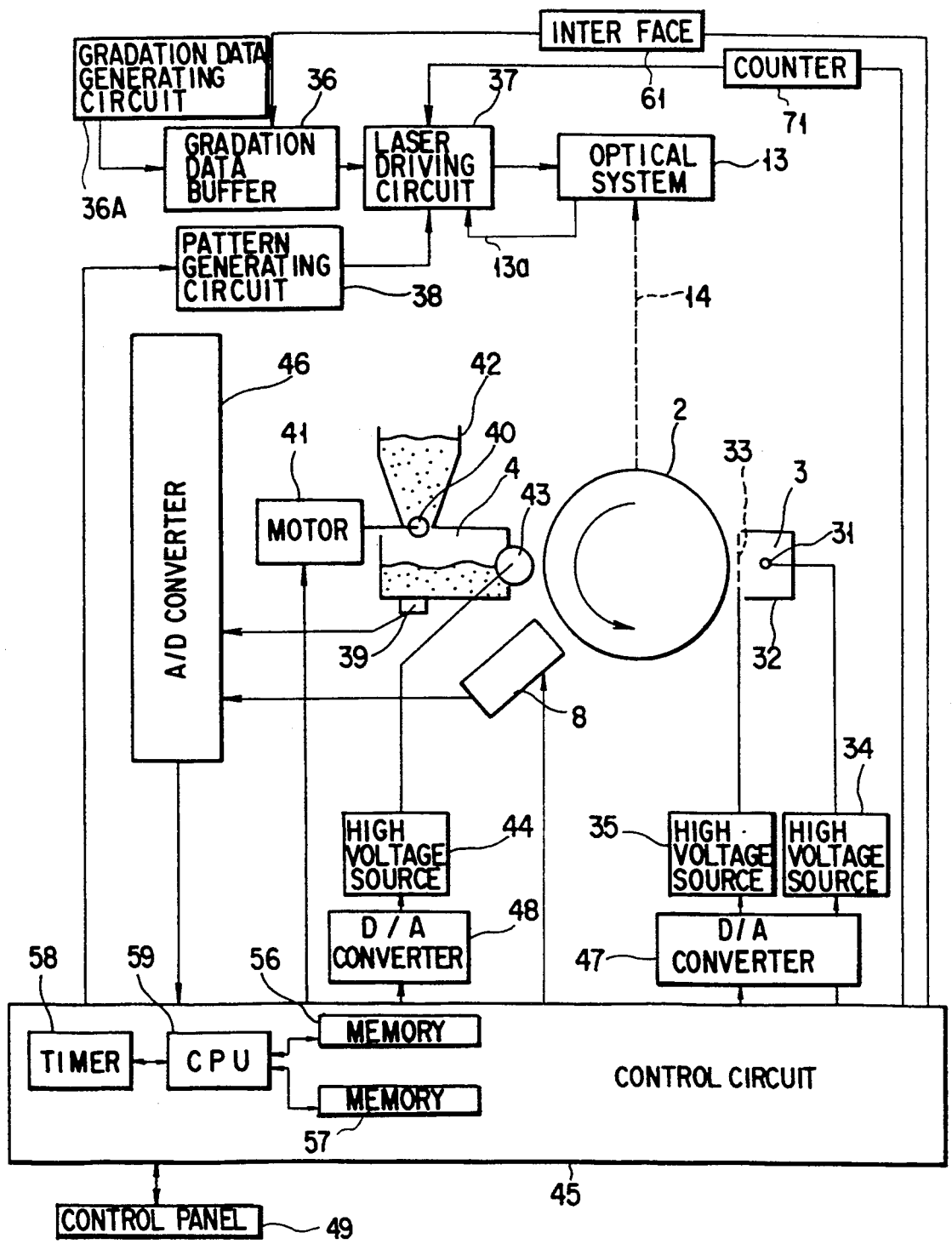
FIG. 2 is a block diagram, showing charge, exposure, and developing means, and control means for controlling them, which are employed in the color printer of FIG. 1.

FIG. 2 is a block diagram, showing charge, exposure, and developing means, and control means for controlling them, which are employed in the color printer of FIG. 1. As is shown in FIG. 2, the charger 3 located adjacent to the photosensitive drum 2 mainly comprises a charging wire 31, a conductive case 32 and a grid electrode 33. The charging wire 31 is connected to a high voltage power source 34 for causing a corona discharge to charge the photosensitive drum 2 with electricity. The grid electrode 33 is connected to a grid-biasing high voltage source 35, and the grid bias voltage determines the amount of charge on the photosensitive drum 2.

The high voltage sources 34 and 35 are connected via a D/A converter 47 to a control circuit 45 for controlling the output voltage. The control circuit 45, hereinafter described in detail, mainly comprises memory sections 56 and 57, a timer 58 and a CPU 59.

The drum 2, uniformly charged by the charger 3, exposed by the laser beam 14 output from the optical system 13 and modulated by data on an image to be formed, has an electrostatic latent image corresponding to the image. A gradation data buffer 36 stores gradation data from an external device (not shown) or a gradation data generator 36A, corrects the gradation characteristics of the printer under the control of the control circuit 45, thereby obtaining data indicative of a laser exposing period (pulse width), and supplies the pulse width data to a laser driving circuit 37.

Under control of the control circuit 45, the laser driving circuit 37 modulates a laser driving current (i.e., a light emission period) in accordance with the laser exposure period data supplied from the gradation data buffer 36, so as to synchronize with the scanning position of the laser beam 14. The modulated laser driving current drives a semiconductor laser (not shown), employed in the optical system 13, to emit a laser beam for a time period corresponding to the laser exposure period data.

Further, the laser driving circuit 37 receives, via a path 13a, an output from a monitoring light receiving element (not shown) employed in the optical system 13, and compares the output with a set value, thereby controlling the output light amount of the semiconductor laser to the set value by use of the laser driving current.

A pattern generation circuit 38 generates, under the control of the control circuit 45, gradation data items on the test pattern of the printer itself and on high density and low density test patterns used for toner adhesion amount measurements, and supplies the data items to the laser driving circuit 37.

The density of the high density test pattern is set to a predetermined value between black level and gray level (which is the middle level between white and black levels for example), while the density of the low density test pattern is set to a predetermined value between gray level and white level.

The control circuit 45 controls switching between the laser exposure period data from the gradation data buffer 36, and the test pattern gradation data used for toner adhesion amount measurement and output from the pattern generation circuit 38. The selected data is supplied to the laser driving circuit 37.

The electrostatic latent image formed on the photosensitive drum 2 is developed by the developer unit 4. The unit 4 is of a two-component development type, and contains a toner and a carrier functioning as a developer. The ratio by weight of the developer to the toner (hereinafter referred to as "toner density") is measured by a toner density measuring unit 39. A toner supply motor 41, for driving a toner supply roller 40, is controlled in accordance with the output of the toner density measuring unit 39, thereby to supply the developer unit 4 with the toner contained in a toner hopper 42.

The developer roller 43 of the developer unit 4 is made of a conductive material, and connected to a high voltage source 44. When a developing bias voltage is applied to the roller 43, it rotates to thereby stick the toner to the photosensitive drum 2 and form a visual image corresponding to the electrostatic latent image. The high voltage source 44 has its output bias voltage controlled by the control circuit 45, which is connected thereto via a D/A converter 48. The developed image is transferred to a transfer sheet fed by the transfer drum 9.

In addition, when the printer has been warmed up after the power switch is turned on, the control circuit 45 causes the pattern generation circuit 38 to generate the above-described gradation data items indicative of different densities to thereby expose, on the photosensitive drum 2, the high density and low density test patterns for toner adhesion amount measurement.

Then, in synchronism with the time at which exposed portions of the high density and low density test patterns on the drum 2 are developed and moved to the toner adhesion amount measuring unit 8, the control circuit 45 outputs a start signal to the unit 8, which then measures the amount of the adhered toner. The outputs of the toner adhesion amount measuring unit 8 and that of the toner density measuring unit 39 are digitized by the A/D converter 46 and then input to the control circuit 45. The circuit 45 is further connected to a control panel 49 having a keyboard (not shown) to be used to control the overall operation of the laser printer.

As is shown in FIG. 3, the above-described development provides a toner image consisting of a high density test pattern (high density image) PT1 corresponding to high density gradation data, and a toner image consisting of a low density test pattern (low density image) PT2 corresponding to low density gradation data.

The CPU 59 employed in the control circuit 45 compares the two measured outputs from the toner adhesion amount measuring unit 8 with a reference (target) value stored in a memory 57, using a program stored in a memory 56. Thereafter, in accordance with the comparison results, processing is performed to change the grid bias voltage of the charger 3, the development bias voltage of the developer unit 4, the exposure light amount of the optical system 13, and a light emission time period in area gradation.

The memory 57 in the control circuit 45 is a rewritable memory, and stores the reference (target) value used to measure the toner adhesion amount, measured data supplied from the A/D converter 46, etc.

Further, the control circuit 45 controls switching between the gradation data from the gradation data generator 36A, and the gradation data items on the test pattern of the printer and the test patterns for toner adhesion amount measurement, receives the outputs of the measuring units 8 and 39, controls the outputs of the high voltage sources 34, 35, and 44, sets the target values of the laser driving current and toner density, controls the supply of toner, and corrects the gradation characteristics of the printer gradation data.

FIG. 4 shows the structure of the toner adhesion amount measuring unit 8. As shown in FIG. 4, a light beam from an optical source 51 is radiated onto the photosensitive drum 2 having a toner adhered thereon as a result of development. The light beam reflected therefrom is supplied to a photoelectric converter 52, where a current corresponding to the amount of the reflected light beam is generated and then subjected to current/voltage conversion. Subsequently, the voltage indicative of the reflected light beam is applied, via a transmission circuit 53, to the A/D converter 46, where the voltage is converted to a digital signal. This signal is supplied to the control circuit 45.

The light source 51 is driven by a current from the light source driving circuit 54, which is turned on and off by a control signal from the circuit 45 or by a signal for adjusting the driving current to the light source 51.

Figure 5:
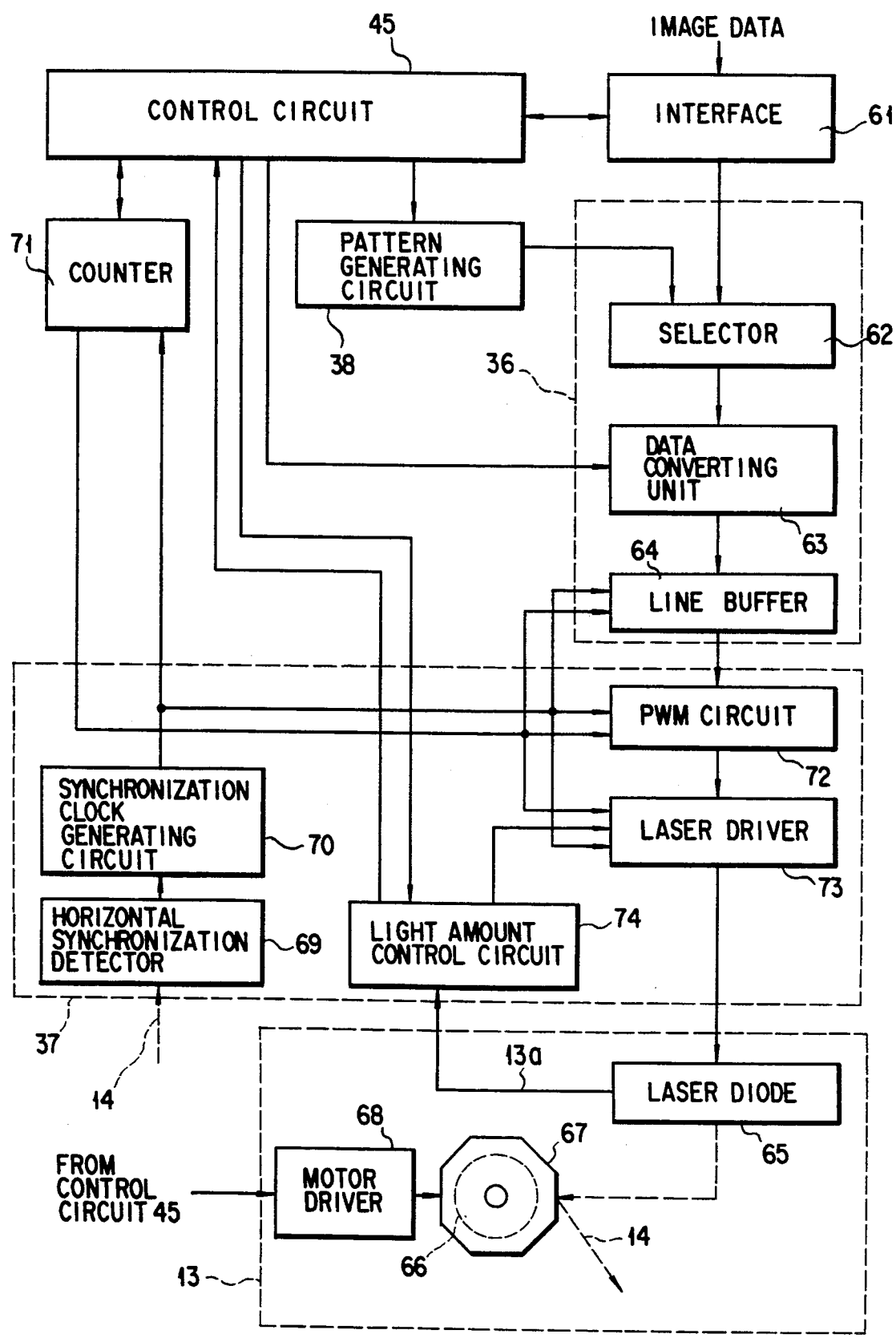
FIG. 5 is a block diagram, showing the flow of image data and an exposure system.

FIG. 5 is a block diagram, useful in explaining the flow of image data (including gradation data) and the exposure system.

In the case of usual printing, image data (hereinafter called "gradation data") including gradation data from an external device, a manuscript reading section, or an image processing section is transmitted to an interface (I/F) 61 in accordance with an image-transmission clock and command/status data. The transmission of a command/status containing a data request, printer busy, etc., is controlled by the control circuit 45.

The control circuit 45 drives, via the pattern generation circuit 38, a selector 62 employed in the gradation data buffer 36, to select the gradation data from the interface 61. The selected gradation data is supplied to a data converter 63, where it is converted to pulse-width data in accordance with conversion data supplied from the control circuit 45, and then stored in a line buffer 64. The above data transmission is performed in synchronism with the image transmission clock.

On the other hand, a laser beam emitted from a laser diode 65 employed in the optical system 13 is guided through an optical system (not shown) to a polygon mirror 67 functioning as a deflection means and rotated by a motor 66. The motor 66 is driven by a motor driver 68. The laser diode 65, polygon mirror 67, and motor driver 68 constitute the optical system 13.

A horizontal synchronization detector 69 detects the position of a laser beam 14 deflected by the polygonal mirror 67, then generates a horizontal synchronization signal relating to a write position, and then inputs the signal to a synchronization clock-generating circuit 70. The circuit 70, in turn, generates a write synchronization clock signal per unit pixel on the basis of the input horizontal synchronization signal, and transmits the horizontal synchronization signal and write synchronization clock signal to a line buffer 64, a counter 71 controlled by the control circuit 45, a PWM (Pulse Width Modulation) circuit 72, and a laser driver 73.

Synchronization of scanning and writing using laser beams is performed by use of the write synchronization signal and the horizontal synchronization signal.

Under the control of the control circuit 45, the counter 71 generates a timing signal for determining a write region (defined by top, bottom, right and, left margins) on the basis of the horizontal synchronization signal, the write synchronization signal, and print-starting position data. Synchronization of read/transfer of data from the line buffer 64, processing in the PWM circuit 72, and exposure/writing by the laser driver 73 is performed by use of the timing signal and synchronization clock signal.

Specifically, processing up to the writing of gradation data into the line buffer 64 is performed with reference to the image transfer clock signal, and processing from the reading of data out of the line buffer 64 to exposure using a laser beam is performed with reference to the laser scanning position. This is because there is a difference between the operation speed of the laser optical system 13 and the data transfer speed, i.e., between the transfer speed and the write speed of an external image. This difference in speed is eliminated by performing a time lag by use of the line buffer 64.

The PWM circuit 72 generates a gate pulse of a width corresponding to a time period for which the laser diode 65 emits a laser beam per unit pixel, on the basis of pulse-width data per unit pixel. The laser driver 73 supplies the laser diode 65 with a driving current for a time period corresponding to the gate pulse width, thereby performing on/off control thereof.

If the pulse width per unit pixel is large, the light emission period of the laser diode 65 is long, and the photosensitive drum 2 receives high exposure energy on a large area. In contrast, if the pulse width per unit pixel is small, the light emission period of the laser diode 65 is short, and the photosensitive drum 2 receives low exposure energy on a small area. Accordingly, a latent image is obtained after exposure, which has a gradation pattern resulting from exposure to the laser beam 14 for a time period corresponding to the pulse width data.

The light amount or exposure amount of the laser diode 65 is controlled by a light amount control circuit 74. The laser diode 65 has a major emission surface to perform exposure, and a monitoring-light emission surface opposite to the major emission surface. A monitor diode (not shown) for detecting the amount of emitted monitoring light is provided at a front portion of the monitoring-light emission surface. The light amount control circuit 74 detects the output of the monitor diode via the path 13a and compares the same with a target value, thereby supplying the laser driver 73 with a signal for correcting the amount of the driving current thereof so that the difference between the output of the monitor diode and the target value is minimized.

The horizontal synchronization detector 69, synchronization clock generating circuit 70, PWM circuit 72, laser driver 73, light amount control circuit 74 constitute the laser driving circuit 37.

To change pulse-width correction characteristics, conversion data is transmitted from the control circuit 45 to the data converter 63, thereby changing the conversion characteristics (pulse-width correction characteristics) of pulse width data on the basis of gradation data.

Further, to change the exposure amount or light amount of the laser diode 65, a renewal target value is transmitted from the control circuit 45 to the light amount control circuit 74, thereby changing the exposure amount.

To form a test pattern, the control circuit 45 causes the selector 62 to select image data relating to the test pattern output from the pattern generation circuit 38, and its internal image transmission clock. Under the control of the control circuit 45, the circuit 38 supplies the selector 62 with data, including gradation data as the test pattern image data, in synchronism with the internal image clock. The flow of data is similar to that of usual image data from the interface 61.

To make the image write region have a predetermined test pattern size, the control circuit 45 rewrites the image write region data (top, bottom, right and left margins) to be supplied to the counter 71, into test pattern data, thereby performing exposure to form a test pattern. Thus, the control circuit 45 can control the type, size, and printing position of a test pattern, including gradation data.

FIG. 6 shows the surface potential (hereinafter called "unexposed-portion potential") VO of the photosensitive drum 2 uniformly charged by the charger 3, the surface potential (hereinafter called "exposed-portion potential") VL of the photosensitive drum 2 attenuated as a result of overall exposure by use of a constant amount of light emitted from the optical system 13, and a development bias voltage VD (shown by the one-dot line), in relation to the absolute value VG (hereinafter simply called "grid bias voltage") of the bias voltage −VG applied to the grid electrode 33 of the charger 3.

Since reverse development is performed in the above embodiment, the polarity of the potential or voltage is negative. As is shown in FIG. 6, the higher the grid bias voltage VG (absolute value), the lower the absolute value of the unexposed-portion potential VO and exposed-portion potential VL, respectively. Assuming that the unexposed-portion potential VO and exposed-portion potential VL vary substantially linearly in relation to the grid bias voltage VG, they can be expressed as follows:

$$VO(VG) = K1 \times VG + K2 \qquad (1)$$

$$VL(VG) = K3 \times VG + K4 \qquad (2)$$

where K1 to K4 represent constants, VO, VG, and VL the absolute values of the unexposed-portion potential, exposed-portion potential, and grid bias voltage, respectively, and VO (VG) and VL (VG) the values of the unexposed-portion potential and exposed-portion potential in relation to any desired value of the grid bias voltage, respectively.

The density of development varies in accordance with the relation between the absolute value VD of the development bias voltage, exposed-portion potential VL, and unexposed-portion potential VO. Here, the contrast potential VC and background potential VBG are defined as follows:

$$VC = VD(VG) - VL(VG) \qquad (3)$$

$$VBG = VO(VG) - VD(VG) \qquad (4)$$

where VD (VG) represents the value of VD relative to any desired value of VG.

FIG. 7 shows the contrast potential VC and the density of a high density image, in particular, the density of a solid area (in which the overall image is black), which are obtained by use of the development bias voltage as a parameter.

The background potential VBG mainly relates to the image density of a relatively low density portion in the case of a multi-gradation system using pulse-width modulation, and varies in accordance with the position of the photosensitive drum, as shown in FIG. 8.

FIG. 9 shows changes in the amount of adhered toner Q corresponding to gradation data, resulting from when the background potential VBG as a parameter varies. In a low density region, the relation between the toner amount and gradation data varies as indicated by arrow C.

As can be understood from FIGS. 7 and 9, the development density is varied by the contrast potential VC and background potential VBG.

The following equation is obtained from the equations (1) to (4):

$$VG(VC, VBG) = (VC + VBG - K2 + K4)/(K1 - K3) \qquad (5)$$

$$VD(VBG, VG) = K1 \times VG + K2 - VBG \qquad (6)$$

From the equations (5) and (6), the grid bias voltage VG and development bias voltage VD can be calculated by determining the contrast potential VC and background potential VBG where the relation (K1 to K4) between the exposed-portion potential VL and the grid bias voltage VG and the relation between the unexposed-portion potential VO and the grid bias voltage VG are known.

After the surface potential of the photosensitive drum 2 is measured, the relation (K1 to K4) between the grid bias voltage VG, exposed-portion potential VL, and unexposed-portion potential VO, then setting the contrast potential VC and background potential VBG. From the equations (5) and (6), the grid bias voltage VG and development bias voltage VD are determined. Then, a plurality of density patterns are formed, the amounts Q of toner adhered thereto after development are measured, and the measured amounts are compared with respective predetermined reference values, thereby estimating correction values ΔVC and ΔVBG of the contrast voltage VC and background voltage VBG for obtaining an appropriate development density, on the basis of the difference ΔQ between each measured amount and a corresponding reference value (i.e., deviation of each measured amount from a corresponding reference value). The grid bias voltage VG and development bias voltage VD are renewed based on the estimated correction values, and then the amount of toner adhered to density patterns formed, based on the renewed bias voltages VG and VD, are measured. This operation is repeated until the pattern density falls within an allowable range.

Figure 10A:
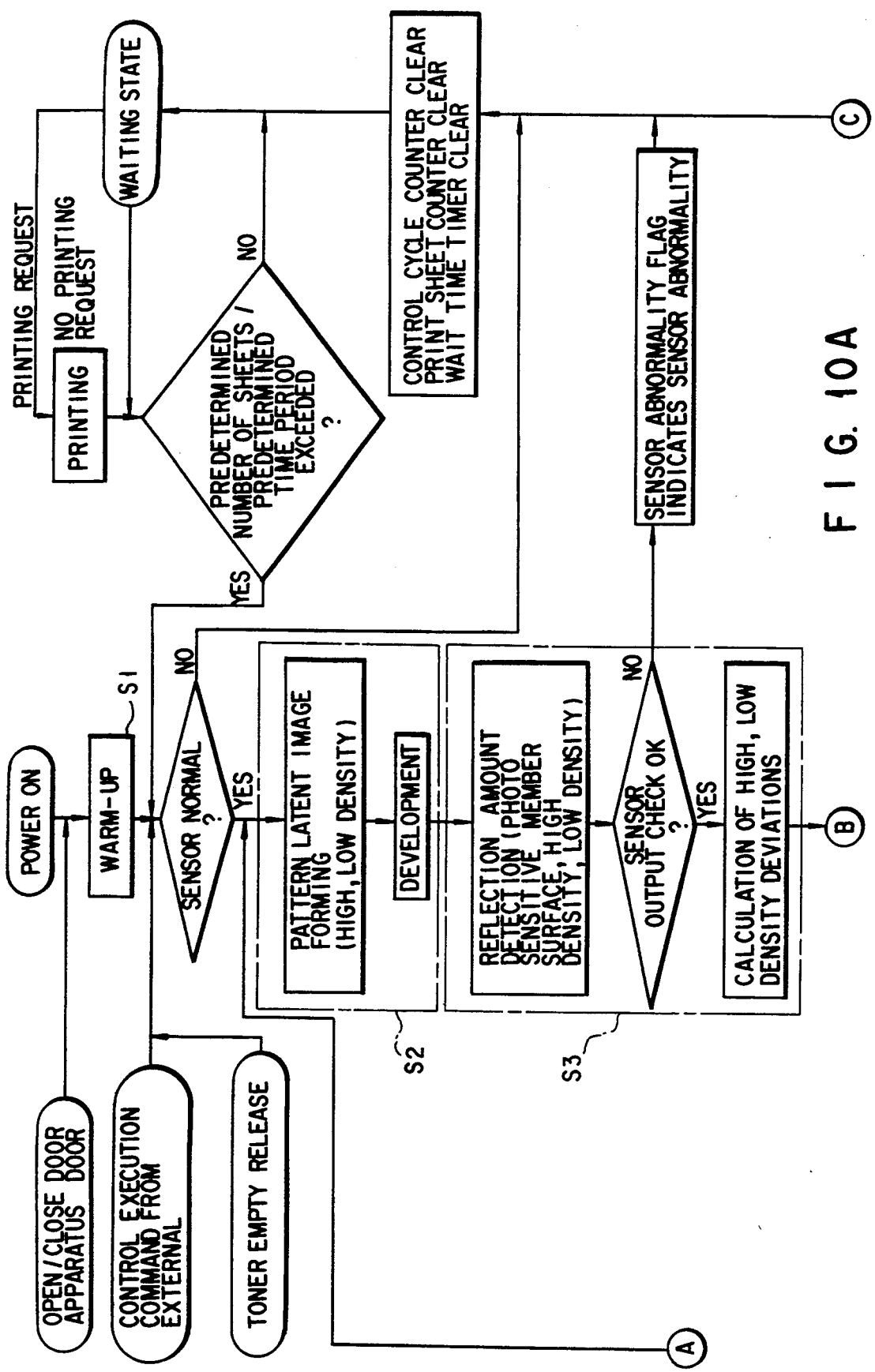
FIGS. 10A, 10B show a flowchart, useful in explaining an operation of essential parts of the embodiment.
Figure 10B:
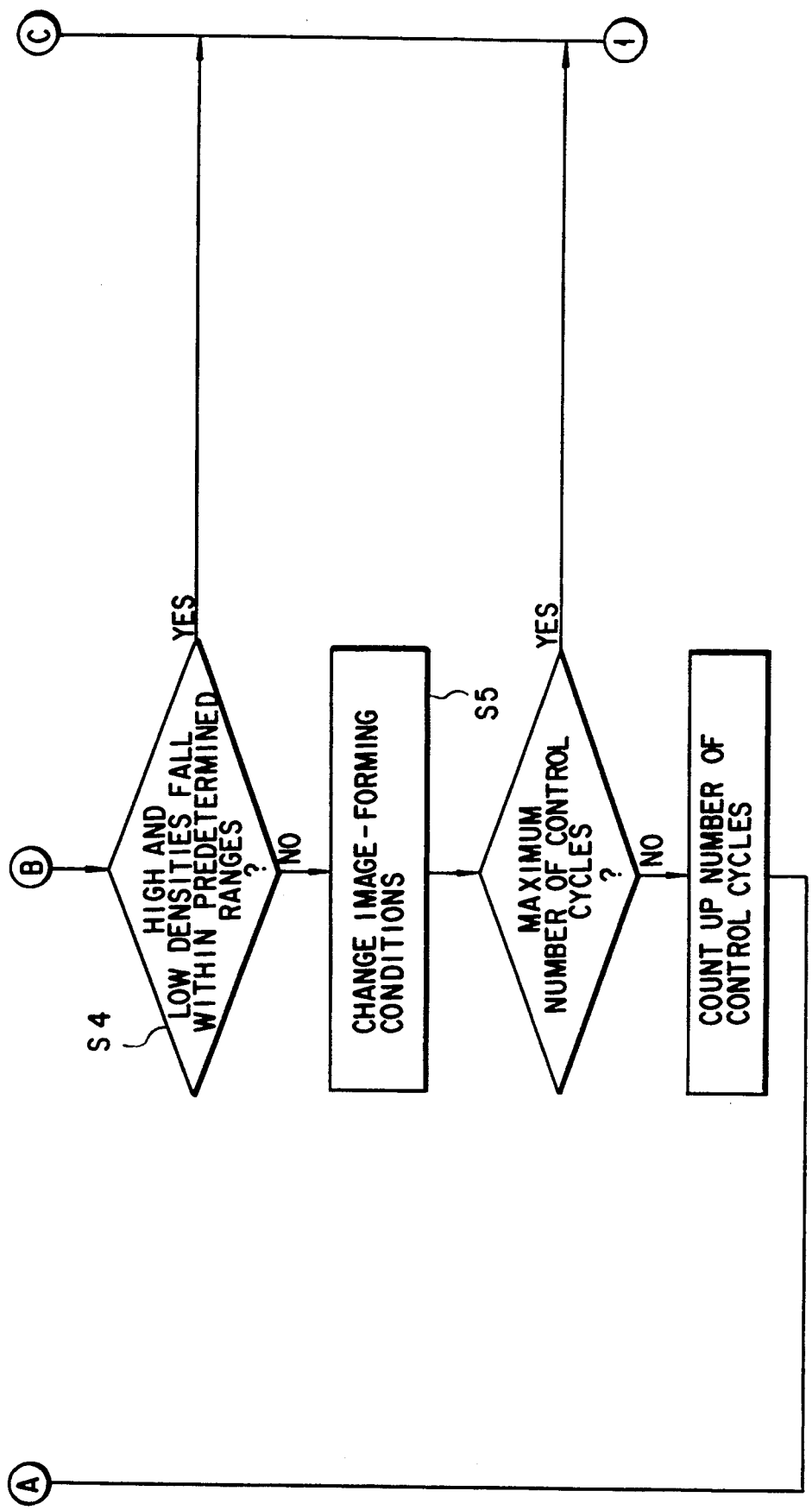

Then, image-forming condition-changing processing according to the first embodiment of the invention will be explained with reference to the flowchart of FIG. 10. The processing mainly has a warm-up step S1, a test pattern-forming step S2, a toner adhesion amount measuring step S3, a determination step S4, and an image-forming condition-changing step S5.

In the warm-up step S1, the control circuit 45 performs a sequence of predetermined initiation processing upon turning on the main system. In particular, warm-up of the fixing unit 27 requires lots of time. When the warm-up operation has been completed, or when the main system is warmed to a predetermined temperature lower than a predetermined temperature at which the warm-up has been completed, initiation processing including cleaning processing, is performed in the image forming system.

During the initiation processing, the temperature of the photosensitive drum 2 and the humidity in the system are controlled, the developer employed is mixed, the characteristics of the drum 2 influenced by charge and discharge operations are stabilized, and the drum 2 is cleaned, thus providing image-forming conditions similar to normal ones for performing printing based on image data.

After completion of warm-up processing, it is determined whether or not the toner adhesion amount measuring unit 8 is normal. This determination is performed by confirming whether or not a flag, which is set when it is determined in a step S3 that the output of the sensor is an abnormal value, is set. At the time of turn on of the system, the unit 8 is judged normal since the flag is reset.

When it is determined that the unit 8 is normal, the control circuit 45 proceeds to a step S2 for forming a test pattern. Specifically, after initiation, the control circuit 45 performs charging, exposing, developing, cleaning, and discharging processing in a manner similar to that of a sequence of usual image-forming processing. At this time, the grid bias voltage of the charger 3 and the developing bias voltage of the developers 4 to 7 are set to respective predetermined values. These values are bias conditions for providing reference gradation characteristics under normal temperature and humidity. Further, the light-amount control target value and the pulse-width correction coefficient of the exposure optical system are set to respective reference values.

In the exposure process, two test pattern latent images of predetermined sizes generated from the pattern generation circuit 38 and corresponding to two gradation data items of high and low densities, respectively. As described above, that one of the two test patterns which 10 corresponds to the high-density gradation item will hereinafter be called "high density test pattern", and the other one which corresponds to the low-density gradation item "low density test pattern".

Desirably, each test pattern has a predetermined width extending about the center of an image region in the axial direction of the photosensitive drum 2, and a predetermined length in the rotational direction of the drum 2. The predetermined width corresponds to the position of the toner adhesion amount measuring unit 8 in the axial direction of the photosensitive drum 2 as shown in FIG. 3. A minimum size, which serves as a detection spot size, and with which an edge effect peculiar to an electrophotograph or the like does not occur, is set as regards the predetermined width. Further, the predetermined length is set to a minimum value, with which no edge effect occurs and the response characteristics of the sensor do not affect the measurement result.

In the embodiment, the predetermined width is set 1.5 to 5 mm larger than the detection spot size. The predetermined length is set to a value obtained by multiplying the number of times of detection by a distance over which the detection spot moves in a single detection cycle for a time period four times longer than the sensor time constant, and further adding 1.5 to 5 mm to the resultant value.

In the developing process, the developing roller 43 supplied with an initial developing bias voltage develops the two test pattern latent images, thereby forming two test pattern portions (toner images) PT1 and PT2 (see FIG. 3) of different densities. The test pattern portion PT1 corresponding to the high density gradation data item will hereinafter be called "high density portion", and the test pattern PT2 corresponding to the low density gradation data item "low density portion".

Then, in a step S3 for measuring the amount of adhered toner, when each of the two test pattern portions PT1 and PT2 formed on the photosensitive drum 2 has aligned with the toner adhesion measuring unit 8, the amount of light reflected therefrom is detected by the unit 8. At this time, the unit 8 also detects the amount of light reflected from an unexposed portion, i.e., undeveloped portion, of the drum 2 at predetermined timing.

The output of the unit 8, indicative of the detected amounts of light reflected from the high and low density portions PT1 and PT2 and from the other portion of the drum 2, is supplied to the control circuit 45 via the A/D converter 46. The CPU 59 employed in the control circuit 45 compares each of those detected amounts with a corresponding predetermined range defined by predetermined upper and lower limits stored in the memory 57, to thereby check the sensor output.

If the comparison result indicates that any one of those amounts falls outside its range, the control circuit 45 determines that the toner adhesion amount measuring unit 8 is abnormal, and sets a sensor-abnormality flag. The control panel 49 displays a message indicating the abnormality state. Then, the control circuit 45 returns to a waiting state assumed before the image-forming condition change processing.

If, on the other hand, the determination result indicates that the toner adhesion amount measuring unit 8 is normal, the CPU 59 defines, as the low density portion toner adhesion amount and the high density portion toner adhesion amount, results of calculation performed by use of a predetermined function relating to those reflectances of the low and high density portions, which are determined with reference to the reflection light amount of the portion of the drum 2 other than the high and low density portions PT1 and PT2.

The CPU 59 compares the data items, supplied from the A/C converter 46 and corresponding to the calculated high and low density portion toner adhesion amounts, respectively, with respective target values stored in the memory 57, thereby obtaining the differences therebetween. These differences will be called "high density portion difference" and "low density portion difference", respectively. In other words, the high and low density portion differences are high and low density portion deviations from their target values, respectively.

Thereafter, it is determined in a determination step S4 that the calculated high density portion difference and low density portion difference fall within predetermined ranges, respectively. If it is determined that they fall within respective ranges, the control circuit 45 enters a waiting state (in which printing can be performed if the user requests printing). If at least one of them falls outside its range, the program proceeds to a step S5 for changing image-forming conditions.

Figure 11:
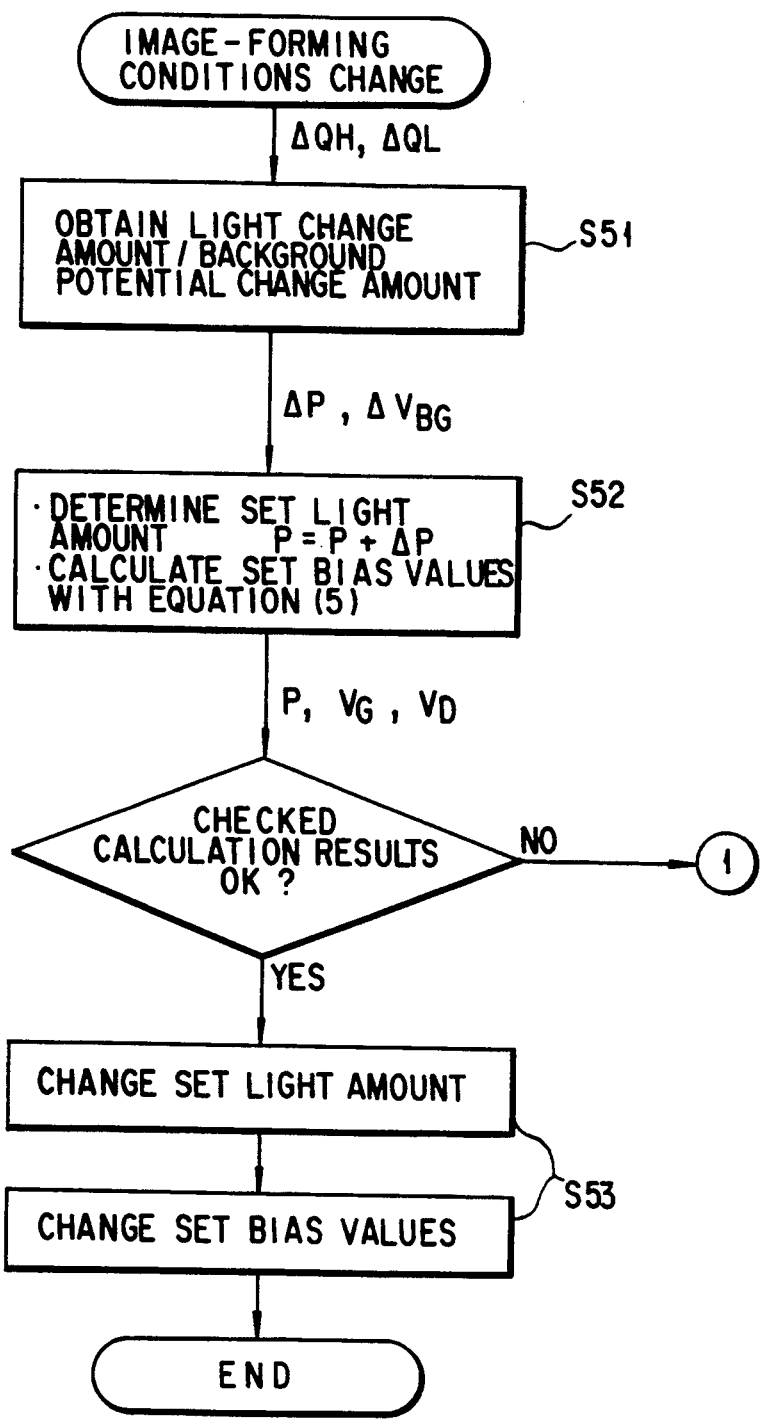
FIG. 11 is a flowchart, useful chiefly in explaining image-forming condition-changing processing according to the first embodiment of the invention.

In the first embodiment, in the step S5, the exposure amount and the background potential are changed by changing the light amount control target value of the exposure system, which is used to change the high and low density portion differences to fall within the respective predetermined ranges, and by changing the grid bias voltage and the developing bias voltage. The step S5 includes three sub-steps S51 to S53, as is shown in FIG. 11.

The step S51 includes steps of obtaining renewal amounts of the exposure conditions expressed by the two parameters of light amount and the background potential, and obtaining a renewal amount of the background potential, on the basis of the high and low density portion differences. The step S52 has the steps of setting a light amount control target value of the exposure system by use of a predetermined function, and calculating renewal amounts of the grid bias voltage and the developing bias voltage are calculated, on the basis of the renewal amounts of the exposure conditions. The step S53 sets the renewal values of the light amount control target value, grid bias voltage, and developing bias voltage at predetermined points of time.

In general, it is simple to select the light amount renewal value and bias voltage renewal value from a prestored table on the basis of the high and low density portion differences. However, this method is disadvantageous for the following reasons: Suitable renewal amounts to maintain the developing characteristics, which are changed by the ambient conditions and with the lapse of time, vary depending upon the operation history of the photosensitive drum 2 or the developer and upon variations between products. Thus, it is possible that the converged values obtained after repeated detection are deviated from target values with the lapse of time. Further, changes of the exposure conditions of the high density portion do not necessarily exert independently of changes of the exposure conditions of the low density portion, but can interact. Thus, it is undesirable to determine the exposure conditions on the basis of each of the high and low density portion differences.

In the step S51, renewal amounts of the exposure conditions, expressed by the two parameters, are selected from a table preset on the basis of the interaction between the high and low density portion differences. One of the two parameters is a renewal amount of a target value for controlling the light amount of the exposure system, specifically, a renewal amount of a comparative voltage (target voltage) of a signal obtained as a result of photoelectric conversion by means of the light amount monitor. The other parameter is a renewal amount of the background potential which is the difference between the developing bias voltage and the potential of an unexposed portion of the photosensitive drum 2. This renewal amount can be changed by the grid bias voltage for controlling the unexposed portion potential, and the developing bias voltage.

FIG. 12 is a view showing the effects of light amount renewal on the gradation characteristics. The gradation data is indicated along the abscissa, and the output image density ID is indicated along the ordinate. P0 indicates a reference light amount, and P1 to P4 are renewed light amounts, respectively, (P1<P2<P0<P3<P4). It is evident from FIG. 12 that a greater change appears with respect to a change in light amount as the density increases, and that the light amount becomes larger as the gradient increases.

Accordingly, the gradation characteristics can be corrected to values near the reference values by changing the light amount to accord with the gradation characteristics in which the degree of change is higher as the density increases. However, it is difficult to correct a linear change in the gradation characteristics on the low density side only by changing the light amount.

Figure 13:
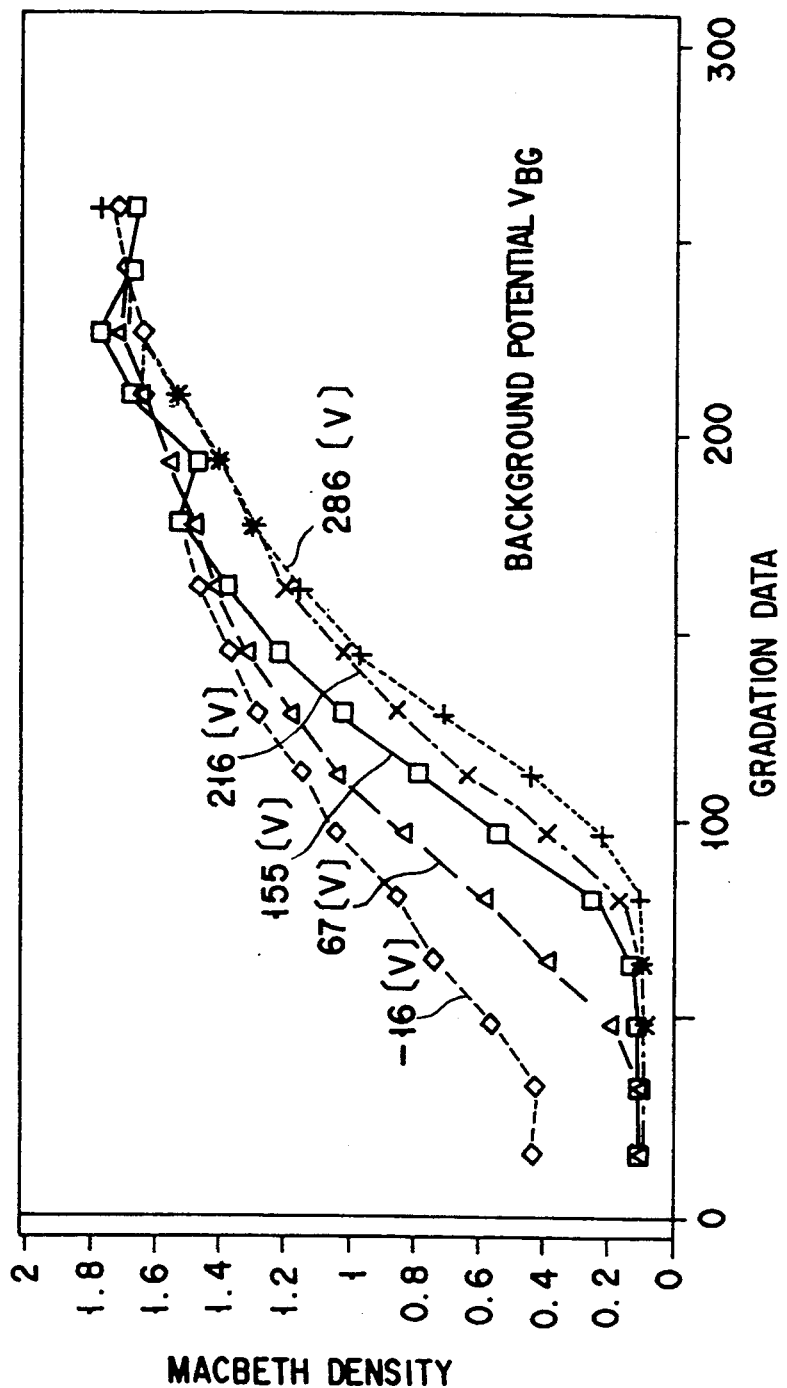
FIG. 13 shows variation in the gradation characteristics obtained when the background potential is changed.

On the other hand, a change in the background potential affects a portion more greatly as the density of the portion drops. FIG. 13 shows changes in the gradation characteristics obtained when the background potential VBG as a parameter is changed. The gradation data 0–255 is indicated along the abscissa, while the output image density is indicated by the Macbeth density scale along the ordinate. As is evident from FIG. 13, when the background potential is high, the density decreases as the degree of gradation decreases.

To determine renewal amounts of the exposure amount and background potential on the basis of the high and low density portion differences, two tables are used - one table of the relation between each pair of the high and low density portion differences and a renewal amount of the exposure amount corresponding to the relation, and the other table of the relation between each pair of the high and low density portion differences and a renewal amount of the background potential corresponding to the relation. Thus, the contents of these tables are made in consideration of the interaction between the exposure amount and the background potential, and can provide an effective renewal amount from the relation between the both differences. Further, in the tables, for the differences of "0" each renewal amount is set to "0", and hence the steady-state deviation after conversion approaches "0".

Thereafter, in a step S52, a new exposure amount and a bias voltage for determining the background potential are obtained from the exposure correction amount and renewal amount of the background potential obtained in the step S51, and also from an exposure amount and a background potential used at the time of forming a test pattern. A new light amount and a pulse-width correction coefficient are obtained from the light correction amount and light amount used at the time of forming the test pattern.

In the above embodiment, a voltage value used as the target value of the light amount control means (light amount control circuit 74) of the exposure system is given by:

$$Pnew = P + \Delta P \qquad (7)$$

where Pnew represents a voltage corresponding to a new light amount, P a voltage corresponding to the present light amount, and $\Delta P$ a voltage corresponding to a renewal value of the exposure amount obtained from the table.

The bias (grid bias and developing bias) voltages are calculated from the background potential obtained from the table. The bias voltage can be obtained by use of a preset function including a coefficient indicative of the surface potential characteristics of the photosensitive drum 2 (see the above-described explanations as regards the equations (5) and (6); VC: constant).

Then, in a step S53, the new exposure amount obtained in the step S52 is set as a target value of the light amount control circuit 74 functioning as light amount control means, and the new grid bias voltage and developing bias voltage are set as output control values for controlling the outputs of the high voltage power sources 35 and 44.

To again form test patterns by changing setting, the grid bias voltage and developing bias voltage are changed at predetermined points of time, specifically, at the time when at least that portion of the photosensitive drum 2 to which a renewed grid bias voltage is applied has reached the developing position. Setting inappropriate new time points may cause fog, or may stain the drum 2 as a result of adhesion of carrier components thereto, in the case of two-component development.

Figure 14:
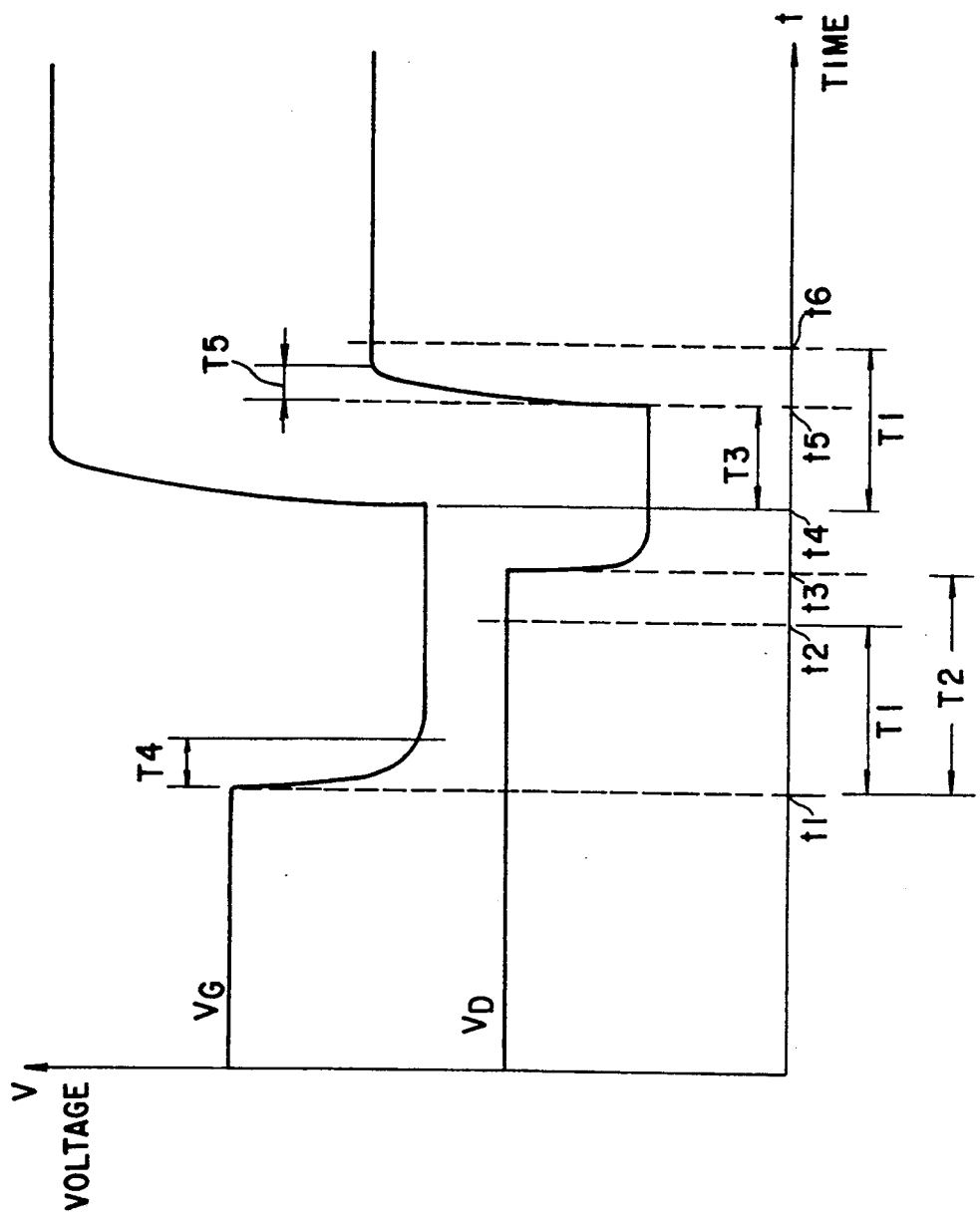
FIG. 14 is a timing chart, showing the points of time at which the grid bias voltage and developing bias voltage are changed.

FIG. 14 shows changing time points of the grid bias voltage VG and the developing bias voltage VD. In this embodiment, to reduce the grid bias voltage VG without adhesion of carriers to the drum 2, the developing bias voltage VD is changed to a new value at a time point retarded by a time period T2 longer than the sum of a time lag T4 occurring, at the time of changing the charging potential, because of a delayed fall of the grid bias voltage supplied from the high voltage power source 35, and a travel time period T1 required to move from the grid electrode 33 to the developing position. In other words, the developing voltage VD is changed to a new value at a time point T3 after a time period T2 elapses from a time point t1 at which the grid bias voltage is changed to a new value.

To increase the grid bias voltage VG, the developing bias voltage VD is changed after a time period T3 shorter than a time period obtained by subtracting a delayed time period T5 of the high voltage power source 44 for applying the developing bias voltage, from a time period T1 required to move from the grid electrode 33 to the developing position of the drum 2. In other words, the voltage VD is changed to a new value at a time point t5 after the time period T3 elapses from a time point t4 at which the grid bias voltage VG is changed to a new value.

At the time of setting renewal values, adhesion of carrier to the photosensitive drum 2 is prevented by preventing the background potential from being increased at the same position on the drum 2. However, making greatly the difference between the time period T1 and 10 the time periods T2, T3 can increase the amount of fog on the drum 2. To avoid this, in the embodiment, for $T4=50$ msec or less and $T5=50$ msec or less, $T2-T2=200$ msec or less and $T1-T3=200$ msec or less.

Then, forming, detection, and determination of test patterns are performed again, thereby again performing exposure and forming two test pattern latent images of high and low densities on the drum 2 charged with a renewed grid bias voltage. Subsequently, these latent images are developed by use of a renewed developing bias voltage, and then subjected to processing in the toner adhesion measuring step S3 and determination step S4.

If it is determined in the determination step S4 that the high and low density portion differences fall within the respective predetermined ranges, the cleaning operation is performed. Then, the control circuit 45 is shifted to the waiting state, with the renewed exposure amount, grid bias voltage, and developing bias voltage kept as they are. On the other hand, if at least one of the differences falls outside its range, processing of changing bias voltages, and forming, detecting, and determining patterns are repeated.

Now, a qualitative algorithm as regards the contents of the above-described tables will be explained. In the first embodiment, in the step, included in the image condition-changing step S5, for determining two renewal amounts on the basis of the high and low density portion differences, the following operations are performed: if the both differences are positive values, which indicates that the amounts of toner adhered to the high and low density portions, the exposure amount is reduced mainly; if the both differences are negative values, the exposure amount is increased mainly; if the high density portion difference is substantially "0" falling within its predetermined range, and the low density portion difference is a negative value, the background potential is reduced; if the high density portion difference is substantially "0" falling within its predetermined range, and the low density portion difference is a positive value, the background potential is increased. The reason is that a highly effective voltage relationship is realized by the effects of the exposure amount and the background potential, and is principally employed.

As described above, FIG. 12 is for explaining how the renewal values of the exposure amount affect the gradation characteristics. The gradation data is indicated along the abscissa, and the output image density is indicated along the ordinate. As is evident from FIG. 12, when the exposure amount increases from P1 to P4, the density on the high density portion side increases abruptly in a certain gradation data item.

Further, as is shown in FIG. 13, when the background potential is increased, the development start point in the low density portion, i.e., the minimum development-start data is shifted from a lower gradation data item to a higher gradation data item.

To prevent fog on the photosensitive drum 2, or prevent toner, charged with an inverse voltage, from sticking thereto, or prevent carrier adhesion in the case of a two-component developer, the rate of renewal of the background potential is kept low, thereby performing rough adjustment mainly by changing the exposure amount in consideration of the high density portion, and performing fine adjustment by changing the exposure amount and the background potential in consideration of both the high and low density portions.

The memory 57, for example, prestores tables of such renewal amounts as can change the potential relationship on the basis of qualitative rules considering the above adjustments.

FIG. 15 shows the contents of a table as regards renewal values of the exposure amount (stored in, for example, the memory 57). The high density portion difference is indicated along the axis of abscissa, the low density portion difference is indicated in the depth direction, and the exposure renewal amount is indicated in the vertical direction. The center of a frame F in a plane defined by the axes of the high and low density portion differences is a point at which each of the high and low density differences is "0", i.e., a point at which the toner adhesion amounts of the high and low density portions are equal to respective target values. In this embodiment, the exposure renewal amount varies in accordance with the high density portion difference, substantially irrespective of the low density portion difference.

FIG. 16 shows the contents of a table as regards renewal values of the background potential (stored in, for example, the memory 57). As in FIG. 15, if the high density portion difference greatly deviates from "0", a renewal value of the background potential is "0", i.e., the background potential is not changed. Only when the high density portion difference is near "0", the background potential is changed in accordance with the low density portion difference.

If a renewal amount of operation is determined in accordance with each of the differences, a renewal amount of the background potential, in particular, can be erroneously determined. However, since in the embodiment, the exposure amount and the background potential are determined from the relationship between the high and low density portion differences, an appropriate amount of operation can be determined by use of a parameter renewal amount suitable to the operation, even if in a case wherein one of the differences is not changed while the other difference is changed.

FIGS. 17 and 18 show variations in different two 10 gradation characteristics. Specifically, the toner adhesion amount of the low density portion is a little lower than a reference value in both FIGS. 17 and 18. The toner adhesion amount of the high density portion, however, is much lower than a reference value in the case of FIG. 17, and is substantially equal to the same (i.e., the difference is substantially "0") in the case of FIG. 18. It can be understood from the effects of renewal values of the exposure amount shown in FIG. 12 that it is effective to mainly increase the exposure amount in the case of FIG. 17 in which the toner adhesion amount of the high density portion is much lower than the reference value. Further, it can be understood from the effects of renewal values of the background potential shown in FIG. 13 that it is effective to slightly decrease the background potential in the case of FIG. 18 in which the high density portion difference is substantially "0".

Thus, an appropriate amount of operation can be obtained in consideration of the relation between the high and low density portion differences, instead of determining independent operation amounts from the high and low density portion differences, respectively.

Further, in the toner adhesion measuring step S3 in the first loop, if the low density portion difference is a low negative value, and the high density portion difference is a high negative value, the exposure renewal amount is increased in the positive direction, as shown in FIG. 19. In this case, as shown in FIG. 20, a renewal value of the background potential is set to (i.e., the background potential is not changed).

After bias voltages are calculated by use of the above results, and used as renewed values, the amounts of toner adhered to test patterns are again measured. As is evident from FIG. 12, the high and low density portion differences will be shifted in the positive direction as a result of bias changing.

At this time, if the differences fall within the respective predetermined ranges, the control processing is completed. If the high density portion difference falls within its predetermined range, and the low density portion difference is slightly lower than the lower limit of its predetermined range, a renewal value of the exposure amount is very slightly reduced and a renewal value of the background potential is slightly reduced, as is shown in FIGS. 21 and 22. When the background potential is reduced, it is understood from FIG. 13 that the degree of change in image density increases as the density decreases. As regards the high density portion, the degree of change in image density would relatively increase if a renewal value of the exposure amount would not be reduced. Actually, however, since the exposure amount is very slightly reduced, the image density is substantially unchanged in the high density portion.

As described above, measurement of the toner adhesion amount and change of the bias voltages are repeated, thereby performing sequential control in which on the basis of the relation between the high and low density portion differences shown in tables, first the high density portion difference is roughly adjusted by use of a renewed exposure amount, and then the high and low density portion differences are finely adjusted by use of the renewed background potential and exposure amount.

FIGS. 23 and 24 are examples of graphs, useful in explaining how the toner adhesion amount measurement value Q, the light amount P of the laser diode 65 shown in FIG. 5 (hereinafter called simply "laser amount"), and the bias voltages change in relation to the control cycles. In FIG. 23, values QH of toner adhered to the high density portion and values QL of toner adhered to the low density portion, which have been measured in every control cycle, are plotted. In FIG. 23, broken lines QHT, QLT indicate target values of toner adhered to the high and low density portions, respectively, and QHP and QLP denote control ranges for the high and low density portions, respectively.

In FIG. 24, the laser amount P and the bias voltages (the grid bias voltage VG and the developing bias voltage VD) which have been measured in every control cycle are plotted. P, VG, and VD are conditions for forming test patterns. The control cycle "0" is a cycle in which the toner adhesion amount is measured for the first time in the step S3. In the control cycle "0", QH and QL are lower than QHT and QLT, respectively, i.e., the high and low density portion differences are high negative values. Thus, control is performed to increase the laser amount P in the image-forming condition-changing step S5 (in the first control cycle).

When the amounts of toner adhered to high and low density test patterns formed under the above condition were measured, it was found in this example that QH was still lower than QHT and QL was slightly higher than QLT. Then, the laser amount P was increased, i.e., the difference between VG and VD was increased, in the image-forming condition-changing step S5. As a result, QH was increased, and QL was decreased. Thus, QH and QL approached QHT and QLT, respectively. Further, the laser amount P, VG, and VD were changed in a direction similar to the above (the third control cycle). As a result, QH and QL fell within respective predetermined ranges, thereby terminating the control.

Thus, combination of renewal of the exposure amount and renewal of the background potential enables the gradation characteristics to be unchanged from the high density portion to the low density portion within a range in which no image defects occur because of changing the bias voltages.

A second embodiment of the invention will be explained. The second embodiment differs from the first embodiment only in the contents of the image-forming condition-changing step S5.

In the second embodiment, in the step S5, the grid bias voltage and the developing bias voltage are changed so as to enable the high and low density portion differences to fall within the respective predetermined ranges, and also the exposure width is changed by changing the contents of a pulse-width modulation data correction table. As is shown in FIG. 25, the step S5 consists of sub-steps S61 to S63.

In the step S61, renewal amounts of the exposure conditions expressed by two parameters are determined on the basis of the relation between the high and low density portion differences, thereby determining a renewal amount of the contrast potential. In the step S62, a renewal amount of the contents of the pulse-width correction table is calculated on the basis of the determined renewal amount and a predetermined function, thereby calculating a corrected grid bias voltage and a corrected developing bias voltage. In the step S63, the calculated grid bias voltage, developing bias voltage, and pulse-width correction table renewal amount are set as renewed values at predetermined time points, respectively.

In general, a method for selecting corrected values of the grid bias voltage, developing bias voltage, and pulse width from predetermined tables, whose contents are obtained directly from the high and low density portion differences, can raise a problem. This is because renewal amounts suitable for development characteristics, which are varied not only by the ambient conditions but also with the lapse of time, differ depending on the history of the photosensitive drum 2, the developer, etc., and on variations in products.

Moreover, effects resulting from renewal amounts of the high and low density portion differences will not necessarily be exerted independently, but may interact with each other, so that it is undesirable to determine bias conditions from each difference.

To avoid the above, in the step S61, renewal amounts of the exposure conditions and conditions as regards the potential relation, which are expressed by two parameters, are selected from a predetermined table whose contents are determined on the basis of the relation between the high and low density portion differences. One of the parameters is a renewal amount of the contrast potential which is the difference between the potential of an exposed portion uniformly exposed by light of a predetermined exposure amount, and the developing bias voltage. The other parameter is a renewal value of the coefficient of the function for changing the contents of the pulse-width 10 data (gradation data) correction table.

Figure 26:
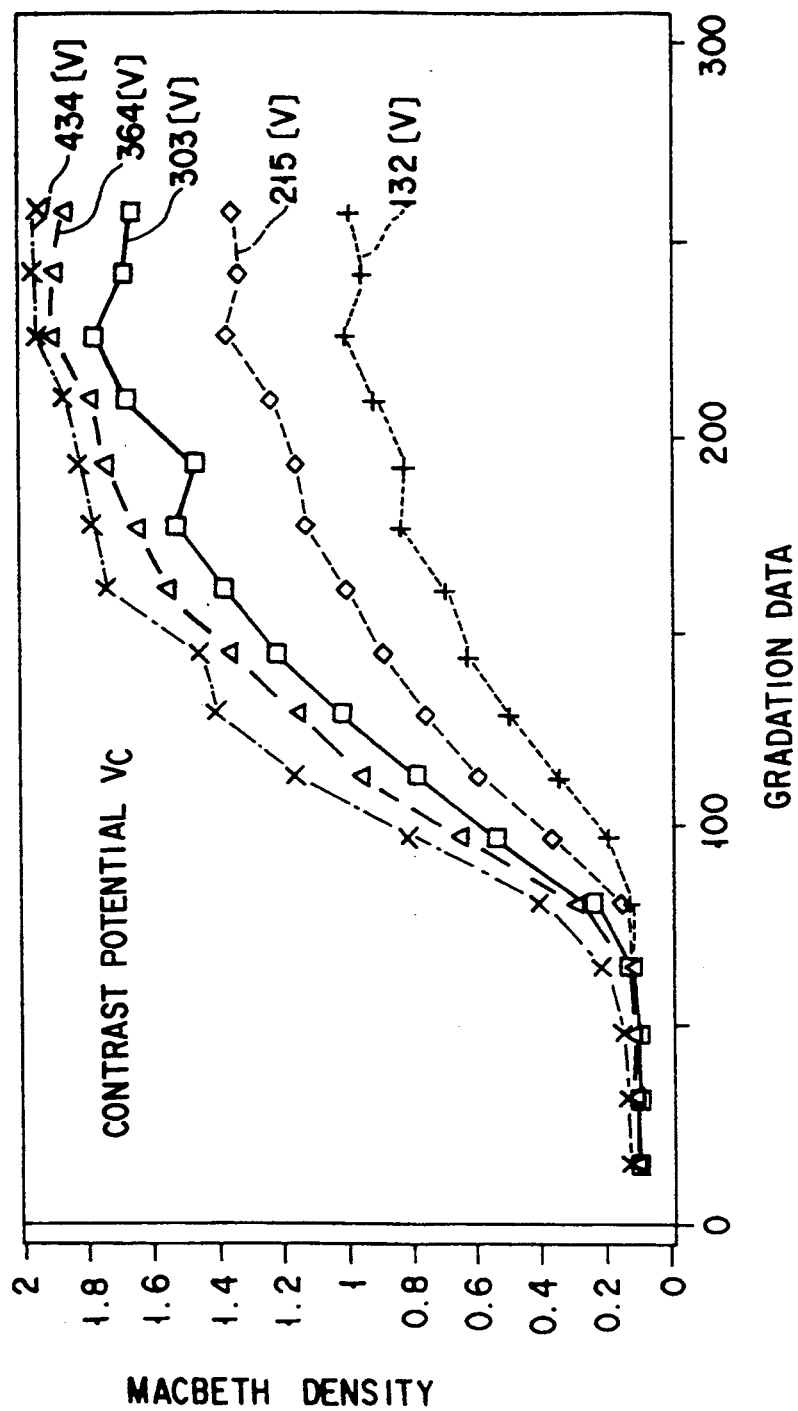
FIG. 26 shows variations in gradation characteristics, obtained when the contrast potential is used as a parameter.

FIG. 26 shows the gradation characteristics obtained by changing the contrast potential as a parameter. The gradation data is indicated along the abscissa, and the output image density is indicated along the ordinate. As is evident from FIG. 26, when the contrast voltage Vc is changed, a change in gradation data increases as the density increases. As the contrast potential is increased, the gradation characteristics vary in a direction in which the gradient of the gradation curve increases. Thus, changing the contrast potential can correct the varied gradation characteristics, in particular, of the high density portion, so as to approach the initial gradation characteristics.

FIG. 27 shows the relation between changes in the pulse-width correction characteristics and the gradation characteristics. The first quadrant shows reference gradation characteristics by use of the output image density (ID) in relation to original data. The third quadrant shows the relation between the original data and corrected data. The second quadrant shows the reference gradation characteristics and changed gradation characteristics by use of the output image density (ID) in relation to the corrected data.

In FIG. 27, in order to perform fine correction, the number of the stages of the corrected gradation data, i.e., of the actual pulse-width modulation data, is set larger than the number of the stages of the original gradation data. In the embodiment, the original data has 16 stages including the "0"th stage (no exposure is performed), while the pulse-width data has 256 stages including the "0"th stage.

The pulse-width correction means (data converting unit 63) shown in FIG. 5 selects, from the pulse-width modulation stages, pulse width data for substantially ideal reference gradation characteristics, which corresponds to the original gradation data.

In principle, reference conditions include all the image forming conditions including a light amount and corresponding to data in which data relation between data items obtained before and after correction by means of the pulse-width correction means is uniform. When all the units and materials relating to image forming are in their initial states under the reference conditions at room temperature and humidity, the output image density relating to the original data shows the reference gradation characteristics indicated by curve $\gamma 0$.

Assume that the gradation characteristics, influenced by the ambient conditions with the lapse of time, have changed such that the closer to the low density portion, the lower the density, as shown by curve $\gamma 1$. In this case, to realize an image density corresponding to original data of the reference gradation characteristics shown in the first quadrant, correction of data indicated by $\phi 1$ is necessary. The gradation characteristics are non-linear characteristics in relation to the pulse width, and are not necessarily changed linearly. However, considering that the original data is linearly proportional to the corrected data facilitates calculation of each corrected data. $\phi 1$ increases the correction data, i.e., pulse width, as the density is low, so as to increase the reduced density, thereby making the gradation data approach the reference gradation characteristics.

Further, assume that the gradation characteristics, influenced by the ambient conditions with lapse of time, have changed such that the closer to the low density portion, the higher the density, as shown by curve $\gamma 2$. In this case, to realize an image density corresponding to each original data of the reference gradation characteristics shown in the first quadrant, correction of data indicated by $\phi 2$ is necessary. $\phi 2$ reduces the correction data, i.e., pulse width, as the density is low, so as to reduce the increased density, thereby making the gradation data approach the reference gradation characteristics.

In principle, any change in the gradation characteristics can be corrected by pulse-width correction. However, as regards the highest density, if it is greatly reduced, appropriate correction cannot be performed. Moreover, if the gradation characteristics are greatly changed and the gradient of the image density relating to the pulse width is increased, the prepared gradation stages cannot provide a sufficient resolving power, and hence more gradation stages are necessary. This will make it necessary to increase the capacities of the pulse-width correction means (data converting unit 63) and the pulse-width modulation means (PWM circuit 72), and will adversely affect the light responsibility or the high-speed drive, or will cause ununiform charging or jitter of the image forming region. Therefore, it is desirable to reduce the renewal amount (correction amount) by combining the processing with use of other means.

The maximum and minimum values of the original data items (in the embodiment "15" and "0", respectively) are made to correspond to the maximum and minimum values of the corrected data items (in the embodiment "255" and "0", respectively), and correction is not performed in a fixed state. The other original data items are converted to corrected data by use of a predetermined function.

Figure 28:
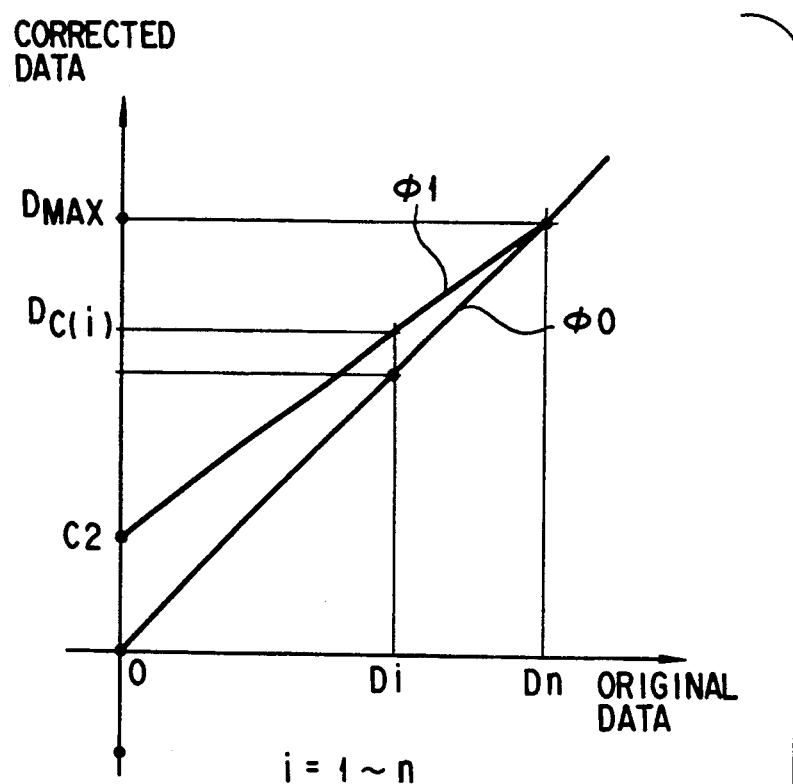
FIG. 28 shows the substantially linear relation between original data and corrected data.

FIG. 28 shows the relation between the original data and the corrected data, which are substantially proportional to each other. The original data before correction are indicated along the abscissa, and the corrected data after the correction along the ordinate. Corrected approximation lines of $\phi 0$ and $\phi 1$ shown in the third quadrant in FIG. 27 are also shown in FIG. 28. Here, the minimum value of the original data is "0", the maximum value thereof is denoted by "Dn", and each data is denoted by "Di" (i=integer from "0" to "n"). Thus, in the embodiment, D0=0, D1=1, ..., Dn=15.

As regards the corrected data, the minimum value is "0", the maximum value is denoted by "Dmax", and correction data corresponding to the i-th original data Di is denoted by "Dc(i)". In the embodiment, Dc(0)=0 ..., Dc(i), ..., Dc(n)=Dmax=255.

Here, the following equation is given:

$$\phi; Dc(i) = C1 \times D(i) + C2 \quad (8)$$

where C1 and C2 are coefficients.

The equation (8) expresses the linear line indicative of the relation between the original data and the corrected data, C1 being the gradient of the line, and C2 being the intercept of the corrected data axis. Since in this case, C2=0 and Dc(i)=Dmax in the equation (8), $\phi 0$ is:

$$\phi 0; Dc(i) = (Dmax/Dn) \times D(i) \quad (9)$$

Further, $\phi$ is given by:

$$\phi; Dc(i) = (Dmax - C2/Dn) \times D(i) + C2 \quad (10)$$

Thus, moving C2 or the intercept of the corrected data axis can perform correction such that the renewal amount of data increases as the data is located in a portion closer to the low density portion.

In the case of using $\phi 1$, when the gradation characteristics have been changed such that the density of data decreases as the data is located in a portion closer to the low density portion (see $\gamma 1$ in FIG. 27), the pulse width is increased as the density decreases. This is realized by changing the coefficient C2 in the equation (10). Accordingly, if a renewal amount $\Delta C$ for C2 is determined, a new C2 can be set to the sum of the renewal amount $\Delta C$ and the present C2.

Then, a table as regards the contrast potential renewal amount and a table as regards the correction coefficient renewal amount are set on the basis of the relation between the high and low density portion differences, thus obtaining the respective renewal amounts in accordance with the differences. The contents of the tables are determined in consideration of interaction between the effects of the contrast potential renewal amount and the pulse-width correction characteristics renewal amount, and can provide appropriate renewal amounts in effective means on the basis of the high and low density portion differences. Further, since the renewal change amounts are set to "0" for differences of "0", respectively, the steady-state deviation approaches "0".

In the step S62, a new contrast potential and a new pulse-width correction coefficient are obtained, by use of the contrast potential renewal amount and pulse-width correction coefficient renewal amount determined in the step S61, as well as the contrast potential and pulse-width correction coefficient obtained at the time of forming the test patterns.

In this embodiment, a new contrast potential Vcnew is the sum of the present contrast Vc and the contrast potential renewal amount $\Delta Vc$.

$$Vcnew = Vc + \Delta Vc \quad (11)$$

Where the background potential is set at an initial predetermined value, a new grid bias voltage and a new developing bias voltage are given by the equations (5) and (6) including the surface potential characteristics coefficient of the photosensitive drum 2, as in the first embodiment.

In addition, to obtain the pulse-width correction data, Dc(i) corresponding to the original data Di (i=2, 3, ..., n−1) is obtained by use of the equation (10) with a new C2 (=the present C2+$\Delta$C). The correction data containing "0" and "Dmax" are transmitted to the pulse-width correcting means.

In the step S63, the new grid bias voltage and developing bias voltage obtained in the step S62 are supplied to the high voltage sources 35 and 44, and the correction data containing "0" and "Dmax" are supplied to the data converting unit 63 as the pulse-width correction means.

Then, the above-described qualitative algorithm, as regards the contents of the tables, will be explained with reference to FIGS. 29 and 30. In the second embodiment, the following control is performed in the substep of the image-forming condition-changing step S5 where two image-forming conditions are determined on the basis of the high and low density portion differences. The contrast potential is mainly reduced when both the differences are positive, and increased when they are negative, as is shown in FIG. 29. The pulse-width correction coefficient is increased in the positive direction when the high density portion difference is near "0" which falls within a predetermined range and the low density portion difference is negative, and is increased in the negative direction when the high density portion difference is near "0" which falls within a predetermined range and the low density portion difference is positive. The reason is that highly effective exposure conditions obtained from the effects of the light amount change and pulse-width correction are mainly employed.

As is shown in FIG. 26, it is difficult to control the reference gradation characteristics to fall within a predetermined range only by changing the pulse-width correction value, when the maximum density is less than a predetermined value. Thus, if the high density portion difference is large in the positive or negative direction, the maximum density is chiefly increased by increasing the contrast potential, as is shown in FIG. 29. If, on the other hand, the high density portion difference is small and the low density portion difference is large, the low density portion difference is reduced by pulse-width correction, and the high density portion difference is kept as it is, or reduced by changing the contrast potential, as is shown in FIG. 30.

Moreover, when it is found in the first time measurement of the toner adhesion amount that the high density portion difference is large in the negative direction and the low density portion difference is small in the negative direction, the contrast potential is greatly increased in the positive direction, but the pulse-width correction coefficient is unchanged, as is shown in the tables in FIGS. 31 and 32. As a result, as is evident also from FIG. 26, the gradation characteristics are changed after correction such that the density of a portion is higher as the portion is closer to the high density portion.

However, if the differences obtained by toner adhesion amount measurement fall outside the predetermined ranges, for example, if the high density portion difference is a low negative value, and the low density portion difference is a low negative value, the contrast potential renewal amount is slightly reduced and the pulse-width correction coefficient renewal amount is slightly increased, as is shown in the tables of FIGS. 33 and 34.

In summary, providing the above-described tables for changing two parameters on the basis of the high and low density portion differences can operate effective means corresponding to gradation characteristics. Further, repeating this operation can add sequential control to the contents of the tables.

FIG. 35 shows an example of the relationship between the number of control cycles and the measured toner adhesion amount Q. FIG. 36 shows an example of the relation between the number of control cycles, the bias values (grid bias voltage VG and developing bias voltage VD), and the pulse-width correction coefficient C.

In FIG. 35, values QH of toner adhered to the high density portion and values QL of toner adhered to the low density portion, which have been measured in every control cycle, are plotted. In FIG. 35, broken lines QHT, QLT indicate target values of toner adhered to the high and low density portions, respectively, and QHP and QLP denote control ranges for the high and low density portions, respectively. In FIG. 35, the control cycle "0" is a cycle in which the toner adhesion amount is measured for the first time in the step S3, and the value C indicates the condition under which the test pattern has been formed. In the control cycle "0", QH and QL are lower than QHT and QLT, respectively, i.e., the high and low density portion differences are high negative values. Thus, as is shown in FIG. 36, control is performed to increase the contrast potential in the image-forming condition-changing step S5 (in the first control cycle; the difference between the grid bias voltage VG and its reference value is substantially the same as that between the developing bias voltage VD and its reference value, and VG and VD are increased).

When the amounts of toner adhered to the test patterns formed under the above condition were measured, it was found in this example that QH was still lower than QHT and QL was slightly higher than QLT. Then, the contrast potential was increased and the pulse-width correction coefficient C was reduced in the image-forming condition-changing step S5. As a result, QH and QL fell within the respective predetermined ranges (QHP, QLP), thereby terminating the control.

In the above embodiment, control is started upon the turning on of the apparatus. However, as is shown in FIG. 10, a similar control can be performed when the front door (not shown) of the apparatus has been opened and closed, when a control-effecting command has been input to the apparatus from an external apparatus, when a predeterminable time period has elapsed after termination of the control, when printing has been made on a predetermined number of sheets after termination of the control, or when a signal indicates that the toner supply is empty has been removed.

Specifically, when the front door of the apparatus has been opened and closed, for example, to remove a jammed sheet from a sheet-supplying or sheet-exhausting unit, or to perform maintenance of the apparatus, outside light may enter the photosensitive drum 2, thereby adversely affecting its surface potential characteristics or the temperature or humidity in the apparatus is abruptly changed. To avoid these conditions, the above control is performed in accordance with detection performed by a door sensor (not shown) for sensing the open/closed states of the front door, after termination of an initial operation such as a warm-up operation.

The control is performed when a control-effecting command is input from outside, i.e., when the control-effecting command is input by operating the operation panel 49 or from outside of the apparatus.

When the timer 58 has measured a predetermined time period after termination of the control, i.e., when a long time period has elapsed after termination of the control, it is possible that the gradation characteristics change due to changes in the temperature and humidity in the apparatus in accordance with changes in the external temperature and humidity, or those changes in the surface potential characteristics of the photosensitive drum 2 which result from recovery from optical fatigue, or those changes in toner/carrier density or charge amount which result from leaving once-mixed developer as it was. To avoid these, the control is performed a predetermined time period after termination of the last control, as measured by the timer 58.

When printing has been made on a predetermined number of sheets after termination of the control, it is possible that the gradation characteristics change because of changes in the surface potential characteristics of the photosensitive drum 2 due to optical fatigue, or changes in the charge amount of the developer. To prevent these, the control is performed after printing has been made on a predetermined number of sheets, counted by a counter after termination of the last control. In performing continuous printing, the control is performed after printing has been made on a predetermined number of sheets set by the user.

Moreover, the control is performed when a toner-empty indicating signal has been removed, i.e., when the toner has been refilled after toner empty condition is detected, when a cartridge including toner has been exchanged with a new one, when a process unit including toner or the drum 2 has been exchanged with a new one, or when a toner-empty flag (not shown) has been reset.

In any of the above cases, the operation panel 49 displays, during the control, a signal indicating that the control is being performed, and supplies the external input (of the operation panel 49 or of the apparatus) with a "busy" signal to delay printing.

Then, control terminating conditions will now be explained.

There are several control terminating conditions: when the high and low density portion differences fall within predetermined control ranges (normal termination); when a predetermined number of control cycles, counted by a counter 71, have been completed (termination after a maximum number of control cycles); when the calculation results of the bias voltages, exposure amount, and pulse-width correction coefficient have reached predetermined values (termination after operation amount limit); and when the outputs of the toner adhesion measuring unit 8 have reached predetermined values (termination due to sensor output abnormality).

Specifically, when the high and low density portion differences fall within predetermined control ranges (normal termination), i.e., when it is determined in the determination step S4 that the high and low density portion differences fall within target control ranges, the apparatus enters the waiting state with a target exposure control amount and pulse-width correction data kept as they are. That is, the control is normally terminated after achieving target values.

When the control is not normally terminated, the program proceeds to the image-forming condition-changing step S5, where the forming of test patterns, and detection and determination of the toner adhesion amount are repeated. However, if the steady-state deviations do not fall within the predetermined ranges for some reason though they are converged, it is necessary to limit the maximum time period for allowing the control, to a reasonable value, since the control can be performed endlessly.

Since in the embodiment, renewal amounts of parameters as operation amounts are determined to correspond to deviations from target values, and a change amount of "0" is made to correspond to a deviation of "0", the steady-state deviation theoretically approaches "0". Actually, however, it is possible that the number of control cycles required to converge the deviation increases or decreases, for example, where the effect of a change in operation amount on the gradation characteristics varies over time.

Thus, it is very advantageous to change the exposure conditions within allowable control cycles in a direction in which the steady-state deviation is reduced. To this end, the number of times of image-forming condition changing performed during the control is counted by the counter 71, and the apparatus enters a waiting state, with the exposure control target value and pulse-width correction data obtained when a predetermined number of control cycles have elapsed, maintained as they are.

Then, when the calculated bias values, exposure amount, and pulse-width correction coefficient have reached predetermined values, respectively (operation amount limit), as regards the calculated bias voltage and target exposure amount and the actually-set target voltage, output voltages corresponding to those set in the D/A converters 47 and 48 are supplied as comparison voltage signals of the high voltage sources 35 and 44 or the light amount control circuit 74. The set target values and output voltages of the D/A converters 47 and 48 are adjusted beforehand so as to output the set target values.

However, if the calculated values fall outside the output ranges of the high voltage sources 35 and 44 and light amount control circuit 74, the output voltage recognized by the control circuit 45 differs from the actual output voltage, resulting in erroneous control.

Further, control must be performed within a range in which an image defect, such as fog or deterioration of the laser diode 65, will not occur. Moreover, turbulence can occur, for example, in the texture of an image in the case of performing pseudo gradation processing when the difference between correction data items obtained by use of the resolving power of the pulse-width correction data items and corresponding to different original data items cannot be resolved.

To avoid the above disadvantages, the set values are actually renewed only when the exposure control target value and pulse-width correction coefficient fall within respective predetermined ranges, each range being defined by predetermined lower and upper limits. If they do not fall within the ranges, renewal of the set values is not performed, the control is terminated and the control circuit 45 enters the waiting state. The present exposure control target value and pulse-width correction coefficient (correction data) are maintained.

When the outputs of the toner adhesion measuring unit 8 have reached predetermined values (sensor output abnormality is detected), they are transmitted to the A/D converter 46, where they are photoelectrically converted to signals indicative of the respective reflection amounts of high and low density test patterns and the reflection amount of the portion of the drum 2 other than the high and low density test patterns. These converted signals are then transmitted to the control circuit 45. At this time, detection accuracy may be degraded and the control system be erroneously operated, due to a defect in the power source, deterioration of the light source 51, contamination of light-emission/receiving paths, a defect in the light/receiving circuit or between the sensor/signal-receiving circuits, flaws on the drum 2, a change in the reflectance of filming, etc., or deterioration of the test pattern-forming unit.

To prevent any of the above problems, predetermined lower and upper limits are provided for each of the outputs indicating the reflection amounts of high and low density test patterns and the reflection amount of the portion of the drum 2 other than the high and low density test patterns. If any one of the outputs falls outside its predetermined range, no further calculation/determination is performed, thereby setting a sensor abnormality flag so as to display on the operation panel that the toner adhesion amount measuring unit 8 is abnormal. Then, the apparatus enters the waiting state, with the data items assumed before abnormality occurs in the unit 8 maintained as they are.

The sensor abnormality flag is reset by initial processing when the apparatus is turned on. It can be reset by a reset command manually supplied from the operation panel at the time of maintenance of the apparatus. When the flag is set, no control is performed.

Then, detection sequence (the test pattern forming and developing steps and toner adhesion amount measuring step) will be explained. 10 In the first embodiment, to form test patterns, the operations other than image transfer, sheet supply, sheet exhaustion, fixing are performed at the same timing as the normal printing operation is performed. The reason why image transfer is not performed is that toner is prevented from being adhered to the photosensitive drum 2 in a state where no transfer medium (sheet of paper) is set.

The light source 51 of the toner adhesion amount measuring unit 8 can be turned on and off by a light source remote signal output from the control circuit 45, and is turned on so that detection can be performed after a predetermined time period required to stabilize the amount of light elapses after the turn on.

Thus, in the normal printing operation, the light source 51 of the toner adhesion amount measuring unit 8 does not emit light. The potential of an unexposed portion, which is the surface potential of the drum 2 before image transfer, is optically discharged by light emitted from the light source 51, thereby preventing scattering of dirt of an image or toner. In addition, the light emission is performed in the same position in the axial direction of the drum 2 with a necessary minimum amount of light. This prevents the quality of an image from being damaged over a long time as a result of optical fatigue of the light-receiving portion of the drum 2.

In the second embodiment, the sheet-attracting operation and sheet-peeling operation of the transfer drum 9 are omitted, as well as the image transfer, sheet supply, and sheet exhaustion. As regards the transfer drum 9, only the cleaning operation of the transfer-medium supporter is performed. Hence, the toner of a test pattern developed on the photosensitive drum 2, which is adhered to the transfer-medium supporting member, is greatly reduced. Accordingly, the test pattern forming and toner adhesion measurement can be performed without considering the position of the transfer drum 2.

Then, input and storage of various set values will be explained. The set values relating to the control of the embodiment include, for example, an initial exposure control target value, an initial pulse-width correction counter value, test pattern gradation data items (on the high and low density portions), a target value of the high density portion, a target value of the low density portion, control limit values for the high density portion difference, control limit values for the low density portion difference, a maximum correction data value, a predetermined number of printing sheets, a predetermined time period, a maximum number of control cycles, an exposure condition range, and a sensor abnormality range.

These set values are stored in memory means, whose contents are not deleted even when the apparatus is turned off, for example, the backed-up memory 57. At least the targets values of the high and low density portion differences can be renewed and displayed by use of the operation panel 49.

FIG. 37 shows an image-forming condition-changing step S5 employed in a further embodiment of the invention. The other steps are similar to those in FIG. 10. The step S5 mainly consists of three sub-steps S51 to S53, in which the light amount control target values of the exposure system are renewed and the exposure amount and exposure width are renewed by renewing of the contents of the pulse-width modulation data correction table, so as to cause the high and low density portion differences to fall within respective predetermined ranges.

In the step S51, renewal amounts of the exposure conditions, expressed by two parameters are determined on the basis of the high and low density portion differences. In the step S52, a light amount control target value of the exposure system and a renewal amount of the contents of the pulse-width correction table are calculated by use of a predetermined function and the renewal amounts of the exposure conditions. In the step S53, the light amount control target value and the renewal values of the pulse-width correction table are set at predetermined points of time.

Selecting the light amount target value and the renewal value of the correction table from a prestored table on the basis of the high and low density portion differences involves a problem for the following reasons: Suitable renewal amounts to maintain the developing characteristics, which are changed by the ambient conditions and with lapse of time, vary depending upon the history of the photosensitive drum 2 or the developer and upon variations between products. Thus, it is possible that the converged values obtained after repeated detection deviate from the target values with the lapse of time.

Further, changes of the exposure conditions of the high density portion do not necessarily exert themselves independently of changes of the exposure conditions of the low density portion, but can interact. Thus, it is undesirable to determine the exposure conditions on the basis of each of the high and low density portion differences.

Thus, in the step S51, renewal amounts of the exposure conditions, expressed by the two parameters, are selected from a table preset on the basis of the relation between the high and low density portion differences. One of the two parameters is a renewal amount of a light amount control target value for controlling the light amount of the exposure system, specifically, a renewal amount of a comparative voltage (target voltage) of a signal obtained as a result of photoelectric conversion by means of a light amount monitor. The other parameter is a renewal amount of a coefficient of the function for changing the contents of the pulse-width data (gradation data) correction table.

As explained with reference to FIG. 12, as regards the effects of light amount renewal on the gradation characteristics, a greater change appears with respect to a change in light amount as the density increases, and the gradient of gradation increases as the light amount becomes larger. Accordingly, the gradation characteristics can be corrected to values near the reference values by changing the light amount in the gradation characteristics in which the degree of change is higher as the density increases. However, it is difficult to correct a linear change in the gradation characteristics on the low density side only by changing the light amount.

On the other hand, as is shown in FIG. 27, correction can be performed by pulse width correction, principally whatever the gradation characteristics are. However, as regards the highest density, if it is greatly reduced, an appropriate correction cannot be performed. Moreover, if the gradation characteristics are extremely changed and the gradient of the image density relating to the pulse width is increased, the prepared gradation stages cannot provide a sufficient resolving power, and hence more gradation stages are necessary. This will make it necessary to increase the capacities of the pulse-width correction means (data converting unit 63) and the pulse-width modulation means (PWM circuit 72), will adversely affect the light responsibility or the high-speed drive, or will cause non-uniform charging or Jitter of the image forming region. Therefore, it is desirable to reduce the renewal amount (correction amount) by combining the processing with other means.

The maximum and minimum values of the original data items (in the embodiments "15" and "0", respectively) are made to correspond to the maximum and minimum values of the corrected data items (in the embodiments "255" and "0", respectively), and correction is not performed in a fixed state. The other original data items are converted to corrected data by use of a predetermined function.

As is shown in FIG. 28, the relation between the original data and the corrected data is substantially linear.

In the step S52, a new light amount and a new pulse-width correction coefficient are obtained, by use of the light amount correction value and pulse-width correction coefficient renewal amount determined in the step S51, as well as the light amount and pulse-width correction coefficient obtained at the time of forming the test patterns.

In this embodiment, a voltage to be supplied as a target value to the light amount control means (corresponding to the light amount control circuit 74 in FIG. 5) of the exposure system is calculated by use of the equation (7), as in the above-described embodiment.

In addition, to obtain the pulse-width correction data, Dc(i) corresponding to the original data Di (i=2, 3, . . . , n−1) is obtained by use of the equation (10) with a new C2 (=the present C2+ΔC). The correction data containing "0" and "Dmax" are transmitted to the pulse-width correcting means.

In the step S53, the voltage supplied as the new target value of the light amount control means of the exposure system and obtained in the step S52 is transmitted to the light amount control circuit 74, and the correction data items containing "0" and "Dmax" are supplied to the data converting unit 63 as the pulse-width correction means.

As is explained referring to FIG. 10, to again form, measure, and determine test patterns, two test pattern latent images are formed by use of the renewed target value of the light amount control means of the exposure system and renewed correction data of the pulse-width correction means. Subsequently, these latent images are developed and subjected to processing in the toner adhesion amount measuring step S3 and the determination step S4. In the step S4, if it is determined that the high and low density portion differences fall within respective predetermined ranges, the apparatus enters a waiting state after cleaning operation, with the renewed target value and the renewed corrected data maintained as they are. If at least one of the differences falls outside its predetermined range, operations, such as image forming condition changing, and test pattern forming, measuring, and determining, are repeated.

In FIG. 38, the laser amounts P and the pulse-width correction coefficients C are plotted in relation to control cycles. The control cycle "0" is a cycle in which the toner adhesion amounts QH and QL are measured for the first time in the step S3, and the values C and P indicate the conditions under which the test patterns have been formed. As is shown in FIG. 35, QH and QL are lower than QHT and QLT, respectively, i.e., the high and low density portion differences are high negative values. Thus, control is performed to increase the contrast potential in the image-forming condition-changing step S5 (in the first control cycle).

When the toner adhesion amounts of the test patterns formed under the above condition were measured, it was found that QH was still lower than QHT and QL was slightly higher than QLT. Then, the laser amount P was increased and the pulse-width correction coefficient C was reduced in the image-forming condition-changing step S5. As a result, QH fell within its predetermined range (QHP), and QL approached QLT. Further, the laser amount P and pulse-width correction coefficient C were changed in a similar manner (in the third control cycle), with the result that QH and QL fell within respective predetermined ranges, thereby terminating the control.

Figure 39:
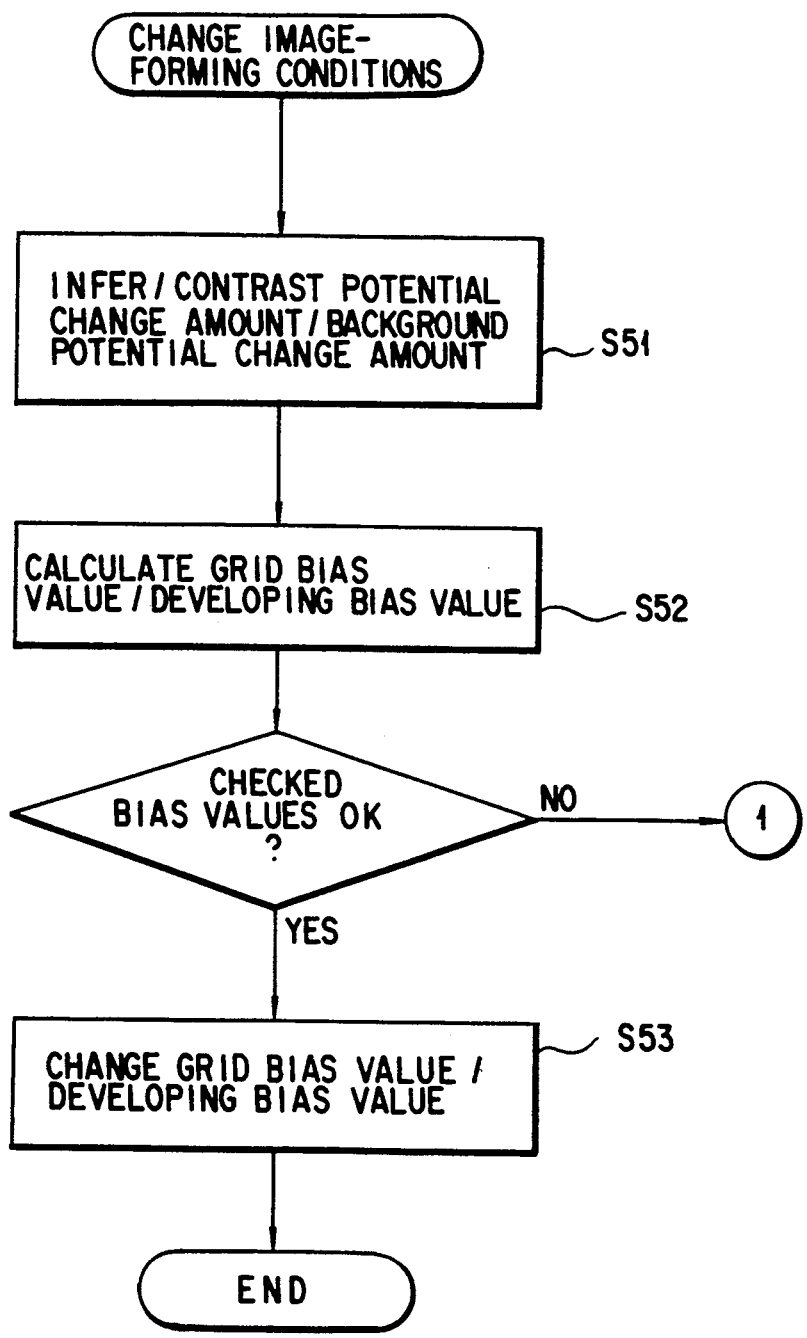
FIG. 39 is a flowchart, chiefly useful in explaining image-forming condition-changing processing according to a fourth embodiment of the invention.

FIG. 39 is a flowchart, showing that operation of the image-forming condition-changing unit which is an essential part of a further embodiment of the invention. The other operations of this embodiment are similar to those shown in FIG. 10. Thus, the entire structure of the embodiment will be explained with reference to FIGS. 2 and 5.

In this embodiment, the control circuit 45 compares the output (measured value) of the toner adhesion amount measuring unit 8 with a predetermined reference value, and changes the grid bias voltage of the charger 3 and the developing bias voltage of the developing unit 4, which are the image forming conditions, in accordance with the comparison result.

The memory section 56 stores various set values such as an initial grid bias voltage and an initial developing bias voltage, which correspond to bias conditions for obtaining reference gradation characteristics at room temperature and humidity. The bias conditions include the upper and lower limit values (predetermined range) of each of the grid bias voltage and the developing bias voltage, and a predetermined range of the difference therebetween. The memory 56 also stores tables relating to renewal values of the contrast voltage and of the background voltage, respectively. The memory 57 stores bias values set before the toner adhesion amount measuring unit 8 is abnormal, i.e., stores them at the time of setting a bias renewal mode. The memory 57 has a counter for counting the number of control cycles, a counter for counting the number of printed paper sheets, a sensor abnormality flag to be set when the toner adhesion amount measuring unit 8 is abnormal, and a toner-empty flag to be set when the toner container is empty.

The relation between the surface potential (hereinafter called "unexposed-portion potential") VO of the photosensitive drum 2 uniformly charged by the charger 3, the surface potential (hereinafter called "exposed-portion potential") VL of the photosensitive drum 2 attenuated as a result of overall exposure by use of a constant amount of light emitted from the optical system 13, a development bias voltage VD (shown by the one-dot line), and the absolute value VG (hereinafter simply called "grid bias voltage") of the bias voltage −VG applied to the grid electrode 33 of the charger 3, is shown in FIG. 6.

If the exposed-portion potential VL and unexposed-portion potential VO are made to substantially be proportional to the grid bias voltage VG, they can be given by the equations (1) and (2). Further, the contrast potential VC, background potential VBG, grid bias voltage VG, and developing bias voltage VD can be given by the equations (3) to (6), and have characteristics as explained with reference to FIGS. 6 to 8.

Then, the bias renewal mode assumed in the above structure will be explained by use of the flowcharts of FIGS. 10 and 39.

The bias renewal mode consists of a warm-up step, a test-pattern forming step, an adhesion amount measuring step, a determination step, and a bias renewal step.

If it is determined after the warm-up step that the toner adhesion amount measuring unit 8 is abnormal, the CPU 59 enters a waiting state, with the high voltage sources 35 and 44 supplied with the initial grid bias voltage and developing bias voltage corresponding to the bias conditions for obtaining the reference gradation characteristics at room temperature and humidity. Specifically, the initial grid bias voltage and developing bias voltage read from the memory section 56 are respectively supplied to the D/A converters 47 and 48, where they are converted to output voltage control signals and then supplied to the high voltage sources 35 and 44, respectively. Thus, the high voltage sources 35 and 44 are controlled by the initial grid bias voltage and developing bias voltage, respectively.

If it is determined that at least one of the high and low density portion differences falls outside of its predetermined range, the program proceeds to the bias renewal step shown in FIG. 39 and corresponding to the image-forming condition-changing step S5. In this step, renewal values of the grid bias voltage and developing bias voltages are obtained so as to cause the high and low density portion differences to fall within respective predetermined ranges.

The renewal step mainly has three sub-steps - (i) a step S51 for determining a renewal amount relating to the potential relation expressed by two parameters on the basis of the high and low density portion differences; (ii) a step S52 for calculating renewal bias values by use of the determined renewal value and a predetermined function including a coefficient indicative of the surface potential of the photosensitive drum 2; and (iii) a step S53 for setting the grid bias voltage and developing bias voltage to the calculated renewal values at predetermined points of time.

A method for selecting a developing bias voltage and a grid bias voltage from a predetermined table made directly on the basis of the high and low density portion differences may involve a problem for the following reason. Suitable renewal amounts to maintain the developing characteristics, which are changed by the ambient conditions and with lapse of time, vary depending upon the history of the photosensitive drum 2 or the developer and upon variations between products, or vary over time. Thus, it is possible that the converged values obtained after repeated detection are deviated from target values with lapse of time.

In this case, as the contents of the table, speed-type control data corresponding to renewal amounts of the contrast potential and background potential is more preferable than position-type control data corresponding to contrast, background, grid bias, and developing bias voltages.

Further, changes of the exposure conditions of the high density portion do not necessarily act independently of changes of the exposure conditions of the low density portion, but can interact. Thus, it is undesirable to determine the exposure conditions on the basis of each of the high and low density portion differences.

Renewal values relating to the potential relationship expressed by two parameters are selected from a table made based on the relation between the high and low density portion differences.

One of the parameters is a contrast voltage indicative of the difference between the developing bias voltage and the exposed-portion potential which is the surface potential of a developing portion exposed with a predetermined exposure amount. The other parameter is a background potential indicative of the difference between the developing bias voltage and the unexposed-portion potential which is the surface potential of a developing portion unexposed after being charged. A change in the contrast voltage increases as the density increases, while a change in the background voltage increases as the density decreases.

As is shown in FIG. 26, the gradation characteristics change when the contrast voltage is changed. Similarly, as is shown in FIG. 13, the gradation characteristics change also when the background voltage is changed. Changes in the contrast and background voltages affect the high and low density portions, respectively, and interact each other.

In consideration of the above, a table of renewal amounts of the contrast voltage and a table of renewal amounts of the background voltage are prepared on the basis of the relation between the high and low density portion differences, and stored in the memory section 56, thereby selecting renewal values of the contrast and background voltages in accordance with the high and low density portion differences.

In summary, the contents of the tables are made in consideration of the interaction between the contrast and background voltages. Hence, renewal voltage values can effectively be changed on the basis of the relationship between the differences. Further, since both renewal values are set to "0" when the differences are both 0, the steady-state deviation approaches 0 after it is converged.

New contrast and background voltages are calculated from the renewal amounts of the contrast and background voltages and the contrast and background voltages obtained at the time of forming the test patterns.

These voltages are parameters indicative of the voltage relationship, and renewal values of the grid bias voltage and developing bias voltage for realizing the voltage relationship are calculated.

The renewal values of the grid bias voltage and developing bias voltage can be obtained directly by use of a predetermined function (as explained referring to the equations (5) and (6)), including a coefficient indicating the surface potential of the photosensitive drum 2 and stored in the memory section 61.

The obtained new grid bias voltage and developing bias voltage are set as new output control values of the high voltage sources 35 and 44, respectively.

To form test patterns again after the set values are renewed, renewal values of the grid bias voltage and the developing bias voltage are set at predetermined points of time as shown in FIG. 14.

Now, the qualitative algorithm, as regards the contents of the above-described tables, will be explained. In this embodiment, in the step for determining two renewal amounts on the basis of the high and low density portion differences, the following operations will be performed: if the both differences are positive values, which indicates that the amounts of toner adhered to the high and low density portions, the exposure amount is reduced mainly; if the both differences are negative values, the exposure amount is increased mainly; if the high density portion difference is substantially "0" thus, falling within its predetermined range, and the low density portion difference is a negative value, the background potential is reduced. If the density portion difference is substantially "0" thus, falling within its predetermined range, and the low density portion difference is a positive value, the background potential is increased. The reason is that a highly effective voltage relationship is realized by the effects of the exposure amount and the background potential and is principally employed.

Moreover, as is evident from FIGS. 13 and 26, a change in the background voltage greatly influences the gradation characteristics, as compared with a change in the contrast voltage. To prevent fog on the photosensitive drum 2, or to prevent toner charged with inverse voltage from sticking thereto, or to prevent carrier adhesion in the case of using a two-component developer, the rate of renewal of the background potential is kept low, thereby performing rough adjustment mainly by changing 10 the exposure amount in consideration of the high density portion, and performing fine adjustment by changing the exposure amount and background potential in consideration of both the high and low density portions.

A table of renewal amounts for changing the potential relationship on the basis of the above-described qualitative rules is stored in the memory section 56 in the control circuit 45.

The contents of the table (stored in the memory section 56) relating to the renewal amounts of the background voltage are shown in FIG. 16.

If a renewal amount of operation is determined in accordance with each of the differences, a renewal amount of the background potential, in particular, can be erroneously determined. However, since in the embodiment, the exposure amount and the background potential are determined from the relationship between the high and low density portion differences, an appropriate amount of operation can be determined by use of a parameter renewal amount suitable to the operation, even if one of the differences falls within its predetermined range and the other difference falls outside its predetermined range.

FIGS. 17 and 18 show variations in different two gradation characteristics. Specifically, the toner adhesion amount of the low density portion is a little lower than a reference value in both cases of FIGS. 17 and 18. The toner adhesion amount of the high density portion, however, is much lower than a reference value in the case of FIG. 17, and is substantially equal to the reference value (i.e., the difference is substantially "0") in the case of FIG. 18. It can be understood from the effects of renewal values of the contrast voltage shown in FIG. 26 that it is effective to mainly increase the contrast voltage in the case of FIG. 17 in which the toner adhesion amount of the high density portion is much lower than the reference value. Further, it can be understood from the effects of renewal values of the background voltage shown in FIG. 13 that it is effective to slightly decrease the background potential in the case of FIG. 18 in which the high density portion difference is substantially "0".

Thus, an appropriate amount of operation can be obtained in consideration of the relation between the high and low density portion differences, instead of determining independent operation amounts from the high and low density portion differences, respectively.

Further, in the toner adhesion measuring step in the first cycle, if the low density portion difference is a low negative value, and the high density portion difference is a high negative value, the renewal amount of the contrast voltage is increased in the positive direction, and the renewal amount of the background voltage is set to "0" (i.e., the background potential is not changed), as shown in FIGS. 31 and 20.

After the bias voltages are calculated by use of the above results, and used as renewed values, the amounts of toner adhered to test patterns are again measured. As is evident from FIG. 26, the high and low density portion differences will be shifted in the positive direction as a result of bias renewal.

At this time, if the differences fall within the respective predetermined ranges, the control processing is completed. If the high density portion difference falls within its predetermined range, and the low density portion difference is slightly lower than the lower limit of its predetermined range, the renewal value of the contrast voltage is very slightly reduced and the renewal value of the background voltage is slightly reduced, as is shown in FIGS. 33 and 22. When the background voltage is reduced, the degree of change in image density decreases as the density decreases. As regards the high density portion, the degree of change in image density would relatively increase if the renewal value of the contrast voltage would not be reduced. Actually, however, since the contrast voltage is very slightly reduced, the image density is substantially unchanged in the high density portion.

As described above, measurement of the toner adhesion amount and change of the bias voltages are repeated, thereby performing sequential control in which on the basis of the relation between the high and low density portion differences shown in tables, the high density portion difference is roughly adjusted by use of a renewed contrast voltage, and the high and low density portion differences are then finely adjusted by use of the renewed background and contrast voltages.

Then, changes in the toner adhesion amount and bias values as the inputs of the measuring system during the control will be explained with reference to FIGS. 40 to 43.

Figure 40:
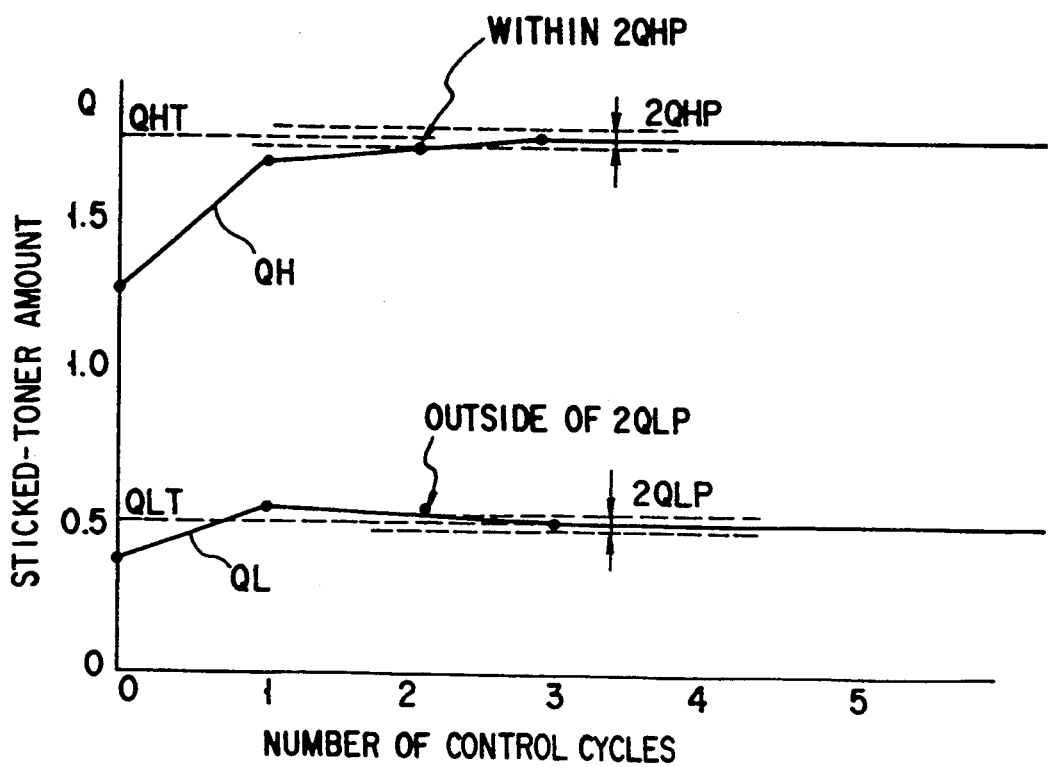
FIGS. 40 and 42 are graphs, useful in explaining changes in toner adhesion amount, which are input to a measuring system during control cycles.
Figure 41:
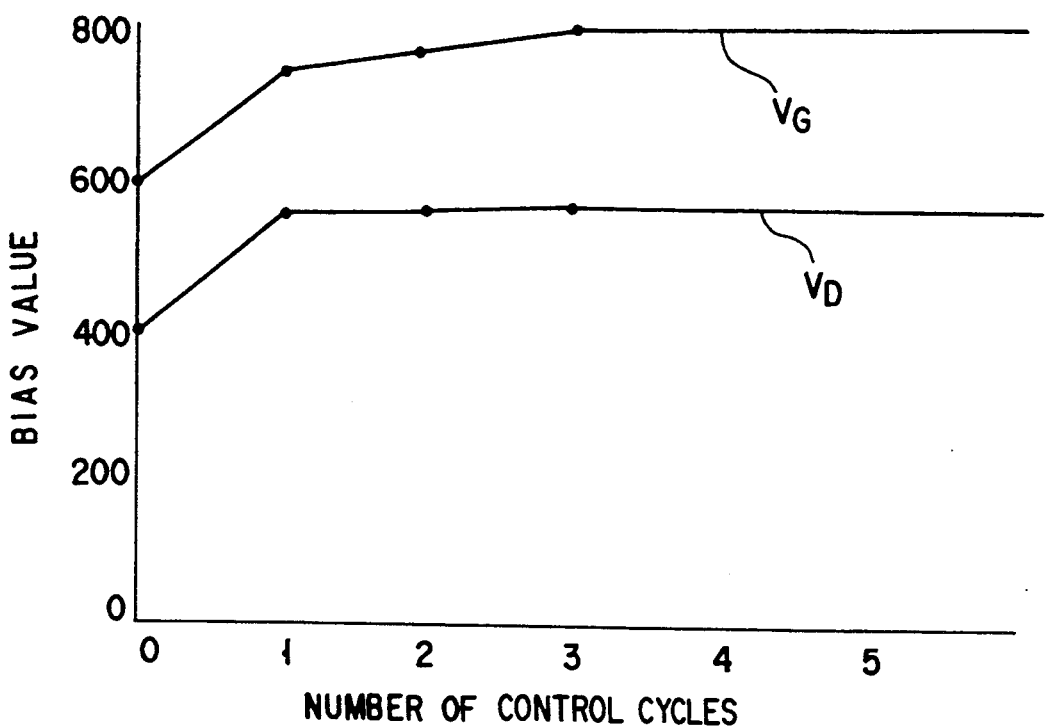
FIGS. 41 and 43 are graphs, useful in explaining changes in bias values, which are input to a measuring system during control cycles.

FIGS. 40 and 41 show the cases in which the high and low density toner adhesion amounts QH and QL are lower than the respective target values QHT and QLT at low temperature and humidity. In FIGS. 40 and 41, the number of control cycles is indicated along the abscissa. In FIG. 40, the detected toner adhesion amounts are indicated along the ordinate. In FIG. 41, the bias values are indicated along the ordinate.

When the control cycle is 0, the grid bias voltage VG and the developing bias voltage VD are set to predetermined initial values, respectively, thereby forming high and low density test patterns. At this time, since the high and low density portion toner adhesion amounts QH and QL are lower than the respective target values QHT and QLT, and do not fall within respective predetermined ranges QHP and QLP, renewal amounts thereof are calculated in the bias renewal step.

As in the cases shown in FIGS. 31 and 20, the toner adhesion amount of the high density portion is very small (i.e., the high density portion difference is large in the negative direction), the grid bias voltage VG and the developing bias voltage VD are changed so as to increase the contrast voltage (in the first control cycle).

Subsequently, the toner adhesion amount of test patterns formed with the renewed bias voltages is detected. As is evident from FIG. 26, increment of the contrast voltage increases the toner adhesion amounts QH and QL to respective target values (in the first control cycle).

As a result, the toner adhesion amount QH of the high density portion is still lower than the target value QHT, and the toner adhesion amount QL of the low density portion becomes higher than the target value QLT.

At this time, renewal amounts are selected from the tables of FIGS. 29 and 16 so as to slightly increase the contrast voltage and to increase the background voltage. Renewal amounts of the grid bias voltage VG and the developing bias voltage VD are calculated, based on the renewal amounts of the contrast and background voltages (in the second control cycle).

Thereafter, test patterns are formed by use of the bias values renewed in the second control cycle, and the toner adhesion amounts are measured. Since the toner adhesion amounts QH and QL still do not fall within the respective predetermined ranges QHP and QLP (in the second control cycle), bias renewal is again repeated (in the third control cycle). As a result, the toner adhesion amounts QH and QL fall within the respective predetermined ranges QHP and QLP, thereby terminating the control. In this case, though the maximum control cycle number is set at five, the steady-state deviation is converged in the third control cycle and the control is normally terminated.

Figure 42:
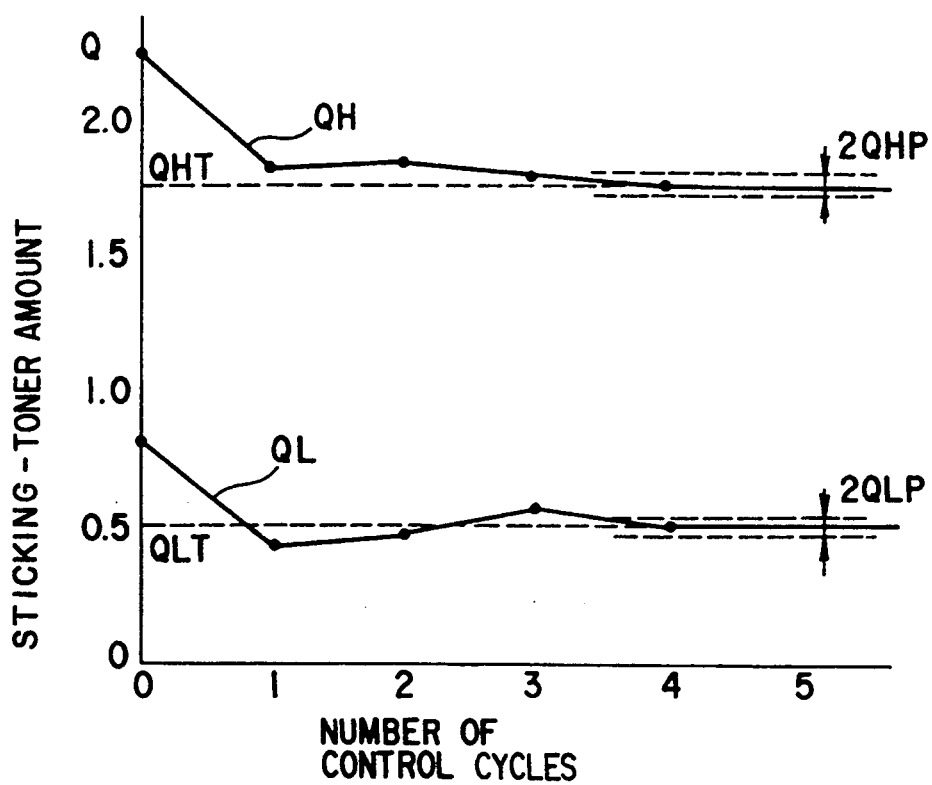
Figure 43:
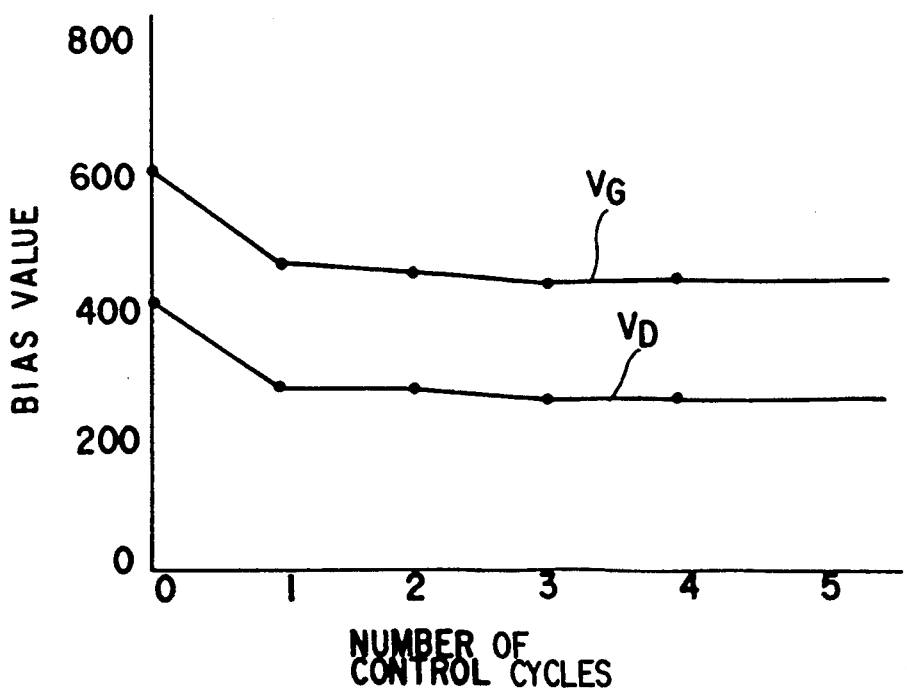

FIGS. 42 and 43 show the cases in which the high and low density toner adhesion amounts QH and QL are higher than the respective target values QHT and QLT at high temperature and humidity. In FIGS. 42 and 43, the number of control cycles is indicated along each axis of the abscissa. In FIG. 42, the detected toner adhesion amounts are indicated along the ordinate. In FIG. 43, the bias values are indicated along the ordinate.

In this case, since the toner adhesion amounts QH and QL obtained by use of initial bias values are higher than the respective target values (in the 0-th control cycle), the grid bias voltage VG and developing bias voltage VD are changed by reducing the contrast voltage (in the first control cycle). As a result, QH and QL approach the respective target values QHT and QLT. Thereafter, the background voltage is substantially changed and the contrast voltage is slightly changed, thereby converging these voltages to values falling within the predetermined ranges, respectively. In this case, four control cycles are necessary to achieve convergence.

As described above, parameter renewal amounts for the high and low density portions are selected individually, or in combination, from tables on the basis of the relation between the high and low density portion differences, and the parameters are changed by the renewal amounts by changing the image-forming conditions, thereby confirming the effects of changing and repeating the control when at least one of the toner adhesion amounts falls outside its predetermined range. Thus, the toner adhesion amounts are converged to respective target values.

Now, control terminating conditions will be explained.

There are several control terminating conditions: when the high and low density portion differences fall within predetermined control ranges stored in the memory section 56 (normal termination); when a predetermined number of bias changing control cycles, stored in the memory section 56, have been completed (termination after a maximum number of control cycles); when calculation results of the bias renewal values have reached predetermined values stored in the memory section 56 (termination after operation amount limit); and when the outputs of the toner adhesion measuring unit 8 have reached the predetermined values stored in the memory section 56 (termination due to sensor output abnormality).

Specifically, when the high and low density portion differences fall within predetermined control ranges (normal termination), i.e., when it is determined in the determination step that the high and low density portion differences fall within target control ranges, the apparatus enters the waiting state with the present target exposure control amount and pulse-width correction data kept as they are. That is, control is normally terminated after achieving target values.

When bias changing control has been performed a predetermined number of times (termination after a maximum number of control cycles), i.e., when the control is not normally terminated, the program proceeds to the bias changing step, where forming of test patterns, and detection and determination of the toner adhesion amounts are repeated. However, if the steady-state deviations do not fall within the predetermined ranges for some reason though they are converged, control will be performed endlessly.

Further, it is necessary to limit a maximum time period required for control. Since in the embodiment, renewal amounts of parameters as operation amounts are determined to correspond to deviations from target values, and a change amount of "0" is made to correspond to a deviation of "0", the steady-state deviation theoretically approaches "0". Actually, however, it is possible that the number of control cycles required to converge the deviation increases or decreases, for example, where the effect of a change in operation amount on the gradation characteristics varies over time.

Thus, it is very effective to change the bias values within allowable control cycles in a direction in which large steady-state deviations are reduced. To this end, the number of times of bias changing performed during the control is counted by the counter stored in the memory section 57, and the state of the apparatus enters a waiting state, with the grid bias voltage and developing bias voltage obtained when a predetermined number of control cycles have elapsed, maintained as they are.

When the calculated bias renewal values have reached predetermined values (operation amount limit), as regards the calculated bias voltage and target exposure amount, and the actually-set target voltage, output voltages corresponding to those set in the D/A converters 47 and 48 are supplied as comparison voltage signals of the high voltage sources 35 and 44 or the light amount control circuit 74. The set values to the D/A converters 47 and 48 and the output voltages of the high voltage sources 35 and 44 are adjusted beforehand so as to output the set bias values.

However, if the calculated values fall outside the output ranges of the high voltage sources 35 and 44, the output voltage recognized by the CPU 59 will differ from the actual output voltage, resulting in erroneous control.

Further, control must be performed within a range in which an image defect or contamination of the photosensitive drum 2 will .not occur. Moreover, the difference between the grid bias voltage and the developing bias voltage relates to the background voltage. Excessively increasing the background voltage will cause adhesion of toner charged with inverse electricity, adhesion of carrier in the case of two-component development, whereas excessively decreasing the same will increase fog.

To avoid the above disadvantages, the CPU 59 sets values in the D/A converters 47 and 48 when the grid bias voltage and developing bias voltage fall within ranges, each defined by predetermined lower and upper limits, and at the same time when the difference between the grid bias voltage and developing bias voltage falls within a predetermined range (the lower and upper limits and predetermined range are the bias condition values stored in the memory section 56). If these conditions are not satisfied, renewal of the bias values of the D/A converters 47 and 48 is not performed, with the result that the control is terminated with the present grid bias voltage and developing voltage maintained as they are, and the apparatus enters a waiting state.

In this embodiment, the above predetermined values are experimentally determined as follows:

Since this embodiment employs normal development using toner with a negative charge, the bias voltage has a minus negative value. The following values are absolutes. The upper and lower limits of the grid bias voltage are set to 1000 V or less and 250 V or more, respectively. The upper and lower limits of the developing bias voltage are set to 920 V or less and 170 V or more, respectively. The difference between the grid bias voltage and developing bias voltage is set to a value falling within a range of 400 to 80 V.

When the outputs of the toner adhesion measuring unit 8 have reached predetermined values (sensor output abnormality is detected), the CPU 59 determines whether or not the reflection amounts of high and low density test patterns and the reflection amount of the portion of the drum 2 other than the high and low density test patterns, which are supplied from the A/D converter 46, fall within an abnormality range of the toner adhesion amount measuring unit 8 stored in the memory section 56.

At this time, detection accuracy may be degraded and the control system be erroneously operated, due to a defect in the power source, deterioration of the light source 51, contamination of light-emission/receiving paths, a defect in the light-receiving circuit or between the sensor/signal-receiving circuits, flaws on the drum 2, a change in the reflectance of filming, etc., or deterioration of the test pattern-forming unit.

To prevent each of the above, predetermined lower and upper limits are provided for each of the outputs indicating the reflection amounts of high and low density test patterns and the reflection amount of the portion of the drum 2 other than the high and low density test patterns. If any one of the outputs falls outside its predetermined range, further calculation/determination is not performed, thereby setting a sensor abnormality flag so as to display on the operation panel that the toner adhesion amount measuring unit 8 is abnormal. Then, the apparatus enters a waiting state, with the data items, assumed before abnormality occurs in the unit 8, maintained as they are.

The sensor abnormality flag stored in the memory section 57 is reset by initial processing when the apparatus is turned on. It can be reset by a reset command manually supplied from the operation panel at the time of maintenance of the apparatus.

When the flag is set, no control is performed.

In FIG. 39, from the results of detection sequence, amounts relating to the optical reflectances of two test patterns with reference to the reflectance of the photosensitive drum 2 are defined as toner adhesion amounts. Specifically, one of the toner adhesion amounts which corresponds to the low density portion is defined as a low density portion toner adhesion amount. The other toner adhesion amount which corresponds to the high density portion is defined as a high density portion toner adhesion amount. Then, high and low density portion differences are calculated based on the high and low density portion toner adhesion amounts and target values, respectively. A change in the development characteristics (gradation characteristics) is determined from the high and low density portion differences.

If both the differences fall within predetermined ranges, respectively, control is terminated without performing bias renewal operation. If, on the other hand, any one of the differences falls within its predetermined range, a renewal amount of the potential relation, indicating the relation between the exposed-portion potential, unexposed-portion potential, and developing bias voltage, is estimated on the basis of the determined development characteristics in the step S51, so as to reduce the differences.

This estimation consists of two steps - one for determining a renewal amount of the relation between the exposed-portion potential and the developing voltage, i.e., a renewal amount of the contrast voltage, on the basis of the relation between the high and low density portion differences; the other for determining a renewal amount of the relation between the unexposed-portion potential and the developing voltage, i.e., a renewal amount of the background voltage, on the basis of the relation between the high and low density portion differences.

Moreover, as described above, since the background and developing voltages are changed, the gradation characteristics of a broad area from the high density area to the low density area can be simultaneously corrected.

Since the development characteristics are maintained at appropriate values, not only the gradation but also the width of a thin line forming e.g. a character can be kept as clearly as in the initial state.

In addition, since the renewal amount is determined from the deviation of the adhesion amount, and this operation is repeated, the converged value can be prevented from deviating from a target value with the lapse of time.

Furthermore, using the surface potential characteristics of the photosensitive drum, one can easily determine the grid bias voltage and developing bias voltage for realizing the estimated contrast and background voltages, thereby reducing the number of control cycles.

As explained above, in the invention, the following operations are performed: The amounts of developer adhered to high and low density test patterns are measured, respectively, thereby calculating the difference of each of the developer amounts and a predetermined target value. If each of the differences does not fall within a predetermined range, first and second renewal data items are calculated. The first renewal data item relates to exposure conditions of exposure means and a bias voltage applied to developing means, or to the exposure amount of the exposure means and bias voltages applied to charger means and developing means, or to bias voltages applied to the charger means and developing means and the emission period of the exposure means, or to the light renewal amount. The second renewal data item relates to emission period correction renewal. Target exposure amount data and emission period correction data are calculated by use of the first and second renewal data items, respectively, thereby changing image forming conditions, such as the exposure amount and emission period of the exposure means.

In the invention, the combination of any pair of the operations of changing the potential relationship by bias value renewal, changing the exposure amount, and changing the exposure amount and the pulse-width correction characteristics can minimize bias renewal amounts, prevent a fog from occurring as a result of changing the image forming conditions, and maintain the gradation characteristics at appropriate values from the high density area to the low density area. Moreover, since renewal amounts are calculated on the basis of set values detected at the time of measurement, the steady-state deviation can be minimized by repeating the control.

Accordingly, image quality can be maintained free from an image defect and identical to the initial quality, and variation in image density due to changes in ambient conditions with lapse of time can be minimized without maintenance work in a cycle shorter than a maintenance cycle, thereby highly stabilizing the image density. In addition, the apparatus can be maintained at low cost (labor cost, exchanged-component cost, etc.).

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image forming apparatus comprising:
   means for forming a latent image on an image carrier under a predetermined exposure conditions including light emission intensity and light emission time width being changed, said latent image corresponding to high and low density image data to be formed;
   means for developing the latent image formed by said exposure means with a developing agent including toner under a predetermined image forming condition;
   means for applying a developing bias voltage to said developing means;
   means for detecting the amounts of the toner attached to the image carrier and corresponding to the high and low density images;
   first calculation means for calculating difference values between those amounts of the toner corresponding to the high and low density images detected by said detecting means and preset target values, respectively;
   second calculation means for calculating first renewal amount data relating to a renewal amount of a contrast potential corresponding to a difference between the developing bias voltage applied by said applying means and a potential of an exposed portion of the image carrier and second renewal amount data relating to a renewal amount of a background potential which is a difference between the developing bias voltage applied by said applying means and an unexposed-portion potential of the image carrier in accordance with the first and second difference values calculated by said calculating means, when the first and second difference values fall outside the predetermined ranges; and
   control means for setting exposure conditions of said forming means in accordance with the first renewal amount data calculated by said second calculating means, the developing bias voltage applied by said applying means being applied in accordance with the second renewal amount data calculated by said second calculating means.

2. An image forming apparatus comprising:
   means for charging an image carrier;
   first applying means for applying a charging bias voltage to said charging means;
   exposure means for forming a latent image corresponding to a high density image and a low density image on the basis of image data on the image carrier charged by said charging means, said exposure means being able to change an exposure amount in accordance with target exposure amount data;
   means for developing the latent image formed by said exposure means with a developing agent including toner under a predetermined image forming condition;
   means for applying a developing bias voltage to said developing means;
   means for detecting the amounts of toner attached to the image carrier and corresponding to the high density image and the low density image, respectively;
   first calculation means for calculating difference values between those amounts of the toner corresponding to the high and low density images detected by said detecting means and preset target values, respectively;
   second calculation means for calculating first renewal amount data relating to a renewal amount of the exposure amount of the exposure means, and second renewal amount data relating to a renewal amount of a background potential which is a difference between the developing bias voltage applied by said applying means and an unexposed-portion potential of the image carrier in accordance with the first and second difference values calculated by said first calculating means when the difference values fall outside the predetermined ranges;
   first control means for setting a target exposure amount data in accordance with the first renewal amount data calculated by said second calculating means; and
   second control means for setting the charging bias voltage applied by said first applying means and the developing bias voltage applied by said second applying means on the basis of the second renewal amount data and a surface-potential characteristics of the image carrier.

3. An image forming apparatus comprising:
   charging means for charging an image carrier;
   exposure means for forming a latent image corresponding to a high density image and a low density image on the basis of image data on the image carrier charged by said charging means;
   means for developing the latent image formed by said exposure means with a developing agent including toner under a predetermined image forming condition;
   means for applying a developing bias voltage to said developing means;

means for detecting the amounts of toner attached to the image carrier and corresponding to the high density image and the low density image, respectively;

means for setting light-emission width data in accordance with a time period for which light is radiated corresponding to gradation data per unit pixel of said image data to be formed;

means for performing modulation control of the unit-pixel pulse width of light emitted from said exposure means in accordance with the light-emission period data set by said setting means;

first calculation means for calculating difference values between those amounts of the toner attached to the high and low density images detected by said detecting means and preset target values, respectively;

second calculation means for calculating first renewal amount data relating to renewal of a contrast potential corresponding to a difference between the developing bias voltage applied by said applying means and potential of an exposed portion of the image carrier and second renewal amount data relating to light-emission time width renewal in accordance with the first and second difference values calculated by said first calculating means, when the first and second difference values fall outside the predetermined ranges; and first control means for setting a charging bias voltage applied to the charging means and a developing bias voltage applied to the developing means in accordance with the first renewal amount data obtained by said second calculating means and surface potential characteristics of the image carrier; and second control means for setting and a light emission period correction data according to the second renewal amount data.

4. An image forming apparatus comprising:

exposure means for forming a latent image corresponding to a high density image and a low density image on the basis of image data to be formed on an image carrier, said exposure means being capable of changing an exposure amount on the basis of target light amount data;

means for developing the latent image formed by said exposure means with a developing agent including toner under a predetermined image forming condition;

means for applying a developing bias voltage to said developing means;

means for detecting amounts of toner attached to the image carrier corresponding to the high density image and the low density image, respectively;

means for setting light-emission width data in accordance with a time period for which light is radiated corresponding to gradation data per unit pixel of said image data to be formed;

means for performing modulation control of the unit-pixel pulse width of light emitted from said exposure means on the basis of the light-emission period data set by said setting means;

first calculation means for calculating difference values between those amounts of the toner corresponding to the high and low density images detected by said detecting means and preset target values, respectively;

second calculation means for calculating first renewal amount data relating to light renewal amount and second renewal amount data relating to light-emission period correction renewal;

first control means for setting target light amount data on the basis of the first renewal amount data calculated by said second calculating means; and second control means for setting light-emission period correction data based on the second renewal amount data.

5. An image forming apparatus comprising:

means for generating high and low density test pattern data;

means for forming a latent image on an image carrier corresponding to the high and low density test pattern data, said forming means being capable of changing an exposure amount on the basis of target exposure amount data;

means for developing the latent image corresponding to the high and low density test pattern data formed by said forming means with a developing agent including toner under a predetermined image forming condition;

means for detecting amounts of the toner attached to the image carrier corresponding to the latent image of the high and low density test pattern data developed by the developing means on the image carrier, respectively;

means for setting a light-emission width data in accordance with a time period for which light is radiated in accordance with gradation data per unit pixel of said image data to be formed;

means for performing modulation control of the unit-pixel pulse width of light emitted from said forming means on the basis of the light-emission period data set by said setting means;

first calculation means for calculating difference values between those amounts of the toner corresponding to the high and low density images detected by said detecting means and preset target values, respectively;

second calculation means for calculating first renewal amount data relating to light renewal amount, and second renewal amount data relating to light-emission period correction renewal in accordance with the first and second difference values calculated by said first calculating means when the first and second difference values fall outside the predetermined ranges;

first control means for setting target light amount data on the basis of the first renewal amount data calculated by said second calculation means; and second control means for setting the light-emission period correction data based on the second renewal amount data.

6. An image forming apparatus comprising:

means for forming an image on an image carrier, said forming means including charging means for charging said image carrier, first applying means for applying a charging bias voltage to said charging, generation means for generating high density test pattern data and a low density test pattern data and means for exposing a light on said charged image carrier to form the latent image on the basis of the high and low density test patterns data on said image carrier;

means for developing the latent image formed by said forming means with a developing agent including toner under a predetermined image forming condition;

second applying means for applying a developing bias voltage to said developing means;

means for holding a contrast voltage determined based on an exposed-portion potential and the developing bias voltage and a background voltage determined based on an unexposed-portion potential and the developing bias voltage, the contrast voltage and background voltage being determined at the time of forming, on the image carrier, the electrostatic latent images corresponding to the test pattern data;

means for detecting amounts of the toner attached to the image carrier corresponding to a high density test pattern and a low density test pattern developed by the developing means on the image carrier, respectively;

setting means for setting first and second toner amount target values corresponding to the high and low density test patterns;

first calculation means for calculating a first difference value between the amount of the toner corresponding to the high density test pattern detected by said detecting means and the corresponding first target value set by the setting means, and a second difference value between the amount of the toner corresponding to the low density test pattern detected by said detecting means and the second target value set by said setting means;

means for determining whether or not the differences fall within predetermined ranges, respectively;

means for storing those renewal amounts of the contrast voltage and the background voltage, which correspond to the differences, respectively;

means for extracting those renewal amounts of the contrast voltage and the background voltage, which correspond to the differences, when the determination means determines that the differences fall outside the predetermined ranges;

second calculation means for calculating a charging bias voltage and a developing bias voltage corresponding to the renewal amounts of the contrast voltage and the background voltage; and renewal means for renewing the charging bias voltage and developing bias voltage applied by the first and second applying means, by use of the charging bias voltage and the developing bias voltage calculated by said second calculation means, the contrast voltage and background voltage stored in the holding means at the time of forming the test patterns, and prestored surface potential characteristics.

7. The apparatus according to claim 6, wherein said detecting means includes:
means for detecting amounts of light reflected from the high and low density images and the image carrier, respectively.

8. The apparatus according to claim 6, wherein said extracting means includes:
means for extracting renewal amounts of the contrast voltage and the background voltage, respectively, on the basis of relations between the difference values with respect to the high and low density test patterns.

9. The apparatus according to claim 6, wherein said renewal means includes:
means for renewing the developing bias voltage a predetermined time width after the charging bias voltage is renewed.

10. The apparatus according to claim 6, wherein said renewal means includes:
means for repeating renewal of the charging bias voltage and the developing bias voltage; and
means for changing a renewal timing of the charging bias voltage and the developing bias voltage in response to those renewal manner.

11. An image forming method comprising the steps of:
charging an image carrier by use of a charging electrode;
generating high and low density test patterns data;
forming latent images on the charged image carrier on the basis of the high and low test patterns data;
developing the latent images on the image carrier;
detecting attached amounts of a toner corresponding to the developed high and low test patterns;
calculating high and low density image difference values between the amounts of toner corresponding to the high and low density images and target values, respectively;
determining whether or not the high and low density portion difference fall within predetermined ranges, respectively;
setting those renewal amounts of a contrast voltage and a background voltage which correspond to the high and low density image difference values, respectively, when at least one of the high and low density image difference values falls outside its predetermined range;
calculating a charging bias voltage and a developing bias voltage corresponding to the set renewal amounts of the contrast voltage and the background voltage; and
renewing the charging bias voltage and the developing bias voltage in accordance with the calculated charging bias voltage and developing bias voltage.

* * * * *